(12) United States Patent
Faris et al.

(10) Patent No.: US 6,753,044 B2
(45) Date of Patent: Jun. 22, 2004

(54) COLORING MEDIA HAVING IMPROVED BRIGHTNESS AND COLOR CHARACTERISTICS

(75) Inventors: Sadeg M. Faris, Pleasantville, NY (US); Le Li, Yorktown Heights, NY (US)

(73) Assignee: Reveo, Inc., Elmsford, NY (US)

(*) Notice: Subject to any disclaimer, the term of this patent is extended or adjusted under 35 U.S.C. 154(b) by 84 days.

(21) Appl. No.: 08/890,320

(22) Filed: Jul. 9, 1997

(65) Prior Publication Data

US 2002/0012766 A1 Jan. 31, 2002

Related U.S. Application Data

(63) Continuation-in-part of application No. 08/787,282, filed on Jan. 24, 1997, now Pat. No. 6,338,807, and a continuation-in-part of application No. 08/743,293, filed on Nov. 4, 1996, now Pat. No. 6,133,980, and a continuation-in-part of application No. 08/739,467, filed on Oct. 29, 1996, now Pat. No. 6,034,753, and a continuation-in-part of application No. 08/715,314, filed on Sep. 16, 1996, now Pat. No. 6,188,460, and a continuation-in-part of application No. 08/550,022, filed on Oct. 30, 1995, now Pat. No. 5,691,789.

(51) Int. Cl.$^7$ ............................................. G02F 1/1335
(52) U.S. Cl. .................... 428/1.1; 252/299.01; 349/115; 349/175; 349/176; 428/1.1; 428/1.3; 428/1.31; 428/1.6; 428/323; 428/327
(58) Field of Search ...................... 428/1.1, 1.3, 1.31, 428/1.6, 323, 327; 252/299.01; 349/115, 175, 176

(56) References Cited

U.S. PATENT DOCUMENTS 3,277,519 A  10/1966  Jones (List continued on next page.)

FOREIGN PATENT DOCUMENTS

EP  0506176 A1  9/1992

(List continued on next page.)

OTHER PUBLICATIONS

International Search Report, PCT/US98/14264, mailed Nov. 2, 1998.

(List continued on next page.)

Primary Examiner—Nasser Ahmad
(74) Attorney, Agent, or Firm—Thomas J. Perkowski, Esq. PC; Ralph J. Crispino

(57) ABSTRACT

Disclosed are novel reflective microflakes for use in making "additive-primary" coloring media having improved reflection characteristics over the red, green and blue super-bright color characteristics, and "super-white" coloring media having Magnesium-Oxide like color characteristics. The coloring media of the present invention provides a palette of colors for imparting color characteristics or forming color images upon surfaces of arbitrary surface geometry. In the preferred embodiments of the invention, the microflakes are made from cholesteric liquid crystal (CLC) material, wherein the pitch of the helices of the liquid crystal molecules in each CLC microflake varies along the thickness dimension (i.e. transverse to the surface) thereof. Depending on the final spiral structure of the materials utilized, the CLC circularly polarizing materials reflect either left-handed or right-handed circularly polarized light. In a preferred embodiment, each CLC microflake of additive-primary coloring media has a laminated construction in order that both the upper and lower surfaces thereof have substantially the same reflection characteristics over its tuned reflection band. Also, each CLC microflake of super-white coloring media has a laminated construction in order that both the upper and lower surfaces thereof have substantially the same reflection characteristics over its broadband reflection band. The super-white and additive-primary coloring media of the present invention can be used to produce virtually any color. By virtue of the circularly polarizing reflection characteristics of the CLC microflakes, the resulting coloring media can be used to form polarization-encoded spatially multiplexed images (SMI) on radiation absorbing surfaces, to produce stereoscopic 3-D images when viewed through electrically-passive polarization glasses. The coloring media may also be used in 2-D and 3-D xerographic printing processes.

93 Claims, 23 Drawing Sheets

U.S. PATENT DOCUMENTS

| | | | |
|---|---|---|---|
| 3,650,603 A | 3/1972 | Heilmeier et al. | |
| 3,697,070 A | 10/1972 | McAdow | |
| 3,988,494 A | 10/1976 | McAdow | |
| 4,114,990 A | 9/1978 | Mash et al. | |
| 4,388,453 A | 6/1983 | Finkelmann et al. | |
| 4,394,498 A | 7/1983 | Kastelic | |
| 4,410,570 A | 10/1983 | Kreuzer et al. | |
| 4,434,010 A | 2/1984 | Ash | |
| 4,637,896 A | 1/1987 | Shannon | |
| 4,707,080 A | 11/1987 | Fergason | |
| 4,944,578 A | 7/1990 | Denison | |
| 5,016,985 A | 5/1991 | Kalmanash et al. | |
| 5,132,147 A | 7/1992 | Takiguchi et al. | |
| 5,188,760 A | 2/1993 | Hikmet et al. | |
| 5,319,478 A | 6/1994 | Fünfschilling et al. | |
| 5,325,218 A | 6/1994 | Willet et al. | |
| 5,354,557 A | * 10/1994 | Faris | 252/299.01 |
| 5,412,492 A | 5/1995 | Zammit et al. | |
| 5,427,828 A | 6/1995 | Park | |
| 5,457,554 A | * 10/1995 | Faris | 349/13 |
| 5,486,935 A | 1/1996 | Kalmanash | |
| 5,506,704 A | 4/1996 | Broer et al. | |
| 5,508,068 A | 4/1996 | Nakano | |
| 5,599,412 A | 2/1997 | Faris | |
| 5,691,789 A | 11/1997 | Li et al. | |
| 5,795,649 A | 8/1998 | Cosentino et al. | |
| 5,798,147 A | 8/1998 | Beck et al. | |
| 5,814,367 A | 9/1998 | Hubbard et al. | |
| 5,948,831 A | 9/1999 | Broer et al. | |
| 5,968,664 A | 10/1999 | Heberger et al. | |
| 6,010,751 A | 1/2000 | Shaw et al. | |
| 6,033,782 A | 3/2000 | Hubbard et al. | |
| 6,087,069 A | 7/2000 | Ellis | |
| 6,207,770 B1 | 3/2001 | Coates et al. | |
| 6,264,747 B1 | 7/2001 | Shaw et al. | |
| 6,288,837 B1 | 9/2001 | Hubbard | |
| 6,317,947 B1 | 11/2001 | Ruschmann | |

FOREIGN PATENT DOCUMENTS

| | | |
|---|---|---|
| EP | 0606940 A2 | 7/1994 |
| GB | 201579 A | 10/1979 |
| GB | 2276883 A | 10/1994 |
| WO | WO 96/02016 | 1/1996 |

OTHER PUBLICATIONS

Polarizing Color Filters Made From Cholesteric LC Silicones by Robert Maurer, et al., SID 90 Digest, vol. 0, No. 0, 1990, p. 110–113.

Theory of Light Reflection by Cholesteric Liquid Crystals Possessing a Pitch Gradient by Leslie E. Hajdo and A. Cemal Eringen, J. Opt. Soc. Am., vol. 69, No. 7, 1979.

Scarabaeid Beetle Exocuticle as an Optical Analogue of Cholesteric Liquid Crystals by A. C. Neville and S. Caveney, Biological Reviews of the Cambridge Philo. Soc., vol. 0, No. 0, 1969, p. 531–562.

Hydrodynamics Instabilities of Cholesterics Under a Thermal Gradient by E. Dubios–Violette, Le Journal de Physique, vol. 34, No. 0, 1972, p. 107–113.

Orientation of Liquid Srystals in a Spherical Volum, by G.M. Zharkova and S.I. Trashkeev, Sov. Phys. Crystallogr., vol. 34, No. 3, May–Jun. 1989, pps. 414–417.

Terraces in the Cholesteric Phase of DNA Liquid Crystals by David H. VanWinkle, et. al., J. Chem. Phys., vol. 97, No. 8, 1992, p. 5641–5646.

* cited by examiner

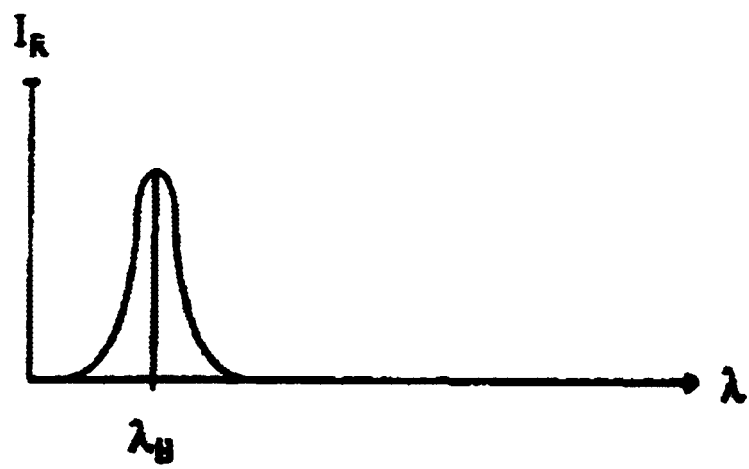
FIG. 1A1
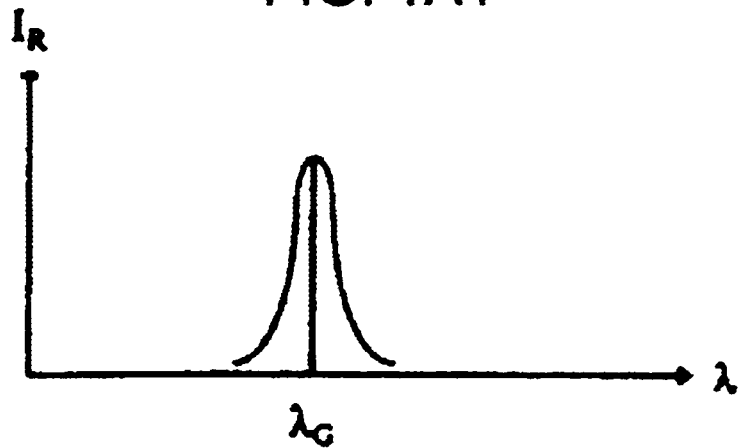
FIG. 1A2
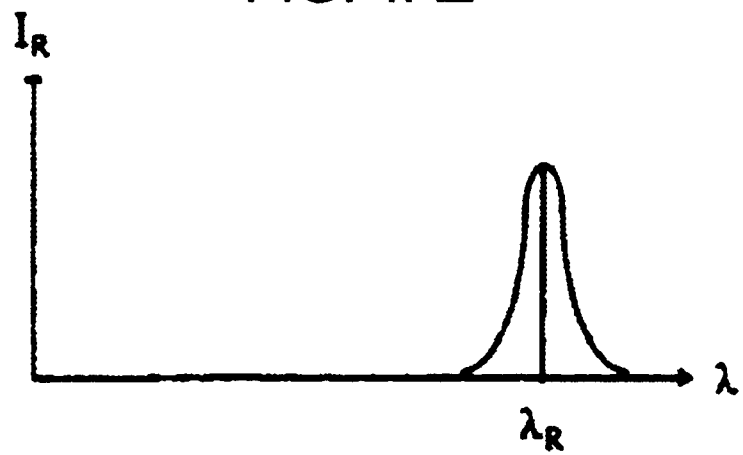
FIG. 1A3

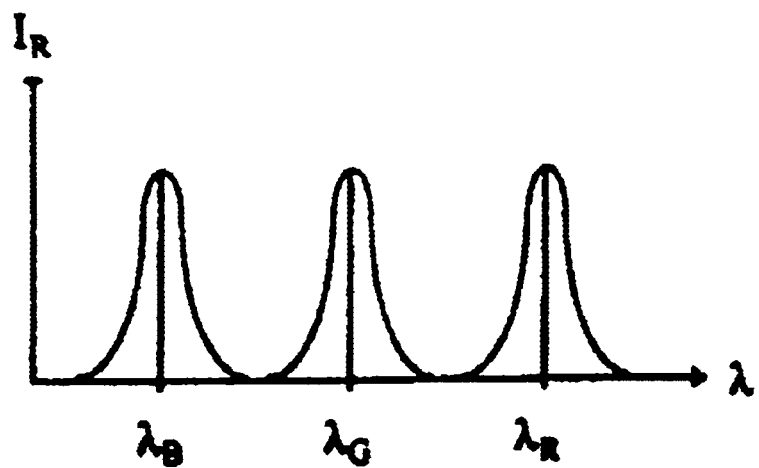
FIG. 1B
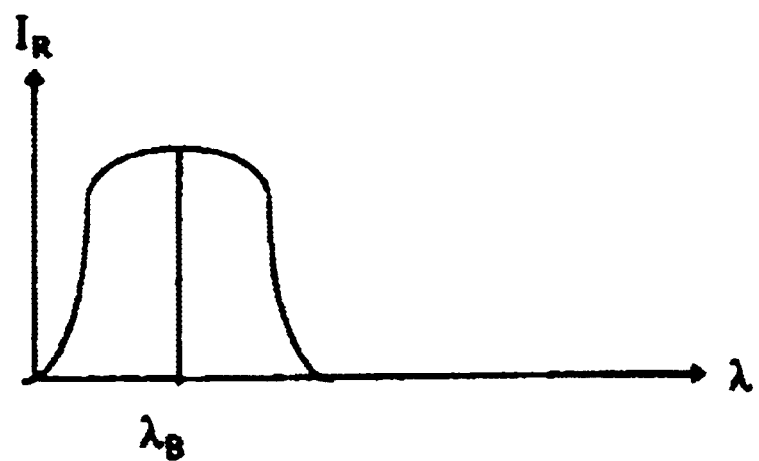
FIG. 1C1
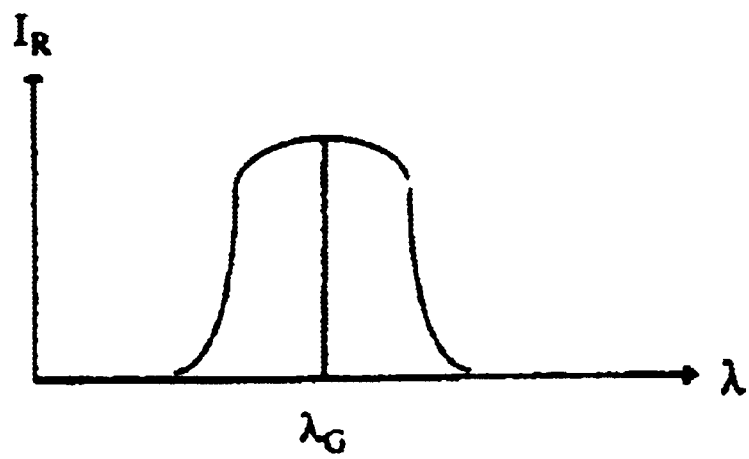
FIG. 1C2

FIG. 1C3

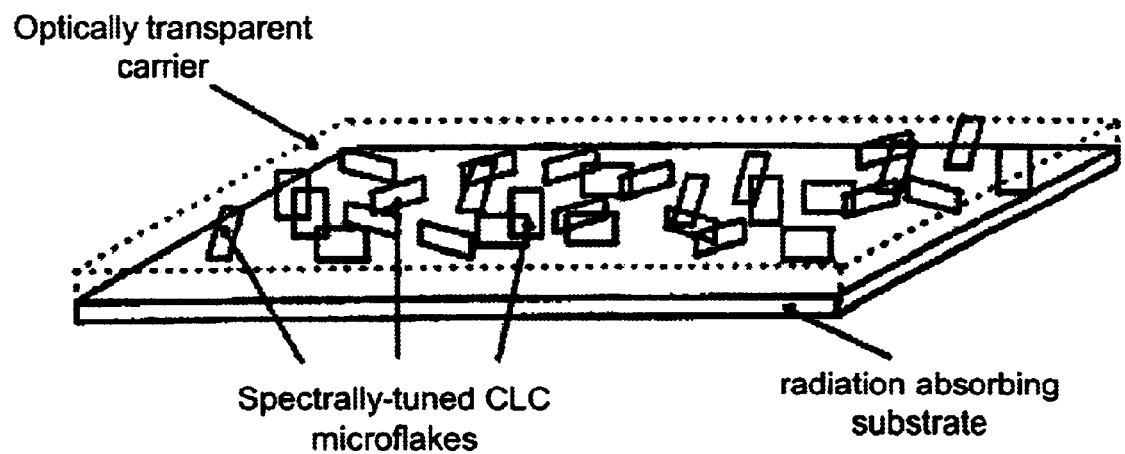
FIG. 2A1
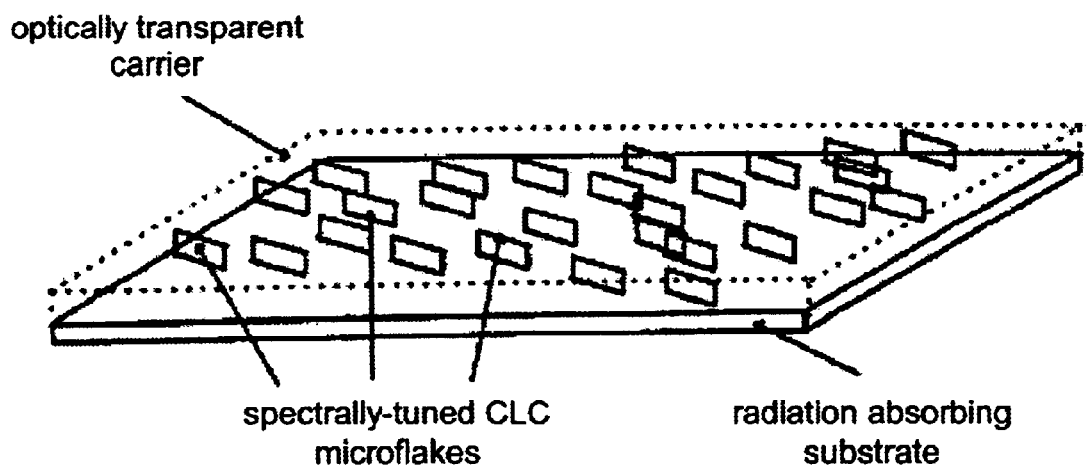
FIG. 2A2

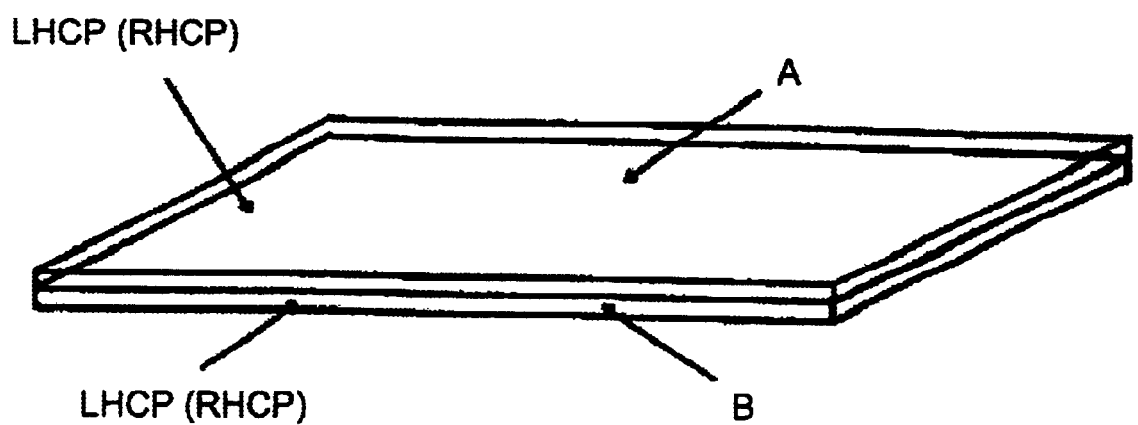
FIG. 2B
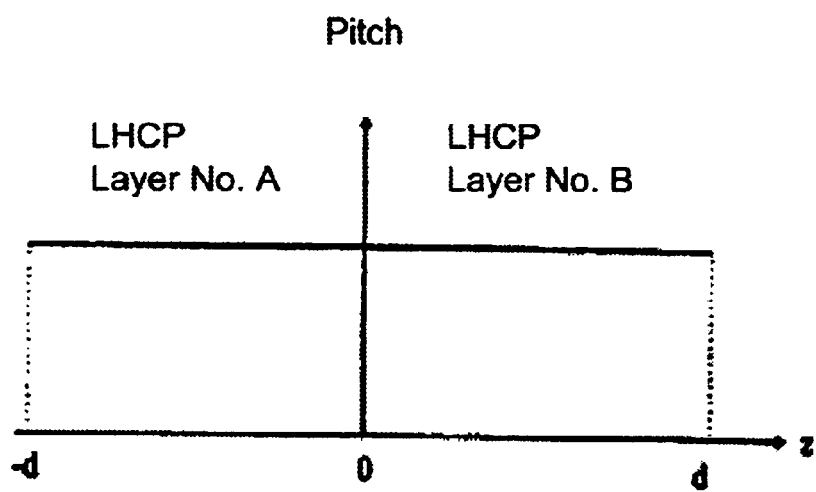
FIG. 2B1

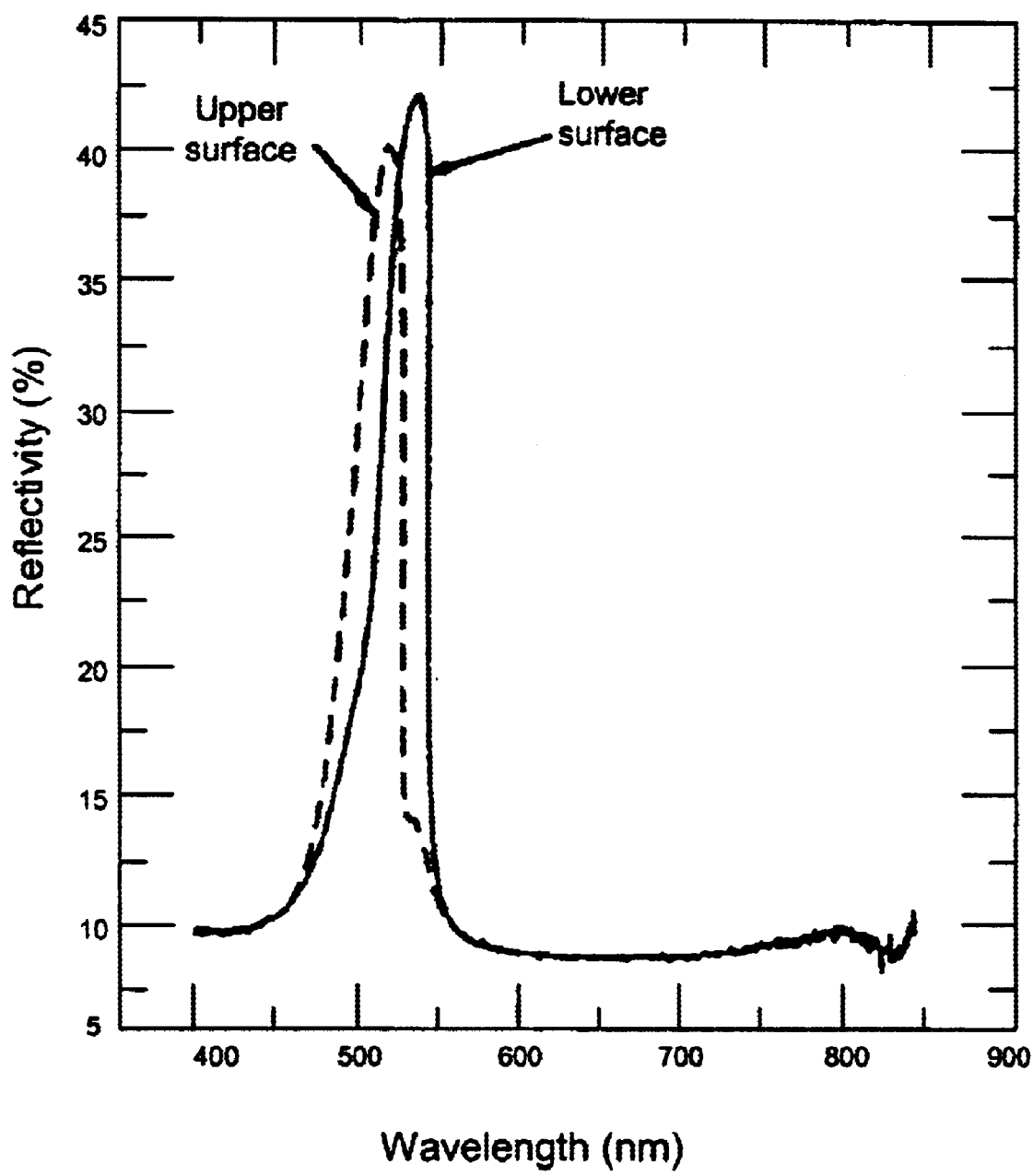
FIG. 2B2

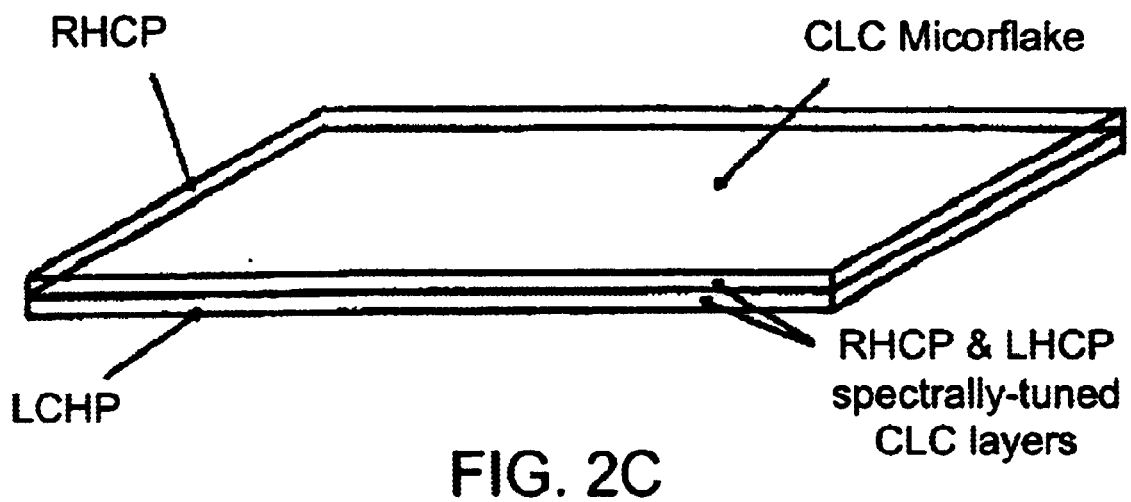
FIG. 2C
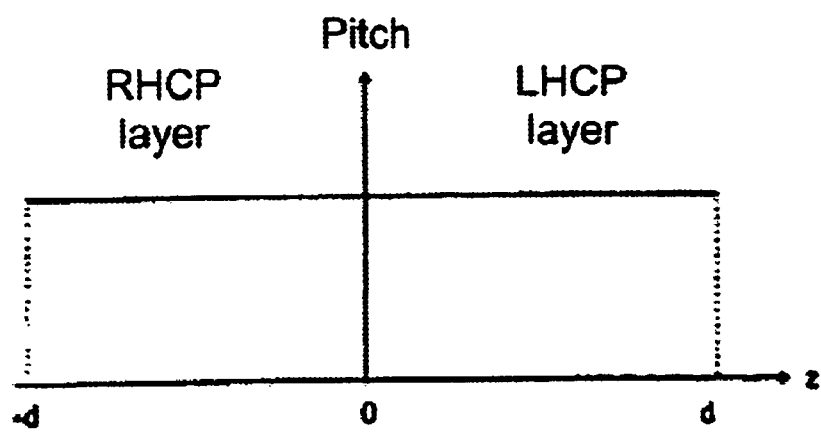
FIG. 2C1

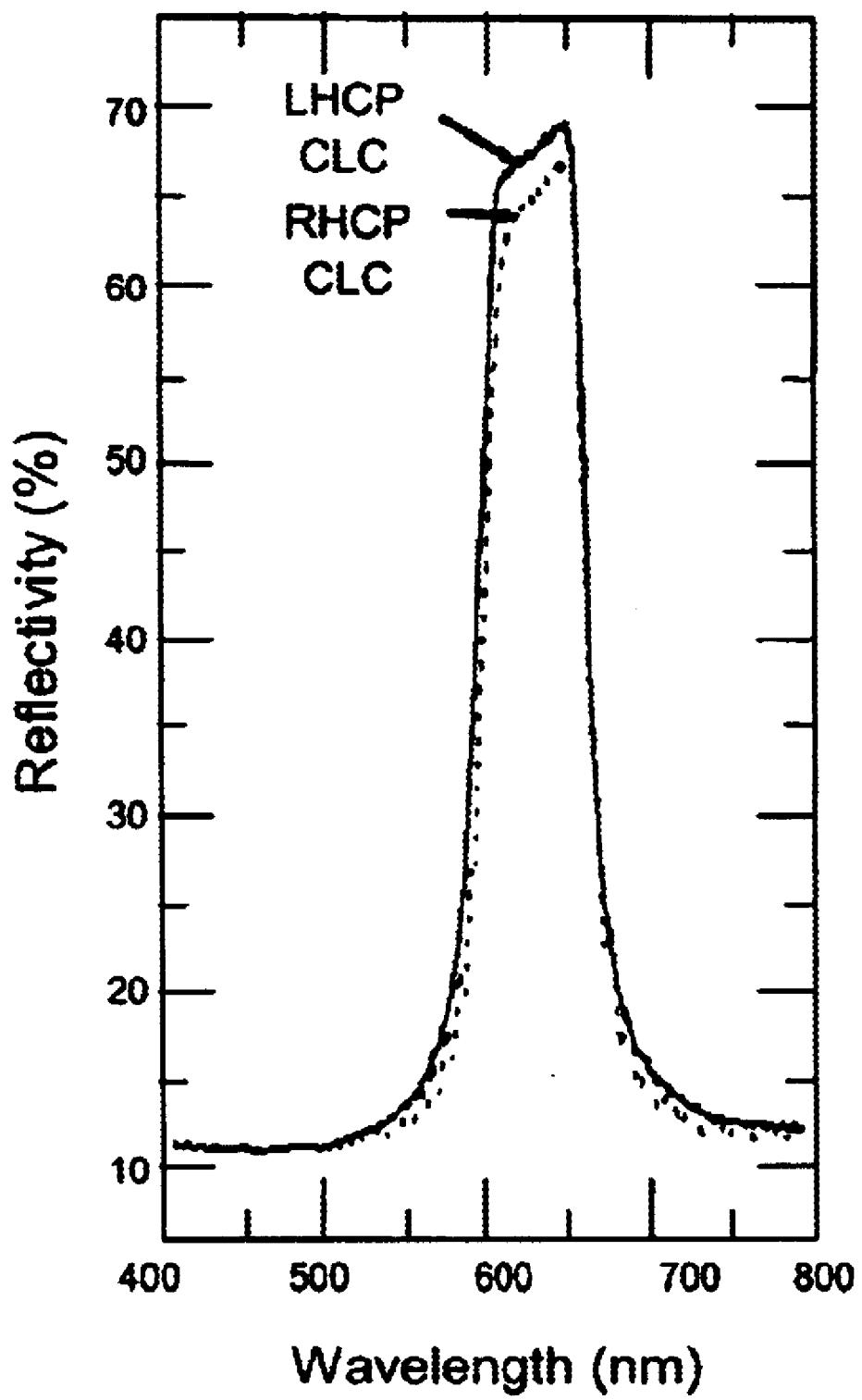
FIG. 2C2

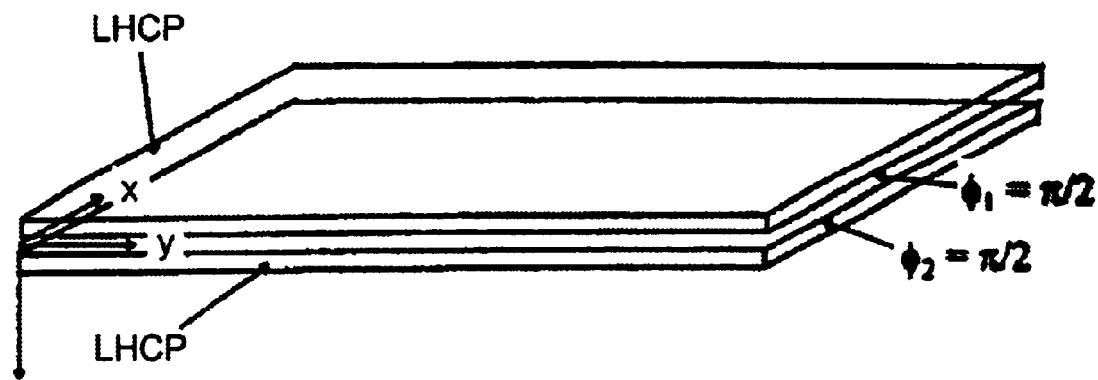
FIG. 2D1
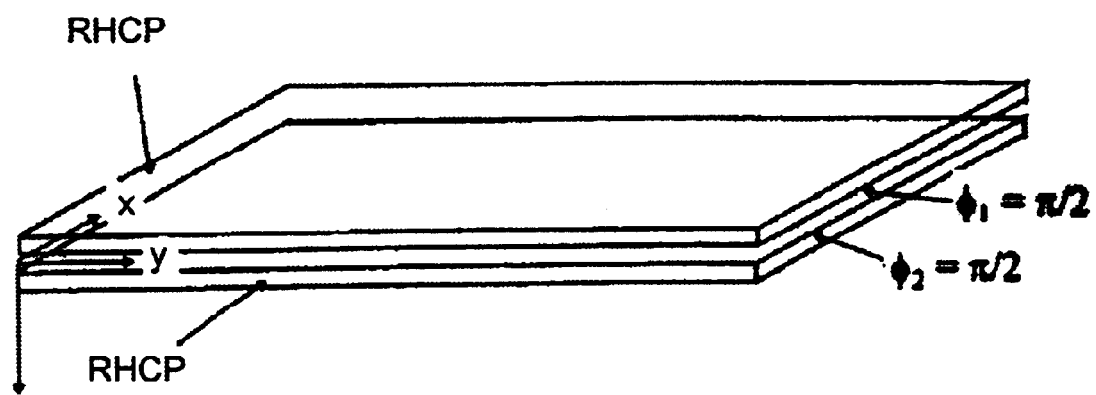
FIG. 2D2

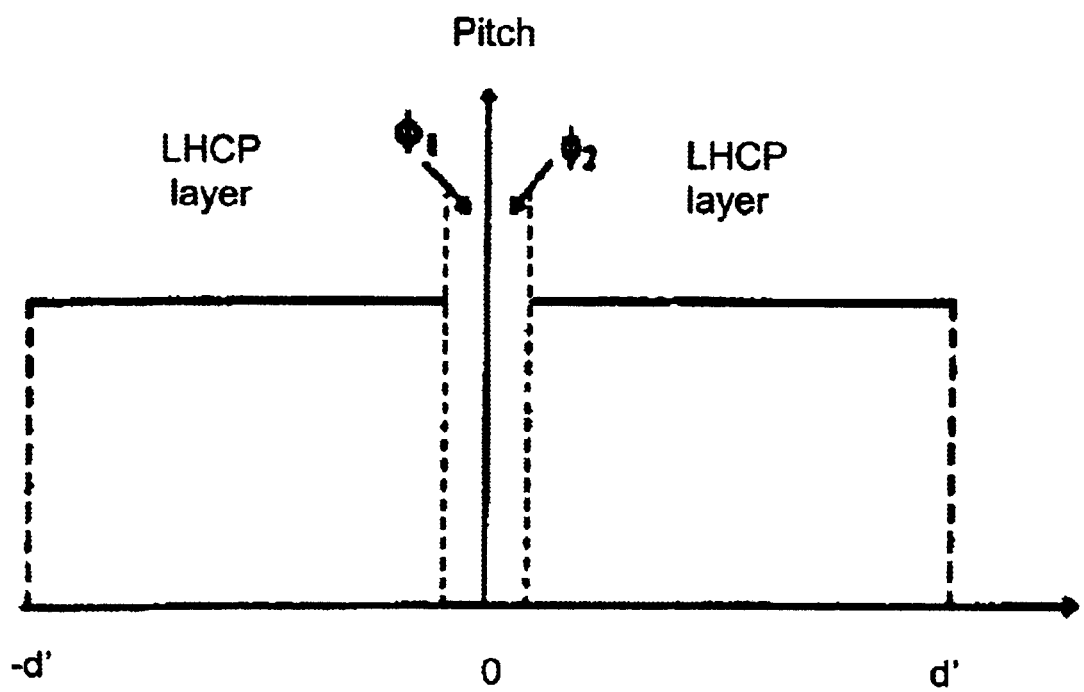
FIG. 2D3
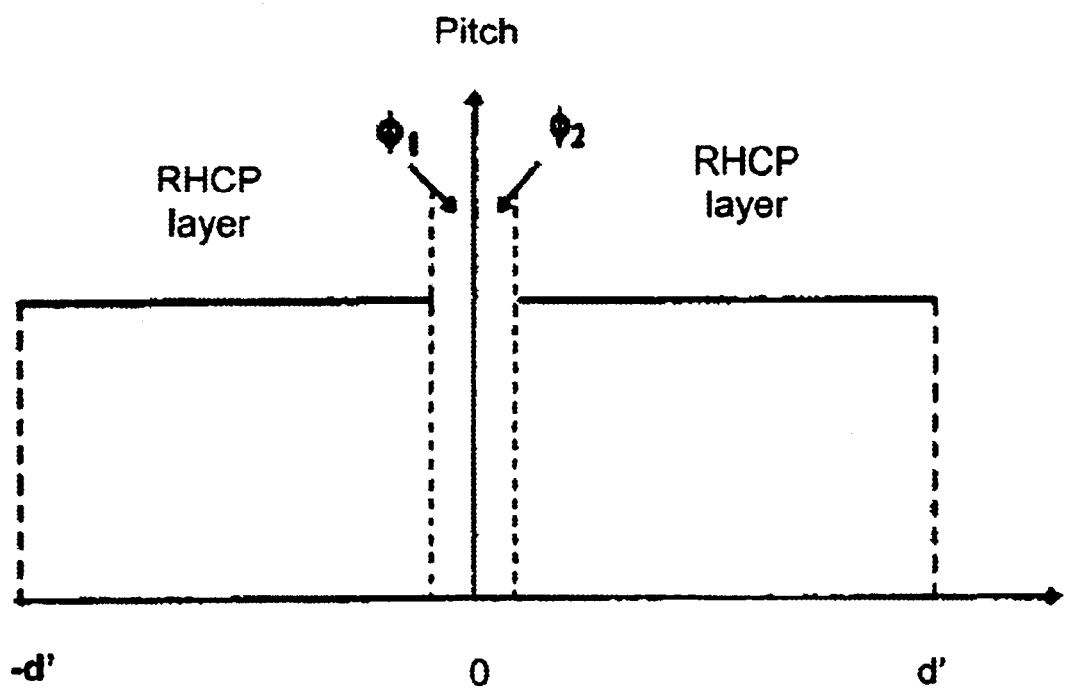
FIG. 2D4

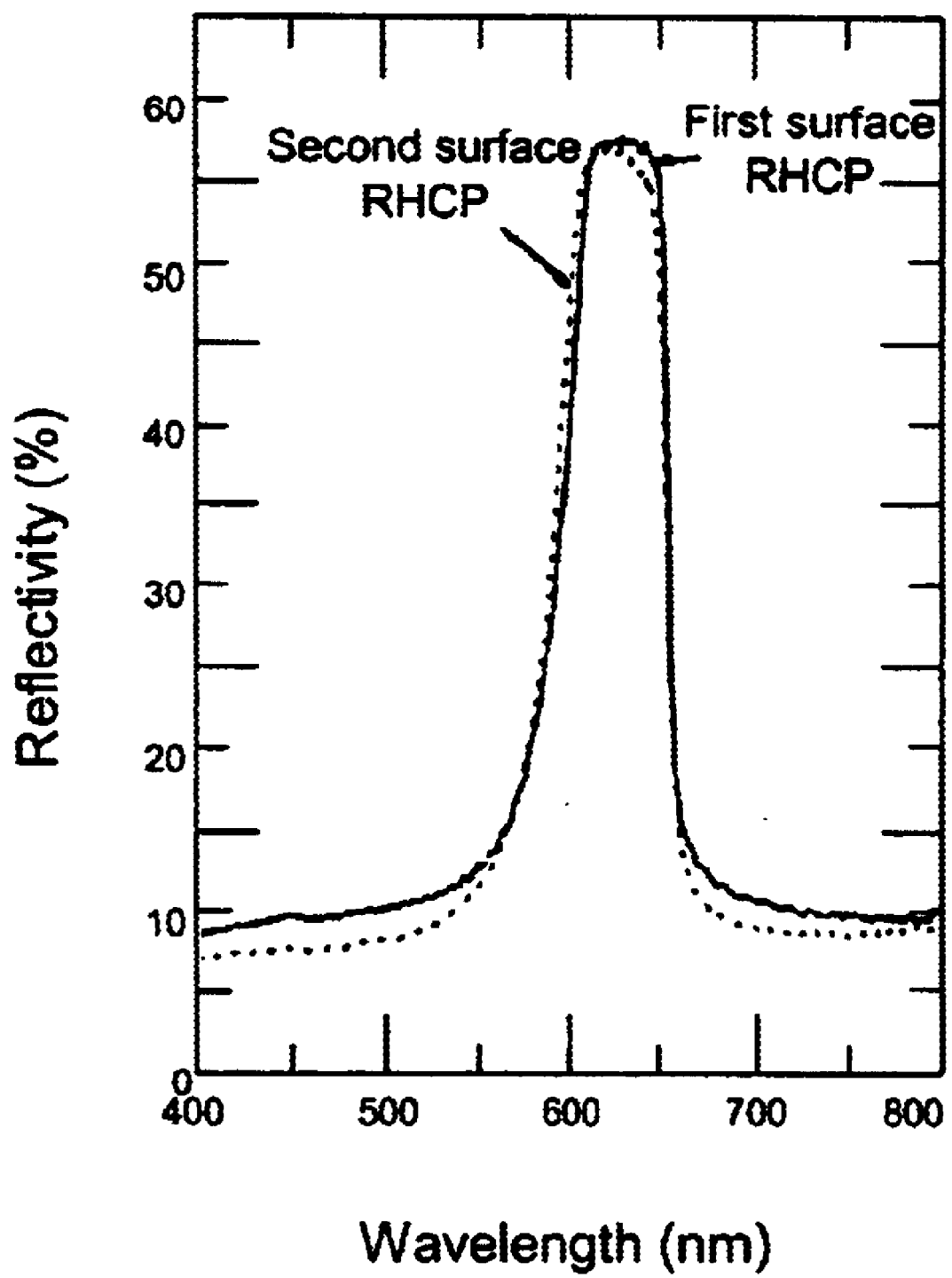
FIG. 2D5

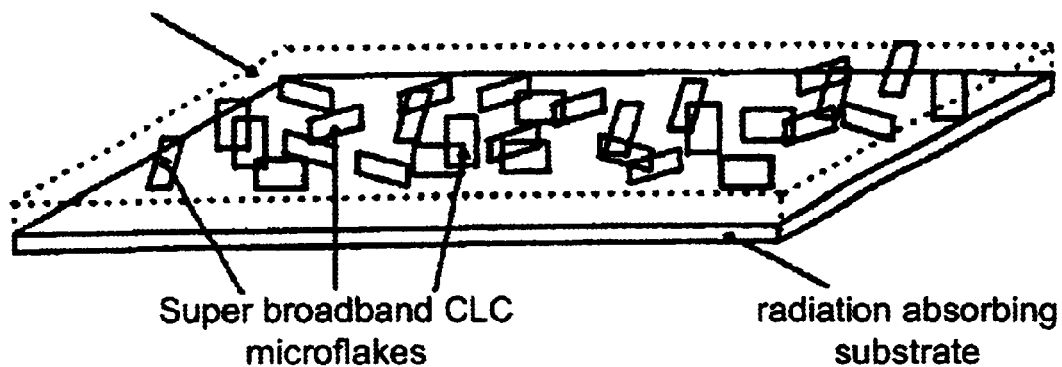
FIG. 3A1
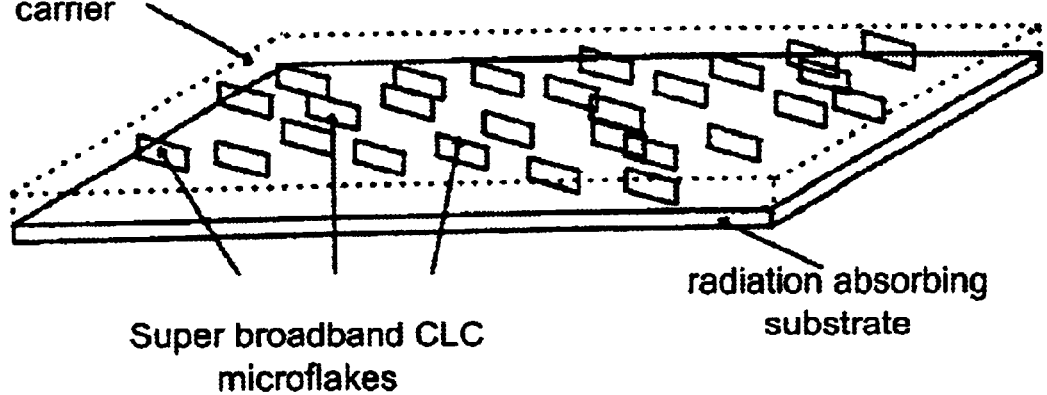
FIG. 3A2

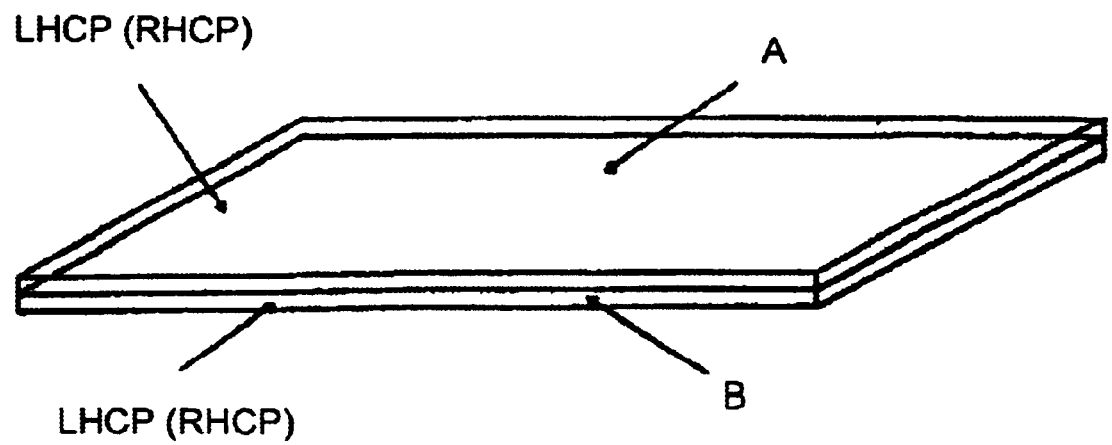
FIG. 3B
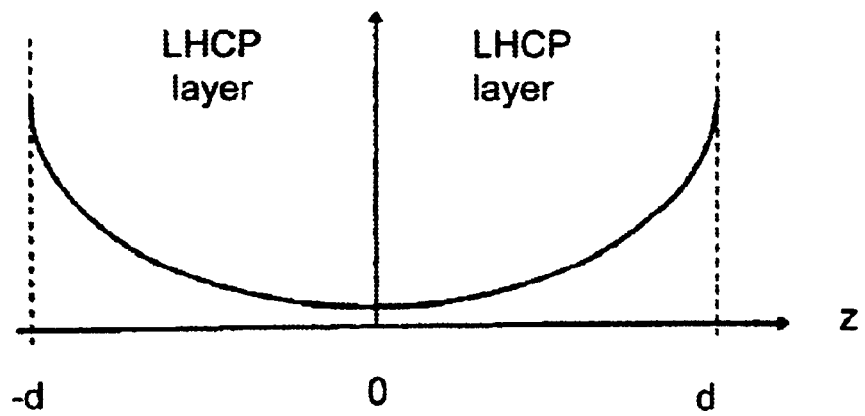
FIG. 3B1 (A)

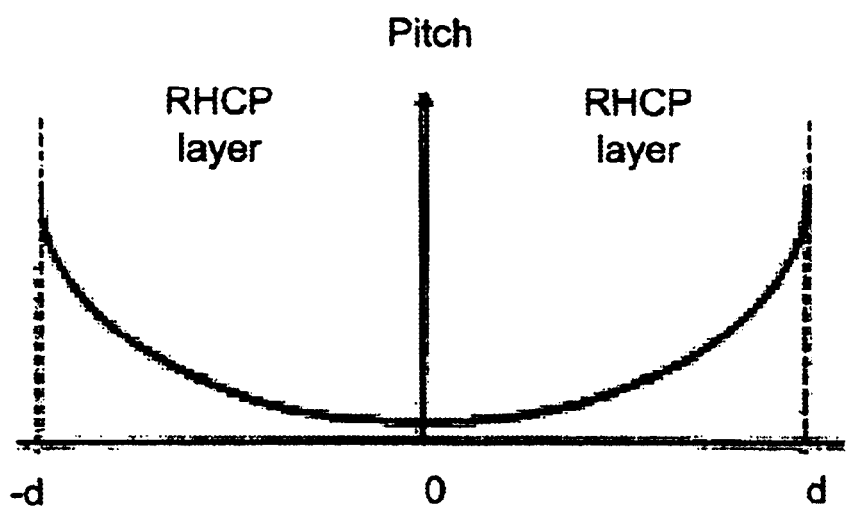
FIG. 3B1 (B)
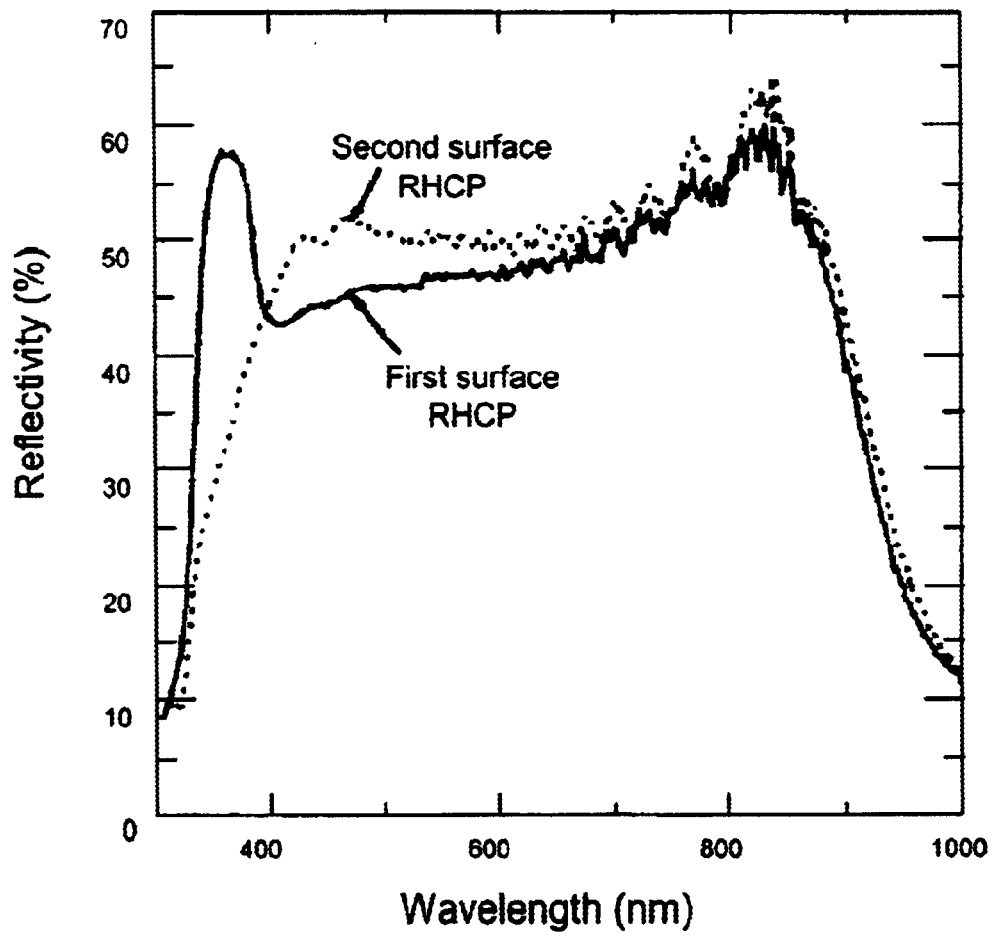
FIG. 3B2

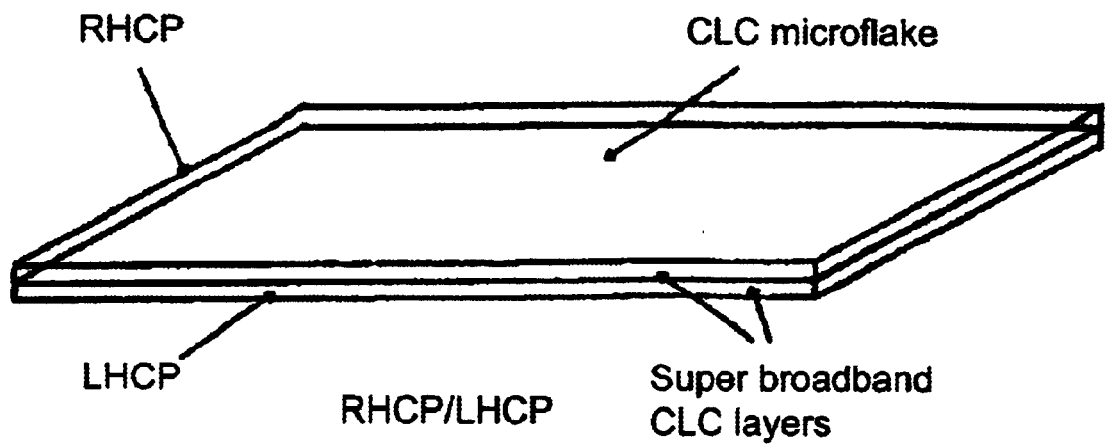
FIG. 3C
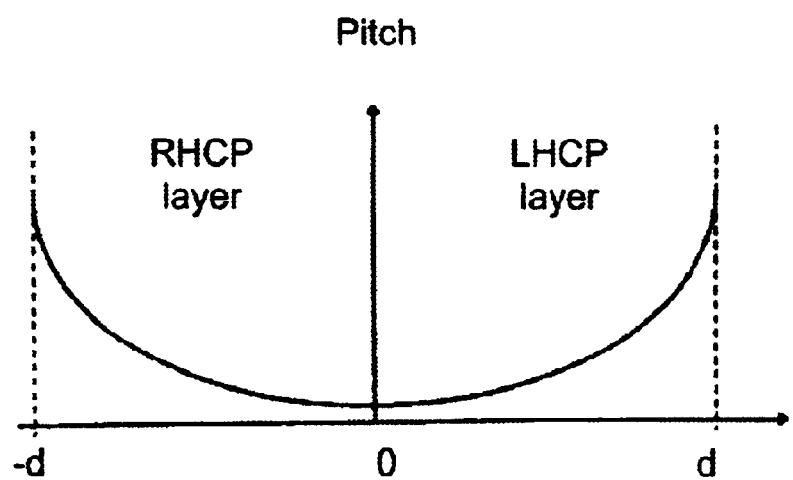
FIG. 3C1 (A)

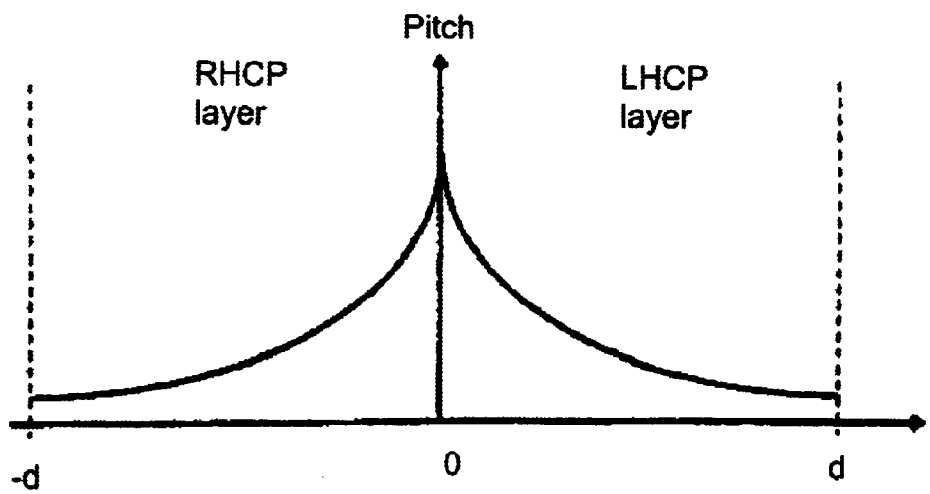
FIG. 3C1 (B)
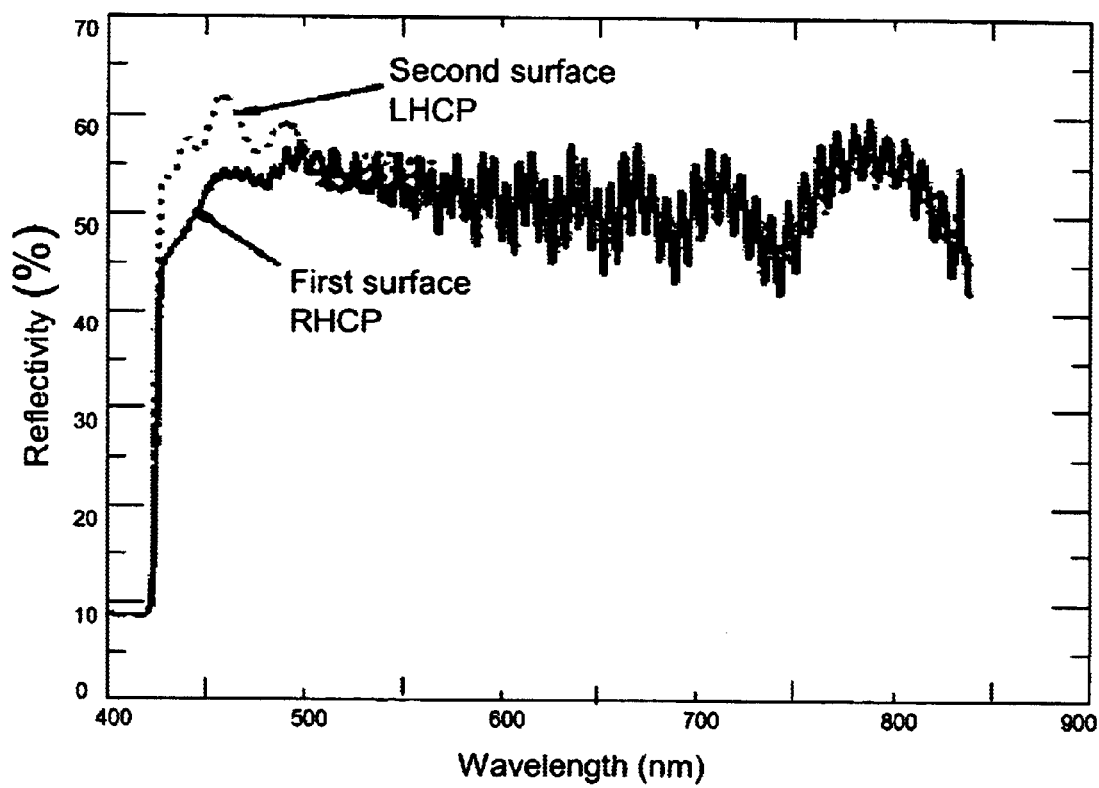
FIG. 3C2

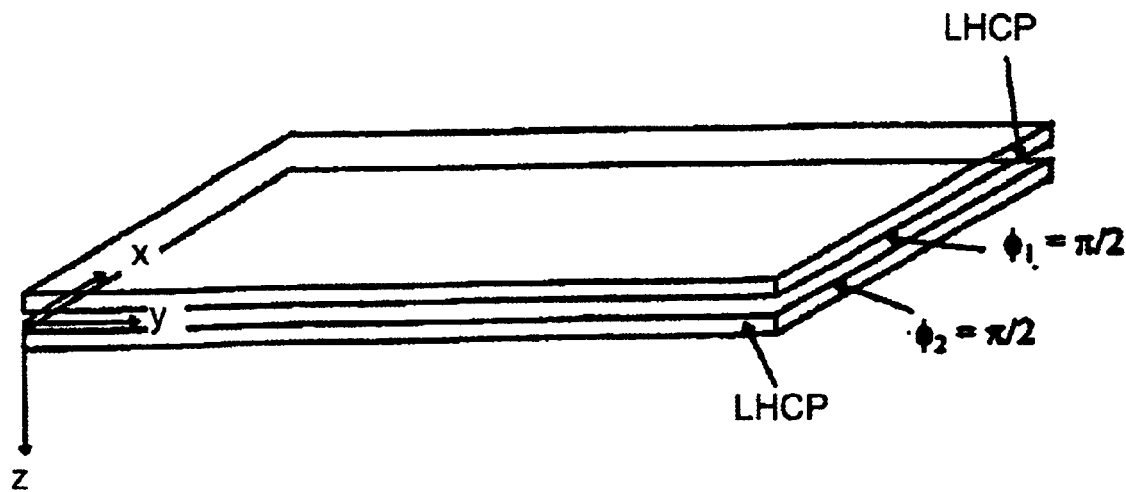
FIG. 3D1
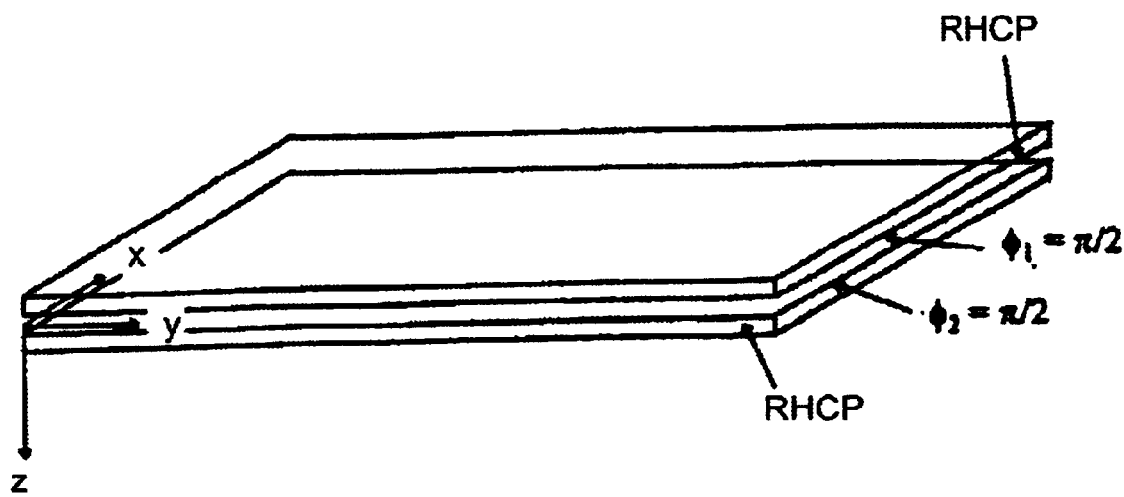
FIG. 3D2

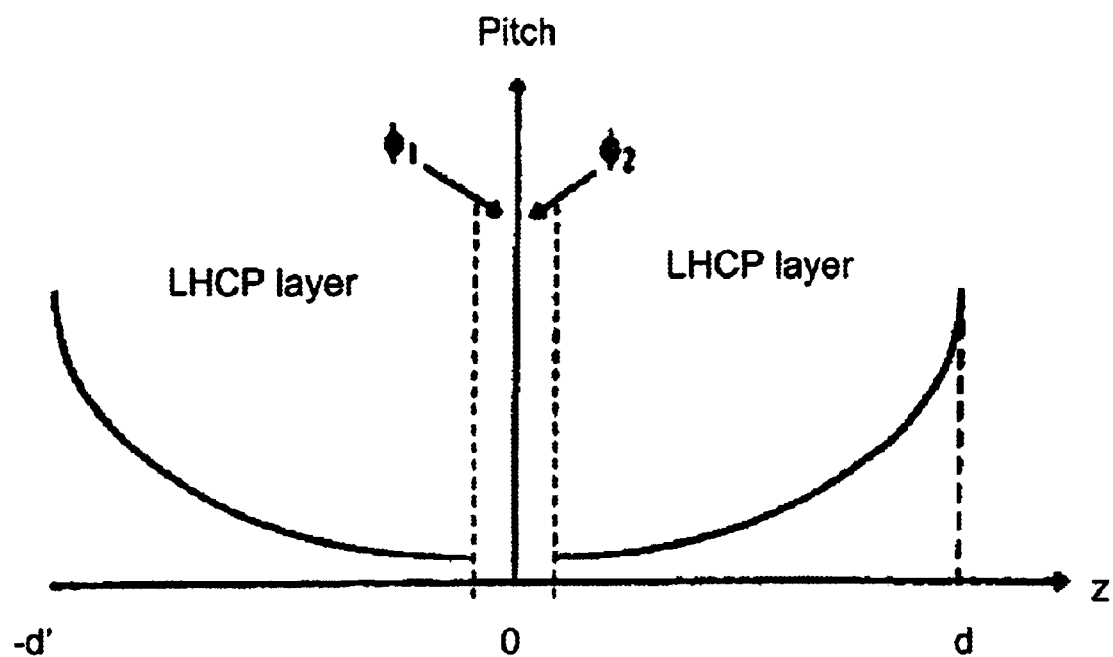
FIG. 3D3
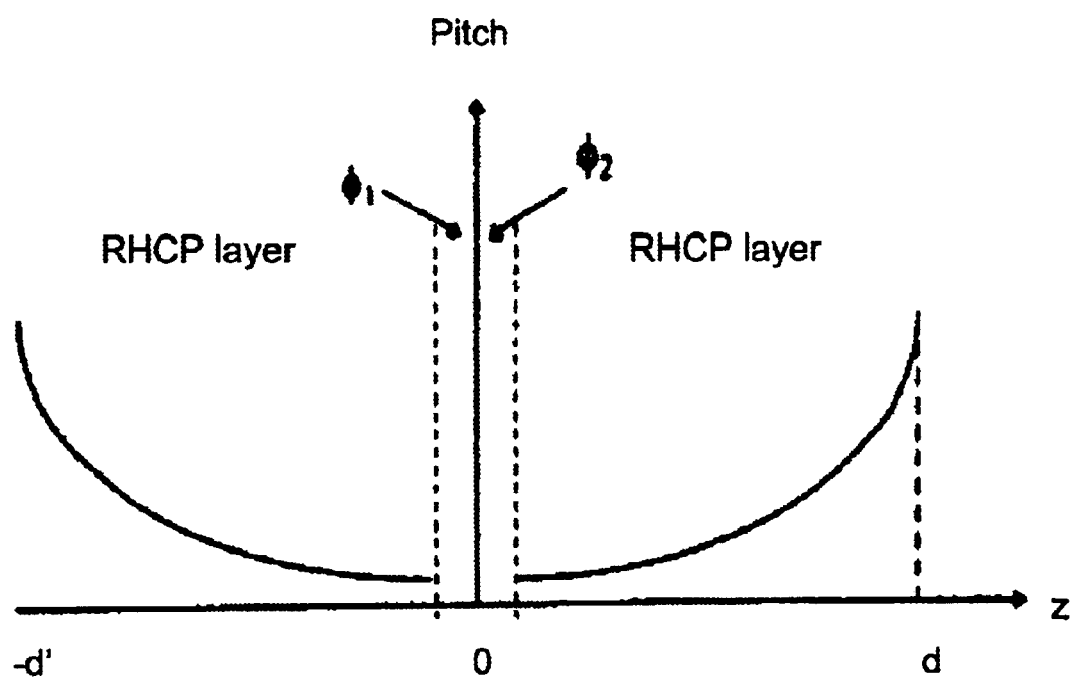
FIG. 3D4

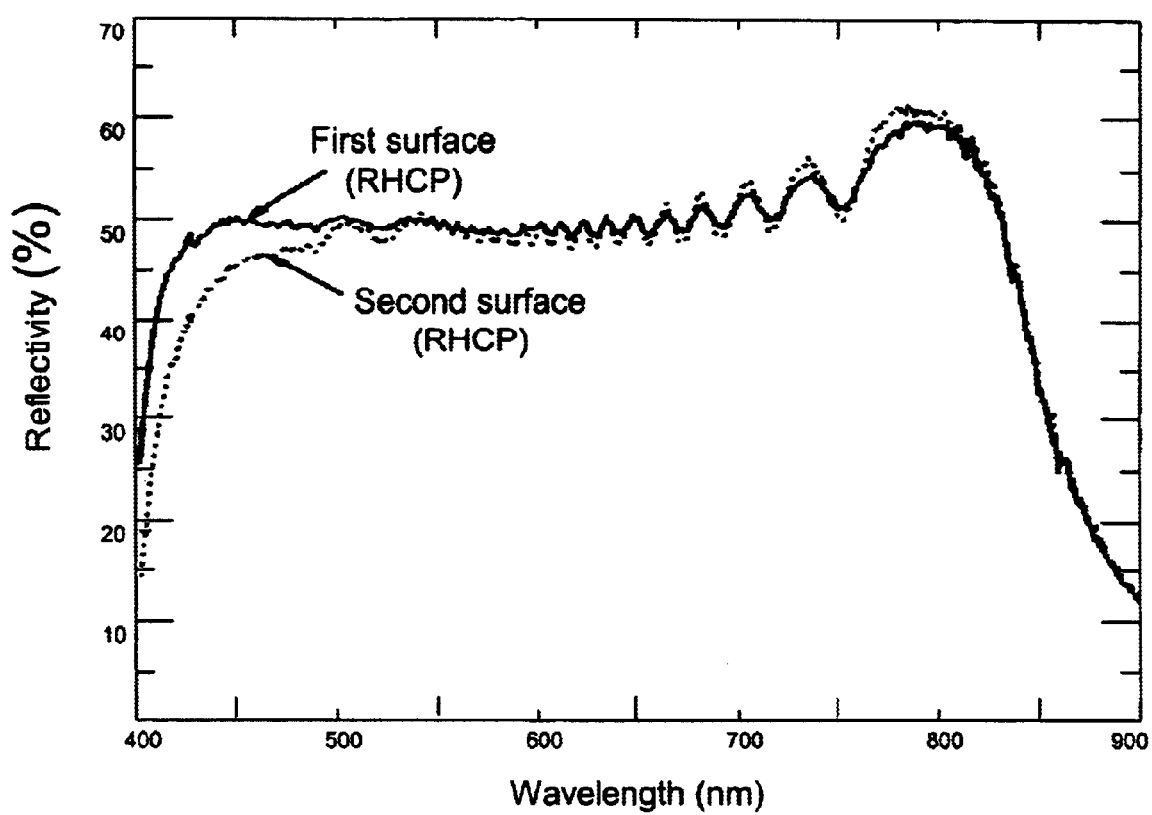
FIG. 3D5

US 6,753,044 B2

COLORING MEDIA HAVING IMPROVED BRIGHTNESS AND COLOR CHARACTERISTICS

RELATED CASES

This is a Continuation-in-Part of: application Ser. No. 08/787,282 entitled "Cholesteric Liquid Crystal Inks" by Sadeg M. Faris filed Jan. 24, 1997 now U.S. Pat No. 6,338,807; application Ser. No. 08/743,293 entitled "Liquid Crystal Film Structures With Phase-Retardation Surface Regions Formed Therein And Methods of Fabricating The Same" by Sadeg Faris filed Nov. 4, 1996, now U.S. Pat. No. 6,133,980; application Ser. No. 08/739,467 entitled "Super Broadband Reflective Circularly Polarizing Material And Method Of Fabricating And Using Same In Diverse Applications", by Le Li and Sadeg M. Faris filed Oct. 29, 1996, now U.S. Pat. No. 6,034,753, application Ser. No. 08/715,314 entitled "High-Brightness Color Liquid Crystal Display Panel Employing Systemic Light Recycling And Methods And Apparatus For Manufacturing The Same" by Sadeg Faris filed Sep. 16, 1996, now U.S. Pat. No. 6,188,460; application Ser. No. 08/550,022 entitled "Single Layer Reflective Super Broadband Circular Polarizer and Method of Fabrication Therefor" by Le Li and Sadeg M. Faris filed Oct. 30, 1995, now U.S. Pat. No. 5,691,789; each of said applications being assigned to Reveo, Inc. and incorporated herein by reference in its entirety.

BACKGROUND OF INVENTION

1. Field of Invention

The present invention relates to broadband and spectrally-tuned circularly-polarizing reflective microflakes made from non-absorptive film material such as cholesteric liquid crystal (CLC) film material, and more particularly to a method of making super-white, mirror-like and additive-primary colored inks, paints and crayons embodying the same, for employment in additive-primary type coloring systems requiring radiation absorbing substrates.

2. Brief Description of Prior Art

In U.S. Pat. No. 5,364,557, Applicant has taught how to make CLC pigments for use in various applications. The advantage of using such CLC pigments is that color characteristics can be imparted to images painted and printed therewith by virtue of the reflection polarizing properties of CLC materials. In color printing, and in the fine arts, CLC color inks are known to possess much higher color saturation and brightness than conventional pigment and dyed based inks. This is in contrast with conventional pigments made from inorganic dyes where the color characteristics thereof are imparted to images painted and printed therewith by virtue of the absorption properties of such materials. A direct consequence of the absorption properties of prior art pigments based on inorganic dyes is that they are characterized by low reflection characteristics over their respective spectral bands. This makes the colors less bright than would otherwise be desired in many applications where a premium is provided for highly reflective paints, surface coatings, and the like, e.g. in the automotive industries, in particular.

However, CLC-based pigments based on the teachings of Applicant's U.S. Pat. No. 5,364,557 are not without shortcomings and drawbacks.

For example, Applicants have discovered that the reflection characteristics of prior art CLC-based microflakes differ on different sides of every CLC microflake. Consequently, as it is impossible to control microflake surface arrangement during application, the color purity and brightness characteristics of color coatings formed by prior art CLC microflakes are generally non-uniform and inadequate for commercial utility.

Moreover, when painting or printing on radiation absorptive surfaces (e.g. black paper) using CLC-based coloring media having "additive" primary color characteristics (e.g red, green and blue), there arises a great need for a CLC-based coloring media having "white" color characteristics in order to render color images with a full range of color shades and intensities, naturally required by human artistic expression. However, the only way in which to obtain the "perfect white" color characteristics using CLC-based coloring media having red, green and blue color characteristics, is to additively mix together CLC-based coloring media having "ideal" (i.e. spectrally pure) red, green and blue color characteristics, which have very narrow spectral reflection characteristics as shown in FIGS. 1A1, 1A2, and 1A3. FIG. 1B shows the spectral reflection characteristics produced when CLC-based coloring media having "ideal" red, green and blue color characteristics are additively mixed together to produce "imperfect white" color characteristics.

In practice, however, CLC-based coloring having "actual" red, green and blue color characteristics have relatively wide spectral reflection characteristics, as graphically illustrated in FIGS. 1C1, 1C2 and 1C3. Consequently, when "actual" CLC-based coloring media having red, green and blue color characteristics are added together, it is not possible to produce the "perfect white" color characteristics, but only "imperfect white" color characteristics having spectral reflection characteristics as graphically illustrated in FIG. 1D. As a result, when painting or printing with CLC-based coloring media having "actual" red, green and blue color characteristics, the color shade and balance of color images produce thereby invariably fall far short of the sought after ideal color characteristics made available using other coloring mediums.

Consequently, when using the prior art CLC-based coloring media taught in U.S. Pat. No. 5,364,557, it has been impossible to produce color images capturing the colorful aspects of nature in a faithful manner, nor produce color images having color tones and shades demanded by even those endowed with low levels of artistic expression.

Thus there is a great need in the art for a system and method of forming highly-reflective full-color images using coloring media that avoids the shortcomings and drawbacks of prior art printing and painting systems and methodologies.

OBJECTS AND SUMMARY OF THE INVENTION

Accordingly, it is a primary object of the present invention to provide reflective microflakes for use in "super-white" and "additive-primary" coloring media (e.g. colored inks, paints, and crayons) while avoiding the shortcomings and drawbacks of prior art printing and painting systems and methodologies.

Another object is to provide such reflective microflakes made from circularly polarizing reflective material having improved spectral and band-pass position characteristics for imparting improved color characteristics.

Another object of the present invention is to provide such microflakes with a laminated construction, wherein each surface thereof exhibits symmetrical broadband reflection characteristics over particular regions of the visible band of the electromagnetic spectrum, in order to provide improved light reflectively and brightness when used in the manufacture of colored inks, paints and/or crayons of the present invention.

Another object of the present invention to provide such microflakes made from microscopic size fragments of thin CLC film material in which the axis of helical pitch of CLC molecules extends along the thickness dimension of the CLC microflake (i.e. transverse to the surface thereof), and in which the pitch of the helices of the CLC molecules varies in a non-linear (e.g. exponential) manner along the thickness dimension of each CLC microflake.

Another object of the present invention is to provide such CLC microflakes with a laminated construction, wherein each surface thereof normal to the helical axis exhibits symmetrical broadband reflection characteristics over the visible band of the electromagnetic spectrum, in order to provide improved light reflectively and brightness when used in the manufacture of super-white polarizing inks, paints and/or crayons of the present invention.

Another object of the present invention is to provide CLC microflakes which have reflection characteristics over the visible band of the electromagnetic spectrum which provide improved light reflectively and brightness when used in the manufacture of super-white polarizing inks and/or paints of the present invention.

Another object is to provide CLC microflakes made from both left-handed and right-handed circularly polarizing material having circularly-polarizing reflection characteristics over the entire visible band of the electromagnetic spectrum, for improved color characteristics.

Another object is to provide a method of fabricating CLC microflakes from circularly polarizing material having extremely broadband spectral reflection and transmission characteristics, low optical loss properties, high polarizing efficiency and low manufacturing cost.

Another object is to provide a method of fabricating circularly polarizing reflective microflakes having broadband spectral characteristics, low optical loss properties, high polarizing efficiency, simplified fabrication, and low manufacturing cost.

Another object of the present invention is to provide a novel method of fabricating broadband CLC-based pigments by producing CLC polymer films having liquid crystal molecules arranged along helical axes normal to the surface of the film, and then fragmenting the CLC film into flat flakes or platelets of microscopic size and thereafter mixing them in a suitable carrier medium for application onto the surface of particular radiation absorbing substrate.

Another object is to provide a method of fabricating CLC-based microflakes using a mixture of polymerizable CLC, liquid crystal material and a photoinitiator, wherein during polymerization of the polymerizable CLC, the segregation rate of the liquid crystal material is constrained to be greater than the polymerization rate of the polymerizable CLC being polymerized.

Another object is to provide a method of fabricating broadband CLC microflakes, in a way which does not employ ultraviolet dye during the manufacture thereof.

Another object is to provide a method of fabricating broadband circularly polarizing reflective microflakes, wherein the polymerizable CLC being polymerized is exposed to a non-linear (e.g. exponential) intensity gradient of actinic (e.g. UV) radiation by virtue of light loss within the polymerizable CLC medium, thereby causing a non-linear variation in pitch of helices of the CLC molecules therein.

Another object is to provide a method of fabricating super broadband circularly polarizing reflective microflakes using commercially available constituent cholesteric liquid crystal polymers and liquid crystal material.

Another object of the present invention is to provide super-white CLC-based colorants comprising broadband circularly polarizing reflective microflakes which have helical axes normal to the surfaces thereof and different thickness which, when suspended in an optically transparent carrier medium and applied to a substrate, produce a coating which reflects broadband circularly polarized light falling incident thereon in a non-specular manner to produce a super-white color appearance in the eyes of onlooking observers akin to conventional Magnesium Oxide based paints and inks.

Another object of the present invention is to provide mirror-like CLC-based colorants comprising broadband circularly polarizing reflective microflakes which have helical axes normal to the surfaces thereof and different thickness which, when suspended in an optically transparent carrier medium and applied to a substrate, produce a coating which reflects broadband circularly polarized light falling incident thereon in a specular manner to produce a mirror-like color appearance in the eyes of onlooking observers akin to conventional plate-mirror surfaces.

Another object of the present invention is to provide a novel set of CLC-based paints and/or inks for forming on radiation absorbing substrates, images created from a palette of colors comprising super-white and the additive primary colors (i.e. pure red, pure green, and pure blue).

Another object of the present invention is to provide a novel coloring system comprising a set of CLC-based inks and paints that can be applied to radiation absorbing substrates at room temperature allowing artists, painters and the like to form images having super-white color characteristics similar to conventional Magnesium Oxide based inks and paints, and which after drying at room temperature, retain their remarkable color characteristics.

Another object of the present invention is to provide super-white ink and paint, in which the pigment is realized by broadband circularly-polarizing reflective microflakes made from CLC film material.

Another object of the present invention is to provide a novel method for making super-white CLC-based inks and paints containing double-layer CLC microflakes having highly symmetrical broadband reflection characteristics that enable reflection of 100% of ambient light in a non-specular manner to produce super-white color characteristics when viewed under prespecified lighting conditions.

Another object is to provide a method of fabricating CLC-based microflakes from broadband free-standing circularly polarizing reflective CLC film.

Another object of the present invention is to provide a novel method of making super-white CLC inks and paints that can be applied at room temperature and without the need for alignment or measures in order to impart non-specular reflecting properties thereto.

Another object of the present invention is to use such a novel coloring system in order to produce 3-D stereo images (prints, paints and plots).

Another object of the present invention is to provide super-white CLC pens, pencils, and crayons for painting and printing applications.

Another object of the present invention is to provide apparatus for generating a three-dimensional image including two unmultiplexed images in stereoscopic relationship with each other, wherein one of the images is produced using CLC ink (or paint) of the present invention that is reflects left-handed circularly polarized broadband light, while the other image is produced using CLC ink (or paint) of the present invention that is reflects right-handed circularly polarized broadband light.

Another object of the present invention is to provide a novel method and system for 3-D stereo printing, painting and plotting using the CLC-based inks and paints of the present invention to produce brighter and higher quality images than achievable using prior art materials and methods.

Another object of the present invention is to provide 3-D images that are produced by conventional printing and plotting means in conjunction with left hand and right hand polarizing CLC inks, paints or other transfer media.

An even further object of the present invention is to provide CLC-based toner material for use in conventional xerographic printers and copiers.

Another object of the present invention is to provide various types of CLC-based toner material for the xerographic printing of single-color monocular images, full-color monocular images, single-color stereoscopic images, and full-color monocular images.

Yet another object of the present invention is to provide a system and method producing secured documents by printing information contained therein with invisible polarization-selective inks or toner.

Another object of the present invention is to provide such a system and method of producing secured documents, in which the invisible polarization-selective inks or toner is made from CLC-based microflakes.

These and other objects of the present invention will become apparent hereinafter and in the claims to Invention.

BRIEF DESCRIPTION OF THE DRAWINGS

In order to more fully understand the Objects of the Invention, the following Detailed Description of the Illustrative Embodiments should be read in conjunction with the accompanying Drawings, wherein:

FIGS. 1A1, 1A2 and 1A3 set forth graphical representations of the very narrow band reflection characteristics of "ideal" (i.e. spectrally pure) blue, green and red CLC-based pigments, respectively;

FIG. 1B is a graphical representation of the spectral reflection characteristics produced by additively mixing together "ideal" (i.e. spectrally pure) blue, green and red CLC-based pigments to produce the color Magnesium-Oxide like white;

FIGS. 1C1, 1C2 and 1C3 set forth graphical representations of the relatively wide spectral band reflection characteristics of "real" (i.e. realizable) red, green and blue CLC-based pigments, respectively;

FIG. 2A1 is a schematic representation of a thin "non-specular reflective" coating of "additive-primary" coloring media of the present invention applied comprising spectrally-tuned CLC microflakes suspended within an optically transparent carrier medium applied to radiation absorbing substrate;

FIG. 2A2 is a schematic representation of a thin "quasi-specular reflective" coating of "additive-primary" coloring media of the present invention comprising spectrally-tuned CLC microflakes suspended within an optically transparent carrier medium applied to the surface of a radiation absorbing substrate;

FIG. 2B is a schematic representation of a CLC microflake of the first illustrative of the present invention suspended within the "additive-primary" coloring media coating of FIGS. 2A1 or 2A2, illustrating its double-layer laminated construction, wherein each layer is made from the same LHCP or RHCP CLC film material and each surface thereof has substantially the same circularly polarizing reflection characteristics over the visible band portion of the electromagnetic spectrum;

FIG. 2B1 is a schematic representation illustrating one possible pitch distribution of cholesteric liquid crystal molecules along the thickness dimension of an exemplary CLC microflake of a first illustrative embodiment having the double-laminated construction illustrated in FIG. 2B;

FIG. 2B2 is a graphical representation comparing the spectral reflection characteristics of the first and second surface of the spectrally-tuned LHCP (or RHCP) CLC film layers used to fabricate the CLC microflakes suspended within additive primary coloring media shown in FIG. 2B;

FIG. 2C is a schematic representation of a spectrally-tuned CLC microflake of the second embodiment of the present invention suspended within the "additive-primary" coloring media coating of FIGS. 2A1 or 2A2, illustrating its double-layer laminated construction, wherein the first CLC layer is made from a layer of RHCP CLC film material, the second CLC layer is made from a layer of LHCP CLC film material, and the first and surfaces thereof have substantially the same circularly polarizing reflection characteristics over the spectrally-tuned band portion of the electromagnetic spectrum;

FIG. 2C1 is a schematic representation illustrating one possible pitch distribution of cholesteric liquid crystal molecules along the thickness dimension of a first exemplary embodiment of the spectrally-tuned CLC microflake of the present invention having the double-layer laminated construction illustrated in FIG. 2C;

FIG. 2C2 is a graphical representation comparing the spectral reflection characteristics of the first and second surfaces of the spectrally-tuned RHCP and LHCP CLC film layers used to fabricate the spectrally-tuned CLC microflakes suspended within the additive primary coloring media shown in FIG. 2C;

FIG. 2D1 is a schematic representation of a spectrally-tuned CLC microflake of the third embodiment of the present invention suspended within the "additive-primary" coloring media coatings of FIGS. 2A1 or 2A2, illustrating its double-layer laminated construction, wherein the first CLC layer is made from a first layer of LHCP CLC film material having a first phase retardation surface formed therein, the second CLC layer is made from a second layer of LHCP CLC film material having a second phase retardation surface formed therein adjacent the first phase retardation surface, and the first and second surfaces thereof have substantially the same circularly polarizing reflection characteristics over the spectrally-tuned portion of the electromagnetic spectrum;

FIG. 2D2 is a schematic representation of a spectrally-tuned CLC microflake of the fourth embodiment of the present invention suspended within the "additive-primary" coloring media coatings of FIGS. 2A1 or 2A2, illustrating its double-layer laminated construction, wherein the first CLC layer is made from a first layer of RHCP CLC film material having a first phase retardation surface formed therein, and the second CLC layer is made from RHCP CLC film material having a second phase retardation surface formed therein adjacent the first phase retardation surface, and the first and second surfaces thereof have substantially the same circularly polarizing reflection characteristics over the spectrally-tuned band portion of the electromagnetic spectrum;

FIG. 2D3 is a graphical representation of the helical pitch variation of liquid crystal molecules along the thickness dimension of a first embodiment of the spectrally-tuned CLC microflake having the construction shown in FIGS. 2D1 or 2D2;

FIG. 2D4 is a graphical representation of the helical pitch variation of liquid crystal molecules along the thickness dimension of a second embodiment of the spectrally-tuned CLC microflake having the construction shown in FIGS. 2D1 or 2D2;

FIG. 2D5 is a graphical representation comparing the reflection characteristics of the first and second surfaces of the spectrally-tuned RHCP CLC layers used to fabricate the spectrally-tuned CLC microflakes used to fabricate the spectrally-tuned CLC microflakes illustrated in FIGS. 2D1 or 2D2;

FIG. 3A1 is a schematic representation of a thin "non-specular reflective" coating of "super-white" coloring media of the present invention comprising super broadband CLC microflakes suspended within an optically transparent carrier medium applied to a radiation absorbing substrate, and FIG. 3A2 is a schematic representation of a thin "quasi-specular reflective" coating of "mirror-like" coloring media of the present invention comprising super broadband CLC microflakes suspended within an optically transparent carrier medium applied to a radiation absorbing substrate;

FIG. 3B is a schematic representation of a super broadband CLC microflake of the first embodiment of the present invention suspended within the "super-white" and mirror-like coloring media coatings of FIGS. 3A1 and 3A2, illustrating its double-layer laminated construction, wherein each layer is made from the same LHCP or RHCP CLC film material and the external surfaces thereof have substantially the same circularly polarizing reflection characteristics over the visible band of the electromagnetic spectrum;

FIG. 3B1(A) is a schematic representation illustrating one possible pitch distribution of cholesteric liquid crystal molecules through the thickness dimension of a first exemplary super broadband LHCP CLC microflake having the double-layer laminated construction illustrated in FIG. 3B;

FIG. 3B1(B) is a schematic representation illustrating the pitch distribution of cholesteric liquid crystal molecules through the thickness dimension of a second exemplary super broadband RHCP CLC microflake having the double-layer laminated construction illustrated in FIG. 3B;

FIG. 3B2 is a graphical representation comparing the spectral reflection characteristics of the first and second surfaces of the super-broad band RHCP CLC film layers used to fabricate the super broadband CLC microflakes suspended within the super-white and mirror-like coloring media shown in FIGS. 3A1 and 3A2, for producing "super-white" and "mirror-like" color effects, respectively;

FIG. 3C is a schematic representation of a super broadband CLC microflake of the second embodiment of the present invention suspended within the "super-white" coloring media coating of FIGS. 3A or 3B, illustrating its double-layer laminated construction, wherein the first CLC layer thereof is made from a layer of super broadband RHCP CLC film material, the second CLC layer is made from a layer of super broadband LHCP CLC film material, and the first and surfaces thereof have substantially the same circularly polarizing reflection characteristics over the visible band portion of the electromagnetic spectrum;

FIG. 3C1(A) is a schematic representation illustrating the pitch distribution of cholesteric liquid crystal molecules along the thickness dimension of a first exemplary super broadband CLC microflake having the double-layer laminated construction illustrated in FIG. 2C;

FIG. 3C1(B) is a schematic representation illustrating the pitch distribution of cholesteric liquid crystal molecules along the thickness dimension of a second exemplary super broadband CLC microflake having the double-layer laminated construction illustrated in FIG. 2C;

FIG. 3C2 is a graphical representation comparing the spectral reflection characteristics of the first and second surface of the super broadband RHCP and LHCP CLC film layers used to fabricate the super broadband CLC microflakes suspended within the super-white and mirror-like coloring media shown in FIGS. 3A1 and 3A2, for producing "super-white" and mirror-like color effects, respectively;

FIG. 3D1 is a schematic representation of a super broadband CLC microflake of the third embodiment of the present invention suspended within the "super-white" and mirror-like coloring media coatings of FIGS. 3A and 3B, respectively, illustrating its double-layer laminated construction, wherein the first CLC layer thereof is made from a first layer of LHCP CLC film material having a first phase retardation surface formed therein, the second CLC layer thereof is made from a second layer of LHCP CLC film material having a second phase retardation surface formed therein, and the first and second surfaces thereof have substantially the same circularly polarizing reflection characteristics over the visible band portion of the electromagnetic spectrum;

FIG. 3D2 is a schematic representation of a super broadband CLC microflake of the fourth embodiment of the present invention suspended within the "super-white" or mirror-like coloring media coatings of FIGS. 3A and 3B, respectively, illustrating its double-layer laminated construction, wherein the first CLC layer is made from a first layer of RHCP CLC film material having a first phase retardation surface formed therein, the second CLC layer is made from a second layer of RHCP CLC film material having a second phase retardation surface formed therein, and the first and second surfaces thereof have substantially the same circularly polarizing reflection characteristics over the visible band portion of the electromagnetic spectrum;

FIG. 3D3 is a graphical representation of the helical pitch variation of liquid crystal molecules along the thickness dimension of a first embodiment of a super broadband CLC microflake hereof having the laminated construction shown in FIGS. 3D1 or 3D2;

FIG. 3D4 is a graphical representation of the helical pitch variation of liquid crystal molecules along the thickness dimension of a second embodiment of a super broadband CLC microflake hereof having the laminated construction shown in FIGS. 3D1 or 3D2;

FIG. 3D5 is a graphical representation comparing the reflection characteristics of the first and second surfaces of the first and second super broadband CLC layers comprising a super broadband CLC microflake used to fabricate the super broadband CLC microflakes of FIGS. 3D1 or 3D2 suspended within the super-white and mirror-like coloring media shown in FIGS. 3A1 and 3A2, for producing "super-white" and "mirror-like" color effects, respectively;

FIG. 4 is a schematic diagram of an adhesively-coated CLC microflake made for storage in a CLC toner cartridge utilizable in a conventional xerographic printer or copier;

FIG. 5 is a schematic diagram of CLC microflakes mixed with adhesive powder made for storage in a CLC toner cartridge utilizable in a conventional xerographic printer or copier;

DETAILED DESCRIPTION OF THE ILLUSTRATIVE EMBODIMENTS OF THE PRESENT INVENTION

Figure 1D:
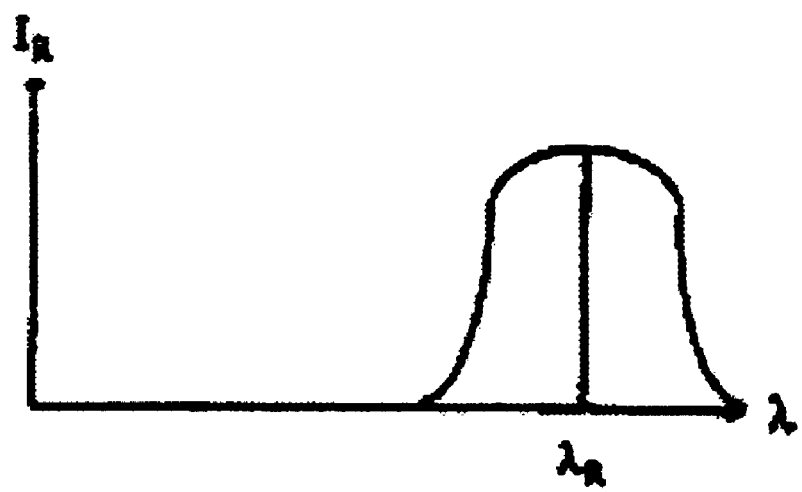
FIG. 1D is a graphical representation of the spectral reflection characteristics produced by additively mixing together "real" (i.e. realizable) red, green and blue CLC-based pigments to produce the yellowish-white color, markedly different than Magnesium Oxide white.

The illustrative embodiments of the present invention shall be described in connection with the accompanying Drawings, in which like structures and elements in the figures thereof shall be indicated by like reference numerals.
Overview on the Coloring Media of the Present Invention In general, the coloring media system of the present invention comprises (i) a plurality of sources of "additive primary" (i.e. "red", "green" and "blue") coloring media, and (ii) at least one source of "super-white" (i.e. Magnesium Oxide White) coloring media, each being fabricated in accordance with the principles of the present invention. The coloring media of the present invention may be realized in the form of paint, ink, crayon (wax or chalk), or any other form of media capable of being applied as thin coatings on radiation absorbing substrates (i.e. surfaces) so as to impart a broad range of color characteristics thereto, hitherto unachievable using prior art technologies.

Each type of coloring media (i.e. additive primary and super-white) comprises two primary subcomponents, namely: microscopically small flakes or platelets of non-absorbing light reflective film (referred to hereinafter as "reflective microflakes)"; and an optically transparent carrier (or host) material in which the microflakes are suspended prior to and after the carrier material has been applied to a radiation absorbing substrate and cured (i.e. dried). The primary difference between the inks, paints, chalk, wax and the like of the present invention resides in the particular properties of the optically transparent carrier medium used to carry and suspend the microflakes (i.e. pigments) of such applied coatings.

In the preferred embodiments of the present invention, each reflective microflake has a laminated construction consisting of two identical film layers laminated together to ensure that the reflection characteristics along the front and back surfaces of each microflake are virtually identical. By virtue of such symmetrical reflection characteristics, incident light of a particular band of wavelengths (and polarization state) is guaranteed to reflect the way and to the same degree at each location along an applied coloring media coating, independent of which surface of each microflake faces incident light. For the case of additive primary type coloring media, such symmetrical characteristics provide for improved color uniformity and apparent brightness of the applied coating thereof under uniform lighting conditions. For the case of super-white type coloring media, such symmetrical characteristics provide for improved whiteness and brightness uniformity under uniform lighting conditions.

When applied to a radiation absorbing substrate, the reflective microflakes suspended within the carrier medium stack up in either single or multiple layers depending on the thickness of the carrier medium. By virtue of the fact that the microflakes have either an irregular width and length dimensions or a shape, there is a natural tendency for many of the microflakes to not fall within a single plane, but instead to overlap each other and also to form interstices between the microflakes. Consequently, over each microscopically small region of applied coloring media coating hereof, there exists many surface discontinuities at each microflake layer. This causes incident light of a particular bandwidth to undergo non-specular reflection within the applied coating. In the case of super-white coloring media, such non-specular reflection characteristics are essential for an applied coating of super-broad band microflakes to impart "super-white" color characteristics under broadband visible lighting conditions. In the case of additive primary coloring media, such non-specular reflection characteristics are required for an applied coating of broadband microflakes to avoid producing "glare" with ultra-bright additive primary (i.e. red, green and blue) color effects. In the case of additive primary coloring media of the present invention, the front and back surfaces of each microflake have super-high reflection characteristics tuned over the particular region of the visible spectrum associated with the colors red, green or blue, as the case may be.

Super-white coloring media of the present invention has color characteristics similar to and as visually striking as conventional Magnesium Oxide inks and paints used in the visual and graphic arts. In general, the super-white coloring media of the present invention can be in either a liquid or solid state at room temperature when they are applied to substrates preferably having radiation absorbing characteristics. When applied as a thin coating to a radiation absorbing substrate at room temperature, and viewed under broadband lighting conditions, the coating exhibits super-white color characteristics similar to conventional Magnesium Oxide based inks and paints. When used with coloring media having additive primary color characteristics, artists, painters, computer-driven printers and the like can form images which, after drying at room temperature, retain remarkable color characteristics hitherto unattainable using prior art inks and paints taught in Applicant's prior U.S. Pat. No. 5,364,557.

When realized in the form of an ink or paint, the "super-white" and "additive primary" coloring media is in a liquid state at room temperature prior to application, and after applied as a coating and dried, exists in the form of a solid state coating. When realized in the form of a crayon (e.g. wax or chalk), the super-white and additive primary colorant hereof is in a solid state at room temperature prior to application, and after application as a coating, remains in its solid state at room temperature.

In general, a number of different film technologies can be used to realize the reflective microflakes of the present invention, in which the reflection characteristics along the front (top) and back (bottom) surfaces are substantially the same over the visible band. As will described in great detail hereinafter, broadband and super broadband cholesteric liquid crystal (CLC) film are the preferred materials for manufacturing reflective microflakes of the present invention having symmetrical reflection characteristics. It is understood, however, that there exist other types of broadband reflective film constructions that can be suitably used to carry out the broader aspects of the present invention disclosed herein without the use of CLC material. An example of a broadband reflective film construction not based on CLC material is disclosed in published International PCT Publication Number WO 95 95/17692 by the 3M Company. As disclosed therein, broadband reflective film can be constructed by laminating alternating layers of polymeric material having different refractive indices. The optical characteristics of the individual polymeric layers cause the multiple layer laminate to act as a reflecting polarizer that will transmit the polarization component of incident light that is correctly oriented with respect to its transmission axis.

Alternatively, suitable broadband film might be constructed using reflective material such as interference films, holographic reflective films (e.g. reflection-type volume holograms), and the like.

In the preferred illustrative embodiments, the coloring media hereof embodies CLC-based reflective microflakes (hereinafter "CLC microflakes") which are a species of the reflective microflakes described above. The coloring media is fabricated using a novel process comprising the steps of: (A) producing a laminated CLC film material having a thickness within a predetermined thickness range, and symmetrical polarization-reflection characteristics that are associated with the desired color to be produced (e.g. red, green, blue or super-white); (B) fracturing the laminated CLC film (either free-standing or on a support substrate) into laminated CLC microflakes of various dimensions; (C) selecting an optically transparent carrier (or host) medium for suspending the laminated CLC microflakes; and (D) adding the laminated CLC microflakes to the selected carrier medium in appropriate amounts in order to produce the desired coloring media.

The procedure for applying the coloring media to a substrate having absorption characteristics over the visible band involves carrying out the additional steps of: (E) preparing/treating the substrate (i.e. surface) to which the coloring media is to be applied; and (F) applying CLC Coloring media to the treated substrate. The CLC polymer films produced during Step A have liquid crystal molecules arranged along helical axes normal (transverse) to the surface of the film and thus each laminated CLC microflake produced during Step B also has liquid crystal molecules arranged along the helical axis normal to the surface of the film. Each of these Steps will be described in greater detail hereinbelow.

Manufacturing CLC Film Having Symmetrical Reflection Characteristics

While the preferred technique to be described below is for manufacturing broadband and super broadband CLC film having symmetrical polarization-selective reflection characteristics, it is understood that it also can be used to manufacture narrow-band film with symmetrical reflection characteristics. Moreover, this manufacturing technique is not limited to CLC-based film material but can be used in connection with: interference film of the type disclosed in, for example, in International PCT Publication Number WO 95 95/17692; holographic reflective film material; and the like.

Step A: Manufacturing CLC Film Having Symmetrical Polarization-selective Reflection Characteristics Using Unidirectional UV Illumination and Lamination Techniques Free-standing CLC film having symmetrical (polarization-selective) reflection characteristics can be made using the below described film fabrication method.

This method involves carrying out the following sequence of substeps, namely: (Substep A1) preparing a mixture of polymerizable (cross-linkable) liquid crystal film material; (Substep A2) treating the surface of the substrate upon which the liquid crystal material is to be deposited; (Substep A3) applying the liquid crystal material to the surface-treated substrate to provide a layer of polymerizable liquid crystal film thereon; (Substep A4) annealing the layer of liquid crystal film; (Substep A5) curing (i.e. polymerizing) the deposited layer of liquid crystal film material by (i) exposing one surface thereof to UV light so that a non-linear intensity is produced within the film; (Substep A6) removing the layer of cured liquid crystal film from the substrate to produce a first sheet of free-standing layer of cholesteric liquid crystal film having "asymmetrical" polarization reflection characteristics; (Substep A7) repeating Substeps (A2) through (A6) to produce a second sheet of free-standing layer of cholesteric liquid crystal film having "asymmetrical" polarization reflection characteristics similar to that of the first sheet of CLC film; and (Substep A8) laminating the first and second CLC film sheets together to form a laminated CLC film structure such that the first and second surfaces thereof each have the same or substantially the same polarization reflection characteristics.

Substep (A1): Preparing a Mixture of Liquid Crystal Material

The general method of fabricating the broadband circularly polarizing material of the present invention involves mixing together the following constituents: (i) a polymerizable liquid crystal material having a cholesteric order (e.g. side-chain cyclic liquid crystal polysiloxanes); (ii) a non-polymerizable material may or may not have a nematic liquid crystal order; and (iii) an amount of suitable photoinitiator which satisfies the above-described "super broadband" fabrication constraints. All the compounds are weighed according to a preset ratio and mixed thoroughly. After the liquid crystal material is mixed, it should be degassed in vacuum, preferably at an elevated temperature not to exceed 80° C. The purpose of the degassing process is to remove air trapped inside the mixed material.

In the illustrative embodiments of the present invention illustrated in the Examples 1–10 described herein, the "polymerizable" CLC materials used in the manufacturing process are commercially available from Wacker GmbH, Germany, whereas the non-polymerizable nematic liquid crystal materials for use with the above polymerizable CLC materials are commercially available from EM Industries, Germany, as E31LV and E7. When the polymerizable CLC materials are exposed to ultraviolet radiation in the presence of a photoinitiator, the polymerizable CLC materials are polymerized by way of a cationic polymerization process. The polymerizable CLC material is available in blue (CC4039L) and red (CC4070L) compounds. A first polymerizable CLC material is available in blue compounds (CC4039L) and (CC4039R) having a left-handed (LH) spiral structure and right-handed (RH) spiral structure, respectively. The second polymerizable CLC material is available in a red compound (CC4070L) having a left-handed (LH) spiral structure. The blue compound reflects LHCP light at 390 nm and the red compound reflects LHCP light at 690 nm after UV curing at 70° C. When the blue compound (CC4039R) is mixed with a left-handed polymerizable CLC, like CC4039L, in a suitable ratio, and cured at 70° C., then the resulting CLC film reflects RHCP light. Before curing, the raw CLC material exhibits a rubbery state at room temperature and turns to liquid at around 70° C.

Substep (A2): Treating the Substrate upon Which the Liquid Crystal Material is to be Deposited After the liquid crystal material is prepared, it is deposited upon the surface of a substrate. A variety of substrates are available for use in practicing the present invention including, for example, plain glass, ITO coated glass, plastic substrates, polyvinyl alcohol (PVA), PET, polycarbonate (PC), etc. However, prior to deposition, the substrate surface must be first cleaned via, e.g., ultrasonic bath, and thereafter an alignment layer (e.g. polyimide or SiO coating) must be applied to the cleaned surface. The function of the alignment layer is to force the liquid crystal molecules to align according to a desired molecular ordering (e.g., planar ordering) during the polymerization stage of the fabrication process. Three different surface treatment procedures will be described below.

When using a substrate such as plain glass, ITO coated glass, plastic substrates (e.g. PVA, PET, polycarbonate, etc), surface treatment can be carried out by applying an alignment layer in the form of a coating of polyimide (e.g., 7311SE from Nissan Chemical) to the surface of the substrate by way of spinning, dipping, offset printing, etc. After the coating is applied, the substrate surface is baked at an elevated temperature, e.g., 180° C. After baking, the coated substrate is mechanically rubbed in a manner known in the art.

When using a substrate made from plain glass or ITO coated glass, plastic substrates (e.g. Polyvinyl alcohol (PVA), PET, Polycarbonate (PC), etc.), then surface treatment can be carried out by first cleaning the surface of the substrate, and then obliquely depositing, in vacuum, an alignment layer in the form of a thin coating of SiO deposited upon the surface of the substrate.

When using suitable substrates made from plastic, then substrate treatment can be carried out by first cleaning the surface thereof, and then mechanically rubbing the same in the manner known in the art.

Substep (A3): Applying the Liquid Crystal Material to the Treated Substrate in Order to Provide a Layer of Polymerizable Liquid Crystal Film on the Substrate In general, a variety of different techniques may be used to apply the liquid crystal material to the treated substrate in order to provide a layer of polymerizable liquid crystal film on the substrate. Any one of the film forming techniques described below can be used for this purpose.

Providing a Layer of Polymerizable Liquid Crystal Film on the Treated Substrate by Filling Liquid Crystal Material in a Vacuum Chamber The classical method used to manufacture LCD panels can be used to provide a thin layer of polymerizable liquid crystal film on the treated substrate. This method involves making a open-ended "hollow cell" by placing spacers (e.g. realized as beads, optical fiber, or mylar) of desired thickness between a pair of surface-treated substrates. Once constructed, the cell is sealed with a proper epoxy (e.g., UV glue) around its three edges, leaving one side open for carrying out liquid crystal filling operations. Thereafter, the cell and prepared liquid crystal mixture are placed inside a vacuum chamber in a separated relationship, and then the vacuum chamber is evacuated to a point where a sufficient vacuum is reached, such as $10^{-2}$ Torr. At this stage, the open side of the cell is merged into the liquid crystal mixture and then the vacuum valve is released, allowing air to be introduced into the vacuum chamber. This causes the liquid crystal mixture to flow into the cell due to the pressure difference existing on the inside and outside thereof, to provide a layer of polymerizable liquid crystal film on the treated substrate surfaces of the cell.

Providing a Layer of Polymerizable Liquid Crystal Film on the Treated Substrate by Filling Liquid Crystal Material by Capillary Action Prior to liquid crystal filling operations, a hollow cell is made from a pair of surface treated substrates in a manner similar to the method described above. The cell thickness is controlled using spacers in the same way described above. The primary difference of this technique is that the two opposite sides of the cell, or all the four edges thereof, must be open. After the cell is constructed and sealed, the cell is placed on a hot plate and heat to a suitable temperature. In some examples of manufacture, room-temperature will be suitable for this technique. When properly heated, the liquid crystal mixture is brought into physical contact with one of the cell edges. Due to capillary effect, the liquid crystal material is sucked into the cell to provide a layer of polymerizable liquid crystal film on the treated substrate surfaces of the cell.

Providing a Layer of Polymerizable Liquid Crystal Film on the Treated Substrate by Sandwiching Film in a Vacuum According to this method, a layer of liquid crystal material is spread evenly onto the treated surface of a first (glass or plastic) substrate. Thereafter, the substrate with the liquid crystal layer is placed inside a vacuum chambered oven, along with a second substrate with a treated surface. The treated surface of the second substrate should be supported above liquid crystal layer on the first substrate surface, by way of a suitable support mechanism controllable by means disposed outside the vacuum chamber. The interior temperature of the oven is then increased until the liquid crystal material has achieved a desirably low viscosity. At this stage, the vacuum chamber is evacuated and thereafter the second substrate is allowed to fall down directly on top of the liquid crystal layer disposed upon the treated surface of the first substrate. A sufficient time is then allowed to lapsed in order to allow the two treated substrates to make contact with the liquid crystal material sandwiches therebetween. Finally, the vacuum within the oven is slowly removed until the pressure within the oven reaches an ambient pressure. Using this method, large size sheets of liquid crystal material can be provided to a treated substrate.

Providing a Layer of Polymerizable Liquid Crystal Material on a Treated Substrate by Lamination This method is extremely suitable for plastic-plastic or plastic-glass substrates. According to this technique, substrates with treated surface are prepared. Then the liquid crystal mixture is applied at one edge of a first substrate which can be made of either plastic or glass material. The first substrate is then covered with a second substrate, with the applied liquid crystal mixture disposed therebetween at one end thereof. The first and second substrates are then passed through a laminator whose gap has been adjusted to the desired value to achieve a suitable thickness of liquid crystal material between the pair of laminated substrates.

Providing a Layer of Polymerizable Liquid Crystal Film on the Treated Substrate by Roller Coater This method is similar to the lamination method described above in that two substrates (preferably, plastic-plastic or plastic-glass) with treated surfaces are prepared. Then liquid crystal mixture is applied at one of the edges of the first substrate. Then, the treated surface of the second substrate is placed on top of the treated surface of the first substrate. Then a platform with a flat and smooth surface, such as a glass plate, is placed over the second substrate and then a roller is rolled over the sample beginning at the edge with liquid crystal mixture sandwiches therebetween. The roller pressure can be adjusted to the desired value to achieve a suitable thickness of liquid crystal material between the pair of substrates.

Providing a Layer of Polymerizable Liquid Crystal Film on the Substrate by Knife Coating This technique employs a pair of surface treated substrates which can be realized using any combination of materials (e.g. plastic-plastic, plastic-glass, and glass-glass combinations). After the surfaces of the substrates are treated in the manner described above, a thin uniform film of liquid crystal material is evenly applied to the treated surface of the first substrate using a knife coating technique, described and illustrated in Applicant's U.S. Pat. No. 5,364, 557, supra. Thereafter, the treated surface of the second substrate is placed on top of the applied liquid crystal film using any one of the techniques described above.

Substep (A4): Annealing the Layer of Liquid Crystal Film Deposited on the Substrate Typically, the liquid crystal layer applied during Substep (A3) will require temperature treatment (i.e. "annealing") for a certain time period at a desired temperature in order that the liquid crystal film attains a good planar alignment texture. The annealing temperature can be chosen so that the texture of the liquid crystal film is highly planar and has a viscosity as low as possible. The annealing time can range from several minutes to hours, depending on the liquid crystal material used. Before polymerization, the liquid crystal film will typically exhibit narrow-band reflection characteristics with a bandpass from 50 nm to 80 nm in the visible region of the electromagnetic spectrum.

Substep (A5): Curing the Layer of Polymerizable Liquid Crystal Film Deposited on the Treated Substrate by way of Unidirectional UV Exposure When the polymerizable liquid crystal film has attained a perfect planar texture on the surface-treated substrate, it is then ready to be cured through polymerization (i.e. cross-linking) of the polymerizable CLC material component of the applied film. In the second embodiment of the CLC film fabrication process hereof, polymerization is achieved by exposing one surface thereof to UV light so that a non-linear intensity gradient is produced within the film. The UV intensity should be such chosen that a phase separation and molecular diffusion and redistribution of the non-cross-linkable compound is guaranteed before the completion of the polymerizable compound. After the polymerization seizes, a first sheet of broadband CLC polarizing film is obtained with "asymmetrical" polarization reflection characteristics over the whole visible range of the electromagnetic spectrum.

Substep (A6): Removing Substrate from the Cured Layer of Liquid Crystal Film

After the first sheet of liquid crystal film is cured, it is necessary to remove it from its substrate(s) and produce free standing broadband CLC film. Free-standing broadband CLC film can be obtained by: mechanically pealing the film off it support substrate; physical dissolving the substrate; chemical etching the substrate; or the like. These techniques are generally well known in the art and need not be described in further detail. After completion of this step, a first sheet of CLC film is provided having symmetrical polarization reflection characteristics.

Substep (A7): Repeating Substeps (A2) through (A6) to Produce a Second Sheet of Cured CLC Film Having Symmetrical Polarization Reflection Characteristics.

At this stage, Substeps (A2) through (A6) are repeated in order to produce a second sheet of cured CLC film having symmetrical polarization reflection characteristics similar to the first sheet thereof.

Substep (A8): Laminating First and Second CLC Film Layers Having Asymmetrical Polarization Reflection Characteristics to Produce a Laminated Structure Having Symmetrical Polarization Reflection Characteristics As discussed in the Background of Invention hereof, it has been discovered by Applicants that, in general, the front (i.e. top) surface of polymerizable CLC film which is directly illuminated with a non-linear UV light intensity during the curing stage of the film fabrication process hereof will exhibit super "broadband" polarization characteristics, whereas the opposing back surface that is not directly illuminated thereby will exhibit different polarization reflection characteristics in terms of either in reflectivity or spectral bandwidth. As used hereinafter, cured CLC film having such polarization reflection characteristics shall be referred to as CLC film having "asymmetrical" reflection characteristics. Cured CLC film having asymmetrical characteristics is not ideal for use in making CLC coloring media of the present invention as there is a 50% chance that the top surface of any CLC microflake made from such material will be facing upwardly towards the surface of a CLC coating applied to a substrate that is illuminated by ambient white light during normal usage. Consequently, CLC coloring media made from "asymmetrical" CLC film is not as bright as would be ideally desired in most coloring applications because both the front and back surfaces of each CLC microflake thereof are "broadband surfaces" having different spectral characteristics.

In order to compensate for the shortcomings and drawbacks of such "asymmetrical" CLC film, the method of fabricating "symmetrical" broadband CLC film according to the present invention teaches at this stage of the process, bringing the back surface of the first sheet of cured CLC film into contact with the back surface of the second sheet of cured CLC film while the two sheets are being laminated together in using conventional lamination techniques. During lamination, it will be desired to use optically clear and isotropic adhesives having indices of refraction matched to the laminated sheets of asymmetrical CLC film. Preferably, such adhesives are non-birefringent and non-absorptive. Each surface of the resulting laminated CLC film structure will have either the same or substantially the same polarization reflection characteristics, thus will be ideal for use in the fabrication of the CLC pigments of the CLC coloring media of the present invention.

Specifying Color Characteristics of Symmetrical CLC Film by Controlling the Bandwidth and Spectral Position Thereof During the Film Fabrication Processes Described Above In Step (A) and Step (A') above, two different techniques have been disclosed in great detail for fabricating super broadband and broadband CLC film having "symmetrical" polarization reflection characteristics. Such techniques can be used to fabricate symmetrical broadband CLC film for "additive-primary" as well as "super-white" CLC coloring media of the present invention. When making super-white CLC coloring media of the present invention, it is necessary to ensure that the reflection bandwidth of the broadband circularly polarizing film material resides within the visible band of the electromagnetic spectrum (i.e. 350 to 750 nm). Similarly, when making additive-primary CLC coloring media of the present invention, imparting additive-primary color characteristics (e.g red, green, blue) to incident light reflected therefrom, it is necessary to ensure that the reflection characteristics of such CLC films reside within the respective (e.g. red, green or blue) portions of the visible spectrum.

In general, the bandwidth as well as the spectral position (i.e. "tuning") of the CLC film material of the present application can be controlled in a number of ways, for a variety of purposes during the film fabrication processes described above (e.g. for imparting color characteristics to the CLC pigments hereof, designing the filtering characteristics of the polarizers hereof, etc.). For example, the spectral and thus "color" characteristics of such CLC film can be controllably tuned by: selection of starting CLC polymer; controlling the intensity of UV light used to cure the CLC polymer film deposited on the substrate; controlling the direction of the UV light used during curing of the CLC polymer film; controlling the intensity gradient of the UV light used during curing; controlling the temperature gradient during curing of the CLC polymer film; and/or controlling the concentration of the nematic polymer, chiral polymer, photoinitiator, dye, etc. used in making the starting CLC polymer material; etc. The details of these different spectral-tuning techniques will be described below.

Controlling the Spectral Bandwidth of the Circularly Polarizing Film Material Hereof by Controlling the Thickness Thereof The first approach controls the spectral bandwidth of the circularly polarizing film material hereof by controlling the thickness thereof. For example, using the materials E31/CC4039L=1:2 by weight with 0.6% IG184, the polarizer bandwidth can be increased from 580 nm to 800 nm when the film thickness is changed from 5 to 20 microns. Thereafter, the polarizer films are cured under a UV intensity of 0.047 mW/cm2 at 92° C.

Controlling the Spectral Bandwidth of the Circularly Polarizing Film Material Hereof by Changing the Concentration of the Chiral Additive The second approach controls the spectral bandwidth of the circularly polarizing film material hereof by changing the concentration of the chiral additive. For example, using the material E31/CC4039L=1:2 by weight with 0.6% IG184, with a film thickness of 20 microns, the polarizer film is cured under a UV intensity of 0.047 mW/cm2 at 70° C. When the S1011 chiral additive concentration is increased from 0 to 6.6% by weight, the bandwidth is decreased from 980 nm to 460 nm. In addition, with the increase in the chiral concentration, the center wavelength has a "blue" shift toward to shorter wavelength.

Controlling the Reflection/Polarizing Spectrum by Changing the Curing Temperature The third approach controls the spectral bandwidth of the circularly polarizing film material hereof by controlling the curing temperature. The following examples are given to further illustrate this method.

According to a first example, a liquid crystal mixture is prepared containing the components CC4039L: E44: 1184= 4:0.69:.22:0.33:0.63. The intensity of the UV light using during curing is about 0.02 mW/cm2. During, the broadband CLC center wavelength changes from 610 to 700 then to 550 microns, and the bandwidth changes from 420 microns to 700 then 400 microns, respectively, when the temperature is varied from 60 to 90° C. then to 100° C.

According to another example, a liquid crystal mixture is prepared by mixing E31/CC4039L=1:2 by weight with 0.6% IG184. Film samples having a film thickness of 20 microns were cured under a UV light source having an intensity of 0.047 mW/cm2. When the curing temperature was lowered from 92° C. to 700° C., the center wavelength underwent a "red" shift toward a longer wavelength.

Controlling the Polarizing/Reflection Spectrum by Changing the Photoinitiator Concentration.

The fifth approach involves controlling the spectral bandwidth of the circularly polarizing film material hereof by changing the photoinitiator concentration. For example, liquid crystal mixture was formed by mixing materials E31/CC4039L=1:2 by weight, and forming a film having a thickness of 20 microns. The film samples were cured under a UV light source having an intensity of 0.047 mW/cm2, at a temperature of 920° C. In this case, increasing the photoinitiator (IG184) concentration from 1% to 2% decreases the bandwidth of the polarizing reflecting film from 1050 to 850 microns.

Controlling the Polarizing/Reflection Spectrum by Selection of Starting CLC Polymer Material The sixth approach involves controlling the spectral bandwidth of the circularly polarizing film material hereof by selection of the starting polymer materials in cholesteric order. Specifically, the starting CLC polymer is selected to have a particular short(er) pitch value so that the final BROADBAND CLC will have a "blue" shift in the polarizing wavelength. This technique can be illustrated by way of the following example.

Two CLC polysiloxanes (CC4039L and CC4070L) from Wacker are mixed with E7 nematic liquid crystal to produce two different liquid crystal mixtures. The mixtures are CC4039L (CC4070L)/E31LV=2:1 by weight with 0.6% 184 photoinitiator. The left handed polysiloxane CC4039L reflects at 390 nm while the CC4070L reflects at 700 nm, respectively. Film of 20 micron thickness is made from each of the mixtures and then cured at a temperature of 92° C. with the a UV light source having the same light intensity of 0.047 mW/cm$^2$. The cured CLC film containing the shorter pitch polysiloxane CC4039L reflects in a shorter wavelength region from 370 nm to 1200 nm; while the cured CLC film containing the longer pitch polysiloxane CC4070L reflects in a longer wavelength region, from 560 to 2160 nm.

Controlling the Polarizing/Reflection Spectrum by Changing the Intensity of the UV Curing Light The seventh approach involves controlling the spectral bandwidth of the circularly polarizing film material hereof by changing the intensity of the UV curing light source. To the extent that polymerization rate is linked to the intensity of incident UV radiation, when a nematic such as E7 is used with a CLC material such as CC4039L in a ratio of 1/2, the bandwidth of the resulting polarizer decreases as the UV intensity increases. At an intensity of 0.47 mW/cm$^2$, the resulting bandwidth is 980 nm. At an intensity of 0.97 mW/cm$^2$, the resulting bandwidth is 700 if cured at 92° C., and if cured at 92° C. at 7.1 mW/cm$^2$, the resulting bandwidth is 280 nm. These results clearly indicate that the bandwidth can be controlled by controlling the intensity of UV radiation during film curing.

Controlling the Polarizing/Reflection Spectrum by Changing the Direction of the UV Curing Light The eighth approach involves controlling the spectral bandwidth of the circularly polarizing film material hereof by changing the direction of the UV light source during curing. According to this mechanism, the UV gradient inside the film along the surface normal is selectively modified. By maintaining the total UV intensity inside a CLC film substantially constant, the single UV curing beam results in a wider reflection bandwidth than the double beam curing fashion.

Controlling the Polarizing/Reflection Spectrum by Changing the Concentration of Nematic Liquid Crystals The ninth approach involves controlling the spectral bandwidth of the circularly polarizing film material hereof by changing the concentration of the nematic liquid crystals in the raw starting mixture. This technique can be demonstrated as follows. For example, using a liquid crystal mixture consisting of E31 in CC4039L with a 0.6% IG184 photoinitiator with respect to the CC4039L compound, different mixtures are filled into 20 micron glass cells with rubbed polyimide coatings. All the samples are cured at 92° C. by a UV light source having an intensity of 0.047 mW/cm2. By changing the concentration of nematic liquid crystals (E31) in the raw starting mixture, the bandwidth of the resulting CLC films can be increased.

Controlling the Polarizing/Reflection Spectrum by Adding Different Types of Nematic Additives The tenth approach involves controlling the spectral bandwidth of the circularly polarizing film material hereof by adding different types of nematic additives. For example, it has been found that different types of nematic additives result in CLC film having a different bandwidth when added in the same concentration with polysiloxane. In particular, it has been found that additives E7, E31, E44, K15, K24, M15 widen the bandwidth. However, it has been found that nematic additives such as ZLI-2309, ZLI-5800-100 do not widen the bandwidth.

Controlling the Polarizing/Reflection Spectrum by Adding Different Types of Chiral Additives The eleventh approach involves controlling the spectral bandwidth of the circularly polarizing film material hereof by adding different types of chiral additives (having different "twisting power"). As an example of this technique, it has been found that given the same mixture containing CC4039R and E31, the addition of the same amount chirals (R1011, CE1, CB15) yields broadband CLC film having different spectral characteristics. As a further example, in a given CC4039R and E7 mixture, the chiral is separately mixed. For example, if the final pitch of each mixture before curing, i.e., CC4039R/E7/R1011, CC4039R/E7/CE1, and CC4039R/E7/CB15, is tuned to be the same. The final spectral characteristics thereof are different when the three CLC films are cured under the same conditions.

EXAMPLES OF CLC FILM FABRICATION

In the following examples of CLC film fabrication to be described in detail below, the polymerizable CLC, the nematic liquid crystal material, the photoinitiator (and in one example, a chiral additive) were weighed in a desired ratio and mixed together on a hot plate or equivalent device. In each example, the CLC mixture was introduced into a glass cell that had a buffed polyimide coating for better molecular alignment. Finally, the mixture was cured (e.g. polymerized) at a selected temperature by exposing the mixture to actinic light for a time sufficient to permit polymerization to go to completion. The actinic radiation (UV radiation) used to polymerize the CLC film material, exhibits a non-linear (e.g. exponential) intensity distribution within the CLC film or layer being cured, rather than the linear intensity distribution used during prior art fabrication processes. This is due to light attenuation caused by the materials used to make the CLC mixture layer. Apart from the above, the non-crosslinkable liquid crystal material may be in the liquid state in the finally formed polarizers after UV curing.

After mixing at a temperature which keeps the materials in a liquid state and before polymerization, the nematic liquid crystal material is weakly bound to the polymerizable CLC material. In response to actinic radiation exposure, polymerization causes the weakly bound liquid crystals to segregate from the polymerizable CLC and begin to diffuse. The nematic liquid crystal material diffuses to swollen regions of the polymerizable CLC forming liquid crystal-rich sites. The departure of liquid crystal from other regions of the polymerizable CLC leaves liquid crystal-depleted sites. Because the radiation intensity is non-linear (more specifically, exponential) in character throughout the medium and the higher intensity regions of polymerizable CLC are more swollen than lower intensity regions, the nematic liquid crystal material diffuses preferentially to sites of higher radiation intensity and assumes a non-linear distribution in the polymer CLC material. Advantageously, the super broadband polarizing film hereof can be made using commercially available materials provided that the segregation rate of the (nematic) liquid crystal material is greater than the polymerization rate of the CLC material being polymerized.

In Examples 1 through 10, the method of "symmetrical" CLC film fabrication described above (employing lamination subprocesses) has been used to produce the same. It is understood, however, that other methods can be used to produce the "symmetrical" reflective film of the present invention.

Example 1

In this example, a method is described for fabricating broadband CLC circularly polarizing film material for use in making the CLC-based microflakes of the present invention. The red compound of CLC polysiloxane (CC4070L) mentioned above is blended with E31 nematic liquid crystal, also mentioned above. The red CC4070L has a left-handed twist sense and reflects at 690 nm when cured at 70° C. The mixture contains E31/CC4070L in a ratio of 1/2 by weight with 0.6% 1G184 photoinitiator by weight. Photoinitiator IG184 is commercially available from Ciba Geigy, Hawthorne, N.Y. The mixture is introduced into a 20 micron glass cell and cured at an ultraviolet intensity of 0.047 mW/cm2 at a temperature, provided by a hot plate, of 92° C. In this example, only the CLC polysiloxane material is polymerized while the nematic liquid crystal remains in the liquid state. After polymerization, spectral analysis of the resulting circularly polarizing film material was carried out on a Perkin-Elmer, Lambda 19 spectrophotometer. Both transmission and reflection spectra were taken with the left-hand, right-hand and unpolarized light. The resulting polarizing film covered a spectral band pass from 560 nm to 2160 nm providing CLC-based polarizing reflecting film having a super-broad bandwidth of 1600 nm.

Example 2

In this example, a method is described for fabricating broadband CLC circularly polarizing film material for use in making the CLC-based microflakes of the present invention. In this example, the blue compound of CLC polysiloxane (CC 4039L) and nematic liquid crystal (E31) are mixed in a ratio of 2:1 by weight along with photoinitiator (IG184) of 0.6% by weight. A 20 micron glass cell is used to provide a film of that thickness. The CLC is cured by a UV lamp of 0.047 mW/cm2 at 92° C. The resulting polarizing layer covered a spectral band pass from 370 nm to 1,200 nm providing a super bandwidth polarizer of 830 nm, covering the whole visible and near IR spectral band. As with Example 1, the liquid crystal material (E31) remains in the liquid state after curing. After polymerization (i.e. curing), spectral analysis of the resulting circularly polarizing film material was carried out on a Perkin-Elmer, Lambda 19 spectrophotometer. Both transmission and reflection spectra were taken with the left-hand, right-hand and unpolarized light.

Example 3

In this example, a method is described for fabricating broadband CLC circularly polarizing film material for use in making the CLC-based microflakes of the present invention. The two previous examples utilized CLC polysiloxanes which had a left-handed twist sense. In this third example, a CLC polysiloxane having a right-handed helical (twist) sense is utilized. A blue compound (CC4070R) with such a twist sense is commercially available from Wacker, GmbH, Germany and reflects right-handed circular light at 390 nm when cured at 70° C. A nematic liquid crystal material (M15) commercially available from EM Industries, Germany, is mixed with the CLC polysiloxane material (CC 4039R) in a ratio of 1:2 by weight with 1% IG184 photoinitiator by weight. The mixture is sandwiches between the plates of a 20 micron glass cell and cured at a UV intensity of 0.047 mW/cm2 at 122° C. The resulting circularly polarizing film material reflective of right-hand circularly polarized light, covered a spectral band pass from 520 nm to 920 nm providing a super-broad bandwidth polarizer of 400 nm. After curing (i.e. polymerization), the non-polymerizable liquid crystal (M-15) is in the solid state at room temperature. After polymerization, spectral analysis of the resulting samples was carried out on a Perkin-Elmer, Lambda 19 spectrophotometer. Both transmission and reflection spectra were taken with the left-hand, right-hand and unpolarized light.

Example 4

In this example, a method is described for fabricating broadband CLC circularly polarizing film material for use in making the CLC-based microflakes of the present invention. In this example, the material utilized contains non-polymerizable nematics plus chiral additive mixed with the polymerizable nematic liquid crystal. The non-polymerizable nematic materials are E31 and ZLI-2309. The chiral additive is S1011. All of these materials are commercially available from EM Industries, Germany. The chiral additive induces a left-handed spiral structure in the mixture. E31/ZLI-2309/S1011 are mixed together in a ratio of 1/1/0.2 by weight. This mixture is then mixed again with a polymerizable nematic liquid crystal polymer material CN 4000 in a ratio of 1:2 by weight. CN 4000 is commercially available from Wacker GmbH, Germany. The mixture along with a photoinitiator IG184 of 0.6% by weight is introduced into a cell formed from two pieces of rubbed polyimide coated glass substrates 20 microns apart and cured at a UV intensity of 0.047 mW/cm2 at a temperature of 70° C. Here this nematic liquid crystal material CN4000, polymerizes while the low molecular weight chiral nematic material remains in the liquid state. As with all other examples of the present invention, the segregation rate of the non-polarizable liquid crystal material is greater than the polymerization rate of the polymerizable liquid crystal material. The resulting circularly polarizing film material reflects left-handed circularly polarized radiation and covers a spectral band pass from 430 nm to 1050 nm providing CLC-Based polarizing reflecting film having a broad bandwidth of 620 nm. After polymerization, spectral analysis of the resulting circularly polarizing film material was carried out on a Perkin-Elmer, Lambda 19 spectrophotometer. Both transmission and reflection spectra were taken with the left-hand, right-hand and unpolarized light.

Example 5

In this example, a method is described for fabricating broadband CLC circularly polarizing film material for use in making the CLC-based microflakes of the present invention. In this example, the mixture consists of cross-linkable siloxane polymer in nematic order and chiral additive plus photoinitiator (IG184). Notably, no non-cross-linkable nematic liquid crystals (such as E31) are added. The siloxane nematic polymer (CN 4000) is from Wacker (German). The chiral additive consists of R1011, CB15, and CE1 (all from Merck, EMI). The mixture is CN4000/R1011/CB15/CE1/IG184=0.75:0.03:0.11:0.11:0.017, by weight. The mixture was then filled into a 20 micron glass cell with rubbed polyimide coating. After subjected to a UV exposure of around 0.2 mW/cm2 for a sufficient time at a temperature of 80° C., broadband reflective polarizing film was obtained which has a bandwidth from 360 to 750 nm. Since the chiral additive has a right-handed sense, this CLC polarizing film reflects right-handed circular polarization light. The imporance of this example is that non-cross-linkable low molecular weight nematic liquid crystals are not necessarily needed to create broadband circularly polarizing film material, in accordance with the teachings of the present invention. A nematic liquid crystal polymer mixed simply with chiral additive will create a similar super-broadband polarizer. The same mechanism, i.e., polymerization induced molecular re-distribution (PIMRD), is still valid in this example. Since all the components of the chiral additive (i.e., R1011, CB15, CE1) are non-cross-linkable, the chiral molecules experience a phase separation and segregation from the nematic polymer network during polymerization. The segregated chiral molecules start to diffuse along the UV propagation direction, resulting in an accumulation and depletion of the chiral molecules in sites where the CLC pitch get shorter and longer, respectively. Finally, a pitch gradient is formed. Notably, the chiral additive is in a plural compound format. As evidenced by a separate experiment, two of the chiral compounds, i.e., CB15 and CE1, are phase separated from the liquid crystal polymer network and diffuse along the UV propagation direction during polymerization. However, the third chiral compound, R1011, does not show obvious evidence of phase separation and diffusion. After polymerization, spectral analysis of the resulting circularly polarizing film material was carried out on a Perkin-Elmer, Lambda 19 spectrophotometer. Both transmission and reflection spectra were taken with the left-hand, right-hand and unpolarized light.

Example 6

In this example, a method is described for fabricating the super-broadband CLC circularity polarizing material on a plastic substrate, which, possibly, has one surface free of substrate. The liquid crystal mixture used in this example can be any one mentioned throughout this application. The typical plastic substrate used is PET. The PET surface may or may not be necessarily treated with a rubbed polyimide coating. If no polyimide coating is required, the whole manufacture process becomes much simpler. The only treatment required of the PET substrate is mechanical rubbing its bare surface. The CLC mixture is applied onto one of the plastic substrate, then covered with a second PET sheet. Thereafter, the whole package is fed into a laminator at a suitable temperature. After lamination, a uniform CLC film is obtained between of the two pieces of plastic sheet material. The film is then subjected to a UV exposure with a suitable intensity for a sufficiently long time at a temperature of 80° C. A super-broadband CLC polarizer is obtained between plastic sheets. The optical property, including the extinction ratio, is similar to that between two glass substrates with rubbed polyimide. Finally, one of the plastic substrates can be pealed off so that one surface is free of substrate. The above-described method has the following advantages: (1) the overall polarizer thickness can be dramatically reduced to 0.25 mm due to the very thin plastic sheets; (2) the polarizer is mechanically flexible; (3) the manufacture procedure is simple; (4) larger size polarizer can be made; and (5) cost is substantially reduced. After polymerization, spectral analysis of the resulting circularly polarizing film material was carried out on a Perkin-Elmer, Lambda 19 spectrophotometer. Both transmission and reflection spectra were taken with the left-hand, right-hand and unpolarized light.

Example 7

In this example, broadband CLC circularly polarizing film material is made using a newly developed short pitch CLC liquid crystal polymer. This material (code name is CLM001CC, from Wacker, German) reflects left-handed circular polarization light at a selective reflection wavelength 309 nm. Once mixed with suitable amount of photoinitiator (such as IG184, Ciba Geigy), the CLC material can be UV polymerized. In order to make broadband polarizing film material, the short pitch polymerizable CLC material is mixed with a low molecular weight non-crosslinkable nematic material E7 (EMI). The material composition for broadband polarizer is CLM001CC/E7/IG184= 0.157/0.065/0.0047 by weight. The mixture is filled into a 20 micron glass cell with a rubbed polyimide coating. After exposed to a suitable UV intensity for a sufficient time at 70° C., a broadband CLC polarizing reflecting film has been obtained which reflects almost 50% of an un-polarized light from 370 nm to 850 nm. Similar result has been obtained by mixing other non-cross-linkable nematic liquid crystals, such as M15 (Merck), E44, K15 and K24 etc. After polymerization, spectral analysis of the resulting samples was carried out on a Perkin-Elmer, Lambda 19 spectrophotometer. Both transmission and reflection spectra were taken with the left-hand, right-hand and unpolarized light.

Example 8

In this example, a method is described for fabricating free standing broadband CLC circularly polarizing film material. The material mixture contains CLM001CC/M15/IG184=2/1/0.06 by weight. The mixture was filled into a 20 micron glass cell with a rubbed polyimide. The sample was cured at 80° C. by a UV intensity of 0.011 mW/cm2. The resulted film reflects from 370 nm to 770 nm. After polymerization and while supported on the glass substrate, spectral analysis of the resulting circularly polarizing film material was carried out on a Perkin-Elmer, Lambda 19 spectrophotometer. Both transmission and reflection spectra were taken with the left-hand, right-hand and unpolarized light. Thereafter, one of the glass substrate was mechanically removed. Next, the broadband film was pealed away from the remaining glass substrate. A free standing broadband polarizing film has been obtained. The film spectra before and after pealing demonstrates that the optical property of the free standing broadband polarizing film has not been changed.

Example 9

In this example, the CLC material utilized is a left-handed polymerizable polysiloxane CLC (CC4039L) commercially available from Wacker, GbmH, Germany mixed with a non-polymerizable nematic E7 and a chiral additive R1011 both of which are commercially available from EM Industries, Germany. The polymerizable CLC material (CC4039L) has a left-handed twist structure while the chiral additive (R1011) has a right-handed twist structure. The materials E7/CC4039L/R1011/IG184 are present in a mixture in ratios of 1/2/0.1/0.012 by weight. IG184 is a photoinitiator. The mixture was introduced into a 20 micron thick glass cell with a rubbed polyimide coating and was cured at a UV intensity of 0.047 mW/cm2 at 82° C. In this example, the cholesteric liquid crystal material (CC4039L) polymerizes while the nematic (E7) remains in the liquid state after curing. As with the other examples, the segregation rate of the non-polymerizable liquid crystal is greater than the polymerization rate of the polysiloxane. After polymerization, spectral analysis of the resulting samples was carried out on a Perkin-Elmer, Lambda 19 spectrophotometer. Both transmission and reflection spectra were taken with the left-hand, right-hand and unpolarized light. The resulting CLC circularly polarizing film reflects left-handed circularly polarized radiation and covers a spectral band pass from 800 nm to 1428 nm, providing a super-broad bandwidth polarizing film of over 600 nm in the near infrared (IR) region of the electromagnetic spectrum. In this example, the chiral additive is utilized to control the band position and different concentrations will control the band passes available.

Example 10

In this example, a broadband CLC polarizing film is fabricated based on an acrylate liquid crystal compound in cholesteric order mixed with non-crosslinkable nematic liquid crystals. Two polymerizable acrylate cholesteric liquid crystal compounds, CM 95 and CM 94 (BASF, Aktiengesellschaft, Ludwigshafen, German), reflecting right-handed circular polarization at blue and red wavelength, respectively, are used in this example. The blue compound, CM95, is mixed with a non-cross-linkable nematic M15 (EMI) and photo initiator IG184 (Cyba Geigy) at a ratio of CM:M15:IG184=2:1:0.06 by weight. The mixture is filled into a 20 micron glass cell with rubbed polyimide coating and cured at 35° C. with a suitable UV irradiation for a sufficiently long time. The resulted broadband polarizing film reflects right-handed light from 590 nm to 900 nm, with a bandwidth about 310 nm. Other nematic materials such as E7, etc., also can broaden the polarizing bandwidth when mixed with the acrylate CLC and exposed to UV light.

Alternatives to Polymerizable CLC and Liquid Crystal Materials

Most of the above described examples demonstrate that commercially available polymerizable CLC and liquid crystal materials may be utilized to fabricate super-broadband polarizing film structures hereof. However, it should be appreciated that the fabrication techniques of the present invention can also be used with any cyclic liquid crystal siloxane, wherein the mesogenic group is attached to a siloxane backbone by hydrosilylation, as well as with any other liquid crystal polymers, such as acrylate, etc.

Similarly, while the nematic liquid crystal material utilized in the above examples are all commercially available, it should also be appreciated that any low molecular weight, non-polymerizable nematic liquid crystal material may be utilized in the practice of the present invention. Also, as shown in Example 4, polymerizable nematics may be used so long as their relative diffusion rate is greater than their polymerization rate.

The nematics utilized may be single compound liquid crystals like K15, K24 and M15 which are commercially available from EM Industries, Germany. Multiple compound mixtures of liquid crystal materials like E31, E44, and E7 commercially available from EM Industries, Germany, and ZLI-2309 and ZLI-5800-100 commercially available from EM Industries, Germany, may also be utilized in the practice of the present invention. All of these liquid crystals are in nematic phase at room temperature except K24 which is in the smectic phase at room temperature. These liquid crystals, when combined with a polymerizable CLC material and a photoinitiator produce polarizers of super-broad bandwidth of at least 700 nm. Finally, at low concentrations of liquid crystal material in the polymerizable CLC material, smaller than a ratio of 1/6 by weight, the resulting bandwidth falls off sharply indicating that low concentrations of nematic material are one of the limiting factors. Also, it should be appreciated that high concentrations of nematic to CLC, like a ratio of 2/3, results in a high reflection if the mixture is polymerized at a suitably lower temperature; otherwise light scattering is induced if the mixture is cured at a non-suitably high temperature.

In the above examples, specific UV curing intensities were prescribed to provide the broadband and super broadband polarizers of the present invention. To the extent that the polymerization rate is linked to the intensity of incident UV radiation during curing, when a nematic like E7 is used with a CLC material like CC4039L in a ratio of 1/2, the bandwidth of the resulting polarizer changes as the UV intensity increases. At an intensity of 0.047 mW/cm2, for example, the resulting bandwidth is 980 nm. At an intensity of 0.97 mW/cm2, the resulting bandwidth is 700 nm if cured at 92° C. and, if cured at 92° C. at 7.1 mW/cm2, the resulting bandwidth is 280 nm. This clearly indicates that bandwidth can be controlled by controlling the intensity of UV radiation.

While the preferred embodiments have been characterized as having an exponential distribution of CLC helical pitches, it should be appreciated that departures from an exact exponentially distribution can be tolerated without departing from the spirit of the present invention. Thus, impurities in the materials, radiant energy variations and polymerization variations may cause a departure from an ideal exponential function providing liquid crystal distributions across the thickness of the resulting polarizers which can only be described as being non-linear in character. Departures from the ideal exponential function do not appear to affect the enhancements in bandwidths obtained when the distribution is exponential.

Step B: Fracturing the Symmetrical CLC Film into CLC Microflakes (i.e. Microscopic Pigments) While Controlling the Size Thereof The second Step of the microflake fabrication process (i.e. "Step B") involves fragmenting the CLC film into CLC microflakes or CLC platelets of microscopic dimensions. Notably, each broadband CLC microflake has its liquid crystals cholesterically ordered about a helical axis that is prealigned normal to the surface of the broadband CLC microflake. The symmetrical CLC film hereof can be fractured either while mounted on its substrate or in a freestanding form (removed from its substrate). Several techniques for fracturing such CLC film into CLC microflakes will be described below.

Fracturing CLC Film on its Substrate.

Using this techniques, CLC film hereof mechanically fractured into such micro-sized flakes while supported on its substrate. Any of the techniques described in Applicant's U.S. Pat. No. 5,364,557, incorporated herein by reference, can be used to fracture the substrate supported CLC film. Typically, both the CLC film and the substrate upon the CLC film is supported are fractured. After carrying out the fracturing operations, the fractured pigments and substrate material must be carefully removed from the substrate using either substrate dissolving or chemical etching methods. In general, this can be done in one of a number of possible ways. For example, if the substrate material can be physically dissolved in certain types of solutions, such as salt in water, PVA in water, etc., without disolving the CLC film, then the fractured pigments are placed into the solution until the substrate material is totally dissolved. Thereafter, a new solution is used to rinse CLC microflakes until the substrate composition is totally gone. Finally, the CLC microflakes are dried and ready for combination with a suitable optically transparent carrier medium.

Alternatively, if the substrates (e.g. glass) are etchable using certain types of solvents, such as glass in hyroflouric (HF) acid, then the fractured CLC microflakes are placed in the solvent until the substrates are totally etched away. Thereafter, the CLC microflakes are rinsed with clean solvent to remove residual substrate from the CLC microflakes. Finally, the CLC microflakes are dried in order to prepare them for use in the fabrication process hereof.

Other methods may be used to remove the substrate from CLC microflakes. For example, broadband CLC films made on glass, salt, or other substances which are fragile upon mechanical shock, can be fractured by placing the CLC film and its substrate in a powerful ultrasonic bath. Alternatively, if the CLC film of the present invention is not brittle, it is still possible to use it for producing CLC microflakes by patterning and etching techniques well known in the art. In this case, photo-resist or etch resist patterns are generated which serve to project the desired microflake regions, and the exposed regions are etched away by a suitable wet or dry etching techniques. This would produce CLC microflakes of the desired size and shape.

Fracturing CLC Film Without Substrates (Free-standing Film).

CLC film of the present invention can be fractured into microflakes (or platelets) while in its free-standing configuration (removed from its substrate). In this situation, any of the techniques desribed in Applicant's U.S. Pat. No. 5,364,557 can be used, including mechanical grinding, ultrasonic fracturing, and photolitographic and/or chemical etching techniques.

Controlling the Size of CLC Microflakes

In order to make super-broadband CLC microflakes for use in making "super-white" coloring media of the present invention, the thickness of the CLC microflakes should range from about 20 to about 25 microns. The lateral dimensions of the microflakes should be at least three times larger than the thickness dimension, i.e., at least 60 to 75 microns. The upper limit on the lateral size of the CLC microflakes for use in making super-white coloring media should be no larger than 100 microns.

Illustrative Examples of CLC Microflake Construction According to the Present Invention A number of different examples have been set forth above on how to make CLC film material having LHCP and RHCP reflection characteristics over a super broad-band, broadband or spectrally-tuned region of the electromagnetic spectrum. Using such CLC film, CLC microflakes can be made using the various fragmentation techniques described above. Notably, however, CLC microflakes of the present invention can be constructed in a variety of different ways in order to impart "symmetrical" polarization-selective reflection characteristics. Various illustrative embodiments for the spectrally-tuned microflake construction of the present invention are set forth in FIGS. 2B, 2C, 2D1, and 2D2. The various illustrative embodiments for the broadband (or super broadband) microflake construction of the present invention are set forth in FIGS. 3B, 3C, 3D1, and 3D2. The details of microflake construction, along with their respective pitch distributions and spectral reflection characteristics, will be described below.

Figure 1D:
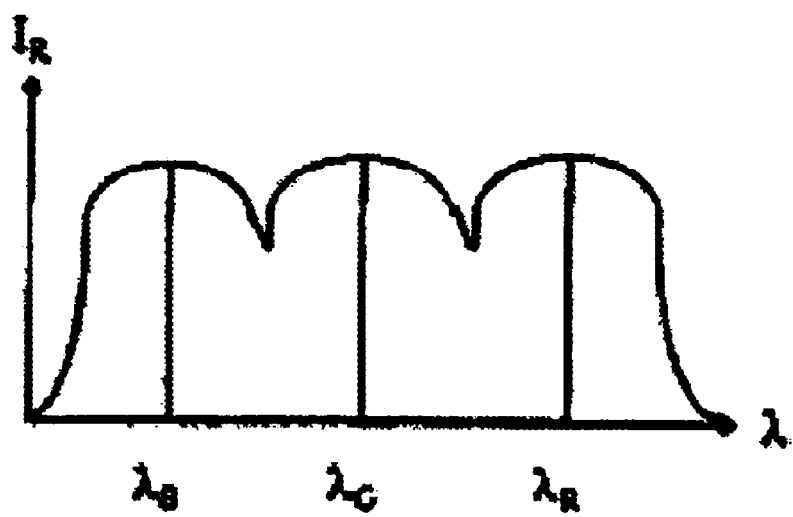

First Illustrative Embodiment of the Spectrally-tuned CLC Microflake Construction of the Present Invention In FIG. 2B, a first illustrative embodiment of the spectrally-tuned (narrowband) CLC microflakes of the present invention is schematically depicted. This microflake construction can be used to manufacture additive-primary coloring media of the present invention having either specularly reflective or non-specularly reflective characterisics, as shown in FIGS. 2A1 and 2A2, respectively. As shown, this microflake has double-layer laminated construction, in which each layer thereof is made from the same LHCP or RHCP CLC film material and each surface thereof has substantially the same circularly polarizing reflection characteristics over the visible band portion of the electromagnetic spectrum. In FIG. 2B1(A), the pitch distribution of CLC molecules along the thickness dimension of an exemplary CLC microflake is shown for an exemplary embodiment of the double-laminated microflake construction of FIG. 2B. In FIG. 2B2, the spectral reflection characteristics of the first (i.e. upper) and second (i.e. lower) surfaces of the spectrally-tuned LHCP (or RHCP) CLC film layers are graphically illustrated. As shown, the reflection characteristics of these CLC film layers produce an additive-primary color effect (e.g. red) in the human vision system. In FIG. 2B2, a graphical comparison of the spectral reflection characteristics of the first and second surfaces of the spectrally-tuned LHCP (or RHCP) CLC film layers is shown. As indicated in this graphical plot, there is significant asymmetry in the spectral reflection characteristics. To construct the CLC microflake of FIG. 2B, the surfaces of a pair of CLC film layers having the same spectral reflection characteristics are brought together and laminated to form a laminated film structure having symmetrical reflection characteristics. Thereafter, the laminated CLC film structure can be fragmented to form microflakes as described hereinabove.

Second Illustrative Embodiment of the Spectrally-Tuned CLC Microflake Construction of the Present Invention In FIG. 2C, a second illustrative embodiment of the spectrally-tuned CLC microflake of the present invention is schematically depicted. This microflake construction can be used to manufacture additive-primary coloring media of the present invention having either specularly reflective or non-specularly reflective characterisics, as shown in FIGS. 2A1 or 2A2. As shown, this microflake has double-layer laminated construction, in which the first layer thereof is made from spectrally-tuned (narrowband) RHCP CLC film material and the second layer thereof is made from spectrally-tuned LHCP CLC film, and each surface thereof has substantially the same circularly polarizing reflection characteristics over the spectrally-tuned portion of the electromagnetic spectrum. In FIG. 2C1(A), the pitch distribution of CLC molecules along the thickness dimension of an exemplary CLC microflake is shown for a first embodiment of the double-laminated microflake construction of FIG. 2C. In FIG. 2C2, the spectral reflection characteristics of the first (i.e. upper) and second (i.e. lower) surfaces of the spectrally-tuned LHCP and RHCP CLC film layers are graphically illustrated. As shown, the reflection characteristics of these CLC film layers produce an additive-primary color effect (e.g. red) in the human vision system. In FIG. 2C2, a graphical comparison of the spectral reflection characteristics of the spectrally-tuned LHCP and RHCP CLC film layers is shown. As indicated in this graphical plot, there is significant asymmetry in the spectral reflection characteristics of these component layers. To construct the CLC microflake of FIG. 2C, the surfaces of a pair of RHCP and LHCP CLC film layers having substantially the same spectral reflection characteristics are brought together and laminated to form a laminated film structure having symmetrical reflection characteristics. Thereafter, the laminated CLC film structure can be fragmented to form spectrally-tuned CLC microflakes as described hereinabove.

Third Illustrative Embodiment of the Spectrally-Tuned CLC Microflake Construction of the Present Invention In FIG. 2D1, a third illustrative embodiment of the spectrally-tuned CLC microflake of the present invention is schematically depicted. This microflake construction can be used to manufacture additive-primary coloring media of the present invention having either specularly reflective or non-specularly reflective characterisics, as shown in FIGS. 2A1 or 2A2. The primary advantage of this construction is that both LHCP and RHCP components of incident light are totally reflected, thus resulting in significantly brighter color effects and/or images. There is, however, one minor limitation associated with this microflake construction in that it cannot be used for 3-D stereoscopic imaging applications as both LHCP and RHCP components of incident light are reflected.

As shown in FIG. 2D1, this microflake has double-layer laminated construction, wherein the first CLC layer is made from a first layer of LHCP CLC film material having a first phase retardation surface formed therein, and the second CLC layer is made from a second layer of LHCP CLC film material having a second phase retardation surface formed therein adjacent the first phase retardation surface. The first and second layers have substantially the same circularly polarizing reflection characteristics over the spectrally-tuned band portion of the electromagnetic spectrum in which the microflake has been designed to operate. In general, the first and second phase retardation surfaces each impart phase retardation to incident electromagentic radiation such that each wavelength in the spectrally-tuned band, passing through the first and second phase retardation surfaces, undergoes $\pi$ radians phase retardation. Consequently, when LHCP light falls incident the RHCP layer of the microflake and passes the first and second phase retardation surfaces thereof, it will converted into RHCP polarized and thus reflect off the LHCP layer of the microflake after passing through the phase retardation surfaces. Similarly, when RHCP light falls incident the microflake surface and passes the first and second phase retardation surfaces thereof, it will become LHCP polarized, and thus reflect off the LHCP layer of the microflake after passing through the phase retardation surfaces. By virtue of this reflective mechanism, this microflake construction reflects 100% of all incident light within the spectrally-tuned band of the microflake. In general, there are a number of ways in which to realize the necessary $\pi$ phase retardation amount at each wavelength over the spectrally-tuned band. For example, the first and second phase retardation surfaces can be designed to each impart $\pi/2$ radians phase retardation at each wavelength over the spectrally-tuned band of the microflake. In some instances, however, this implementation may be difficult to carry out in practice. In an alternative realization, which should be easier to practice, the first phase retardation surface could be designed to impart $\pi$ radians over a first portion of the spectrally-tuned band of the microflake, whereas the second phase retardation surface could be designed to impart π radians over the second portion of the spectrally-tuned band of the microflake. In either such embodiment, it is preferred that each phase retardation surface is realized by molecularly reorientating the liquid crystal molecules in the CLC film layer as taught in Applicant's copending application Ser. No. 08/743,293 entitled "Liquid Crystal Film Structures With Phase-Retardation Surface Regions Formed Therein And Methods Of Fabricating The Same" by Sadeg Faris filed Nov. 4, 1996, incorporated herein by reference. Using the phase retardation formation techniques taught in this copending Application, the pitch of the CLC molecules over each such phase retardation region $\phi_1$ and $\phi_2$ approaches infinity, as graphically illustrated in FIG. 2D3, while the pitch of the CLC molecules over the LHCP CLC film layers is substantially constant. To construct the CLC microflake of FIG. 2D1, the surfaces of a pair LHCP CLC film layers having substantially the same spectral reflection characteristics are first processed to form phase retardation regions $\phi_1$ and $\phi_2$ respectively, and thereafter are brought together and laminated as shown in FIG. 2D1 to form a laminated film structure having symmetrical reflection characteristics on its outer surfaces. Thereafter, the laminated CLC film structure can be fragmented to form spectrally-tuned CLC microflakes as described hereinabove.

Figure 4:
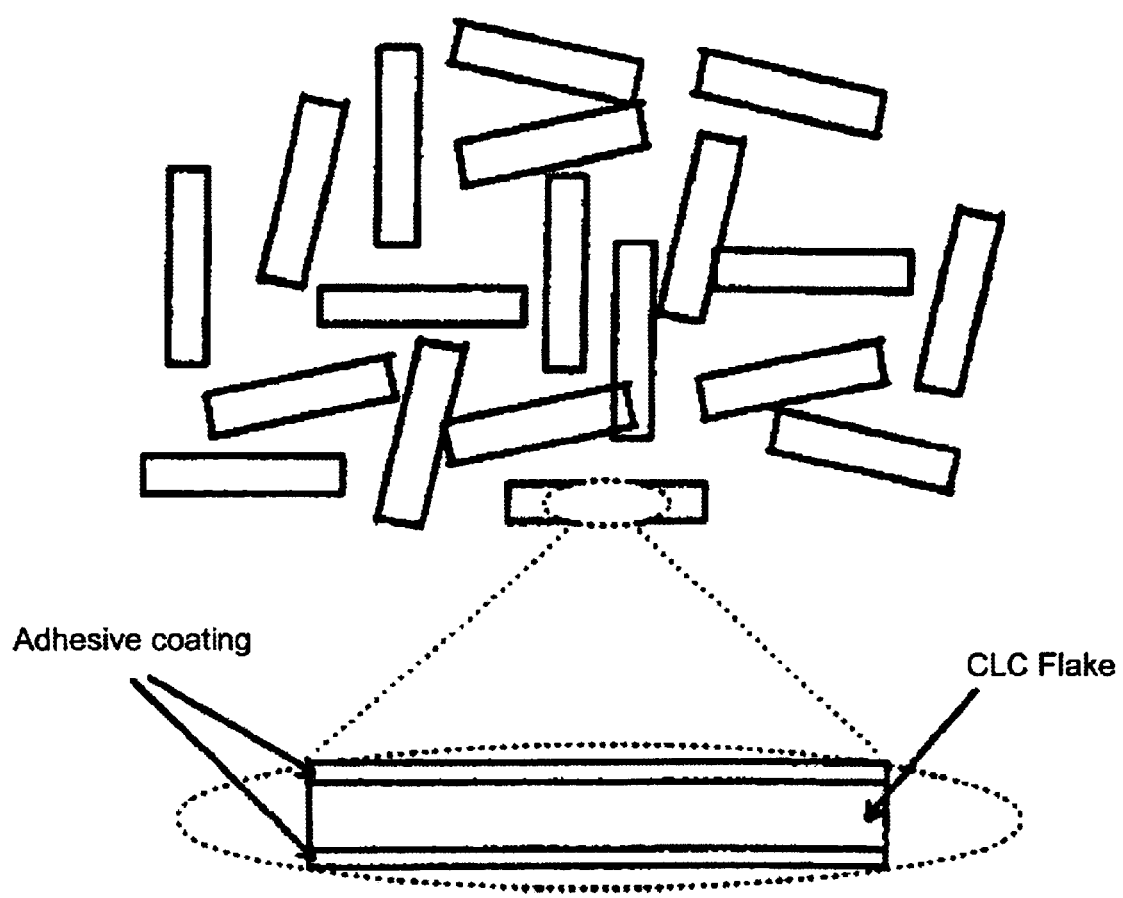
Figure 5:
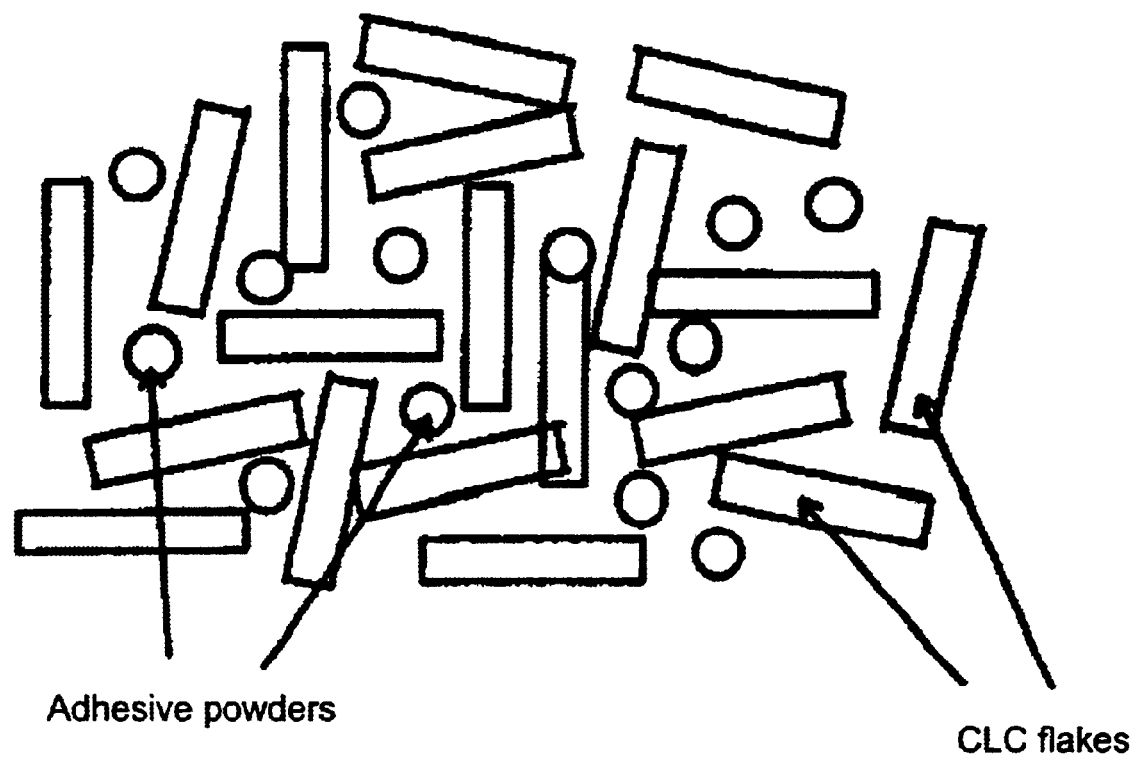

Fourth Illustrative Embodiment of the Spectrally-Tuned CLC Microflake Construction of the Present Invention In FIG. 2D2, a fourth illustrative embodiment of the spectrally-tuned CLC microflake of the present invention is schematically depicted. This microflake construction can be used to manufacture additive-primary coloring media of the present invention having either specularly reflective or non-specularly reflective characterisics, as shown in FIGS. 2A1 or 2A2. As shown, this microflake has a double-layer laminated construction, wherein the first CLC layer is made from a first layer of RHCP CLC film material having a first phase retardation surface formed therein, and the second CLC layer is made from a second layer of RHCP CLC film material having a second phase retardation surface formed therein adjacent the first phase retardation surface. The first and second layers have substantially the same circularly polarizing reflection characteristics over the spectrally-tuned band of the electromagnetic spectrum. In general, the first and second phase retardation surfaces each impart phase retardation to incident electromagentic radiation such that each wavelength in the spectrally-tuned band, passing through the first and second phase retardation surfaces, undergoes π radians phase retardation. Consequently, when LHCP light falls incident the RHCP layer of the microflake and passes the first and second phase retardation surfaces thereof, it is converted into RHCP polarized and thus reflect off the LHCP layer of the microflake after passing through the phase retardation surfaces thereof. Similarly, when RHCP light falls incident the microflake surface and passes the first and second phase retardation surfaces thereof, it is converted into LHCP light, and thus reflect off the LHCP layer of the microflake after passing through the phase retardation surfaces thereof. By virtue of this reflective mechanism, this microflake construction reflects 100% of all incident light within the spectrally-tuned band of the microflake. In general, there are a number of ways in which to realize the necessary π phase retardation amount at each wavelength over the spectrally-tuned band of the microflake. For example, the first and second phase retardation surfaces can be designed to each impart π/2 radians phase retardation at each wavelength over the spectrally-tuned band of the microflake. In some instances, however, this implementation may be difficult to carry out in practice. In an alternative realization, which should be easier to practice, the first phase retardation surface could be designed to impart π radians over a first portion of the spectrally-tuned band, whereas the second phase retardation surface could be designed to impart π radians over the second portion of the spectrally-tuned band. In either such embodiment, the phase retardation surface is realized by molecularly reorientating the liquid crystal molecules in the CLC film layer as taught in Applicant's copending application Ser. No. 08/743,293, supra. Using the phase retardation formation techniques taught in this copending Application, the pitch of the CLC molecules over each such phase retardation region $\phi_1$ and $\phi_2$ approaches infinity, as graphically illustrated in FIG. 2D4, while the pitch of the CLC molecules over the LHCP CLC film layers is constant. In FIG. 2D5, the spectral reflection characteristics of the first (i.e. upper) and second (i.e. lower) surfaces of the spectrally-tuned RHCP CLC film layer are graphically illustrated. As shown, the reflection characteristics of these CLC film layers produce an additive-primary (e.g. red) color effect in the human vision system. In FIG. 2D5, a graphical comparison of the spectral reflection characteristics of the spectrally-tuned LHCP and RHCP CLC film layers is shown. As indicated in this graphical plot, there is significant asymmetry in the spectral reflection characteristics of these component layers. To construct the CLC microflake of FIG. 2D2, the surfaces of a pair RHCP CLC film layers having substantially the same spectral reflection characteristics are first processed to form the first and second phase retardation regions $\phi_1$ and $\phi_2$ respectively, and thereafter are brought together and laminated as shown in FIG. 2D2 to form a laminated film structure having symmetrical reflection characteristics on its outer surfaces. Thereafter, the laminated CLC film structure can be fragmented to form spectrally-tuned CLC microflakes as described hereinabove.

First Illustrative Embodiment of the Broadband CLC Microflake Construction of the Present Invention In FIG. 3B, a first illustrative embodiment of the broadband CLC microflake of the present invention is schematically depicted. This microflake construction can be used to manufacture super-white and mirror-like coloring media of the present invention, as shown in FIGS. 3A1 or 3A2, respectively. As shown, this microflake has double-layer laminated construction, in which each layer thereof is made from the same superbroad band (or broadband) LHCP or RHCP CLC film material and each surface thereof has substantially the same circularly polarizing reflection characteristics over the visible band portion of the electromagnetic spectrum. Depending on how the component film layers are laminated together, different pitch distribution characteristics may arise. For example, in FIG. 3B1(A), the pitch distribution of CLC molecules along the thickness dimension of an exemplary CLC microflake is shown for a first embodiment of the double-laminated microflake construction of FIG. 3B. In FIG. 3B1(B), the pitch distribution of CLC molecules along the thickness dimension of an exemplary CLC microflake is shown for a second embodiment of the double-laminated microflake construction of FIG. 3B. In FIG. 3B2, the spectral reflection characteristics of the first (i.e. upper) and second (i.e. lower) surfaces of the broadband LHCP (or RHCP) CLC film layers are graphically illustrated. In FIG. 3B2, a graphical comparison of the spectral reflection characteristics of the first and second surface of the broadband LHCP (or RHCP) CLC film layers is shown. As indicated in this graphical plot, there is significant asymmetry in the spectral reflection characteristics. To construct the broadband CLC microflake of FIG. 3B, the surfaces of a pair of CLC film layers having the same spectral reflection characteristics are brought together and laminated to form a laminated film structure having symmetrical reflection characteristics. Thereafter, the laminated CLC film structure can be fragmented to form broadband CLC microflakes as described hereinabove.

Second Illustrative Embodiment of the Broad-Band CLC Microflake Construction of the Present Invention In FIG. 3C, a second illustrative embodiment of the broadband CLC microflake of the present invention is schematically depicted. This microflake construction can be used to manufacture super-white or mirror-like coloring media of the present invention, as shown in FIGS. 3A1 or 3A2, respectively. As shown, this microflake has double-layer laminated construction, in which the first layer thereof is made from superbroad band (or broadband) RHCP CLC film material and the second layer thereof is made from superbroad band (or broadband) LHCP CLC film. Each surface thereof has substantially the same circularly polarizing reflection characteristics over the visible band portion of the electromagnetic spectrum. Depending on how the component film layers are laminated together, different pitch distribution characteristics may arise. For example, in FIG. 3C1(A), the pitch distribution of CLC molecules along the thickness dimension of an exemplary CLC microflake is shown for a first embodiment of the double-laminated microflake construction of FIG. 3C. In FIG. 3C1(B), the pitch distribution of CLC molecules along the thickness dimension of an exemplary CLC microflake is shown for a second embodiment of the double-laminated microflake construction of FIG. 3C. In FIG. 3C2, the spectral reflection characteristics of the first (i.e. upper) and second (i.e. lower) surfaces of the broadband RHCP CLC film layer are graphically illustrated. In FIG. 3C2, a graphical comparison of the spectral reflection characteristics of the broadband LHCP and RHCP CLC film layers is shown. As indicated in this graphical plot, there is significant asymmetry in the spectral reflection characteristics of these component layers. To construct the CLC microflake of FIG. 3C, the surfaces of a pair of RHCP and LHCP CLC film layers having substantially the same spectral reflection characteristics are brought together and laminated to form a laminated film structure having substantially symmetrical reflection characteristics. Thereafter, the laminated CLC film structure can be fragmented to form microflakes as described hereinabove.

Third Illustrative Embodiment of the Broadband CLC Microflake Construction of the Present Invention In FIG. 3D1, a third illustrative embodiment of the broadband CLC microflake of the present invention is schematically depicted. This microflake construction can be used to manufacture super-white or mirror-like coloring media of the present invention, as shown in FIGS. 3A1 or 3A2, respectively. The primary advantage of this construction is that both LHCP and RHCP components of incident light are totally reflected, thus resulting in significantly brighter color effects and/or images. There is, however, one minor limitation associated with this microflake construction in that it cannot be used for 3-D stereoscopic imaging applications as both LHCP and RHCP components of incident light are reflected.

As shown in FIG. 3D1, this microflake has double-layer laminated construction, wherein the first CLC layer is made from a first layer of superbroad band (or broadband) LHCP CLC film material having a first phase retardation surface formed therein, the second superbroad band (or broadband) CLC layer is made from a second layer of LHCP CLC film material having a second phase retardation surface formed therein adjacent the first phase retardation surface. In general, the first and second phase retardation surfaces each impart phase retardation to incident electromagentic radiation such that each wavelength in the visible band, passing through the first and second phase retardation surfaces, undergoes a π radians phase retardation. Consequently, when LHCP light falls incident the RHCP layer of the microflake and passes the first and second phase retardation surfaces thereof, it is converted into RHCP polarized light and thus reflects off the LHCP layer of the microflake after passing through the phase retardation surfaces thereof. Similarly, when RHCP light falls incident the microflake surface and passes the first and second phase retardation surfaces thereof, it is converted into LHCP light, and thus reflects off the LHCP layer of the microflake after passing through the phase retardation surfaces thereof. By virtue of this reflective mechanism, this microflake construction reflects 100% of all incident light within the visible band. In general, there are a number of ways in which to realize the necessary π phase retardation amount at each wavelength over the visible band. For example, the first and second phase retardation surfaces can be designed to each impart π/2 radians phase retardation at each wavelength over the visible band. In some instances, however, this implementation may be difficult to carry out in practice. In an alternative realization, which should be easier to practice, the first phase retardation surface could be designed to impart a π radians over a first portion of the visible band, whereas the second phase retardation surface could be designed to impart a π radians over the second portion of the visible band. Preferably, each phase retardation surface is realized by molecularly reorientating the liquid crystal molecules in the CLC film layer as taught in Applicant's copending application Ser. No. 08/743,293, supra. Using the phase retardation formation techniques taught in this copending Application, the pitch of the CLC molecules over each such first and second phase retardation region $\phi_1$ and $\phi_2$ approaches infinity, as graphically illustrated in FIG. 3D3, while the pitch of the CLC molecules over the LHCP CLC film layers is non-linear (i.e. exponential) in accordance with the teachings set forth in Applicant's copending application Ser. No. 08/739,467, supra.

To construct the CLC microflake of FIG. 3D1, the surfaces of a pair LHCP CLC film layers having substantially the same spectral reflection characteristics are first processed to form phase retardation surfaces $\phi_1$ and $\phi_2$ in the manner described above, and thereafter are brought together and laminated as shown in FIG. 3D1 to form a laminated film structure having symmetrical reflection characteristics on its outer surfaces. Thereafter, the laminated CLC film structure can be fragmented to form broadband CLC microflakes as described hereinabove.

Fourth Illustrative Embodiment of the Broadband CLC Microflake Construction of the Present Invention In FIG. 3D2, a fourth illustrative embodiment of the broadband CLC microflake of the present invention is schematically depicted. This microflake construction can be used to manufacture super-white or mirror-like coloring media of the present invention, as shown in FIGS. 3A1 or 3A2, respectively. As shown, this microflake has a double-layer laminated construction, wherein the first CLC layer is made from a first layer of superbroad band (or broadband) RHCP CLC film material having a first phase retardation surface formed therein, and the second CLC layer is made from a second layer of superbroad band (or broadband) RHCP CLC film material having a second phase retardation surface formed therein adjacent the first phase retardation surface. The first and second layers have substantially the same circularly polarizing reflection characteristics over the visible band portion of the electromagnetic spectrum. In general, the first and second phase retardation surfaces of this particular microflake construction each impart phase retardation to incident electromagentic radiation such that each wavelength in the visible band, passing through the first and second phase retardation surfaces, undergoes a $\pi$ radians phase retardation. Consequently, when LHCP light falls incident the RHCP layer of the microflake and passes the first and second phase retardation surfaces thereof, it is converted into RHCP polarized light and thus reflects off the LHCP layer of the microflake after passing through the phase retardation surfaces thereof. Similarly, when RHCP light falls incident the microflake surface and passes the first and second phase retardation surfaces thereof, it is converted into LHCP light, and thus reflects off the LHCP layer of the microflake after passing through the phase retardation surfaces thereof. By virtue of this reflective mechanism, this microflake construction reflects 100% of all incident light within the visible band. In general, there are a number of ways in which to realize the necessary $\pi$ phase retardation amount at each wavelength over the visible band. For example, the first and second phase retardation surfaces can be designed to each impart $\pi/2$ radians phase retardation at each wavelength over the visible band. In some instances, however, this implementation may be difficult to carry out in practice. In an alternative realization, which should be easier to practice, the first phase retardation surface could be designed to impart $\pi$ radians over a first portion of the visible band, whereas the second phase retardation surface could be designed to impart $\pi$ radians over the second portion of the visible band. In the preferred embodiment thereof, each phase retardation surface is realized by molecularly reorientating the liquid crystal molecules in the CLC film layer as taught in Applicant's copending application Ser. No. 08/743,293, supra. Using the phase retardation formation techniques taught in this copending Application, the pitch of the CLC molecules over each such phase retardation region $\phi_1$ and $\phi_2$ approaches infinity, as graphically illustrated in FIG. 3D4, while the pitch of the CLC molecules over the RHCP CLC film layers is non-linear (i.e. exponential) in accordance with the teachings set forth in Applicant's copending application Ser. No. 08/739,467, supra.

In FIG. 3D5, the spectral reflection characteristics of the first (i.e. upper) and second (i.e. lower) surfaces of the superbroad band RHCP CLC film layer are graphically illustrated. In FIG. 3D5, a graphical comparison of the spectral reflection characteristics of these superbroad band CLC film layers is shown. As indicated in this graphical plot, there is significant asymmetry in the spectral reflection characteristics of these component layers. To construct the CLC microflake of FIG. 3D2, the surfaces of a pair RHCP CLC film layers having substantially the same spectral reflection characteristics are first processed to form phase retardation surfaces $\phi_1$ and $\phi_2$ respectively, and thereafter are brought together and laminated as shown in FIG. 3D2 to form a laminated film structure having symmetrical reflection characteristics on its outer surfaces, in accordance with the principles of the present invention. Thereafter, the laminated CLC film structure can be fragmented to form broadband CLC microflakes as described hereinabove.

Step C: Selecting an Optically Transparent Carrier (Or Host) Medium for the CLC Microflakes The third step (i.e. "Step C") of the CLC coloring media fabrication process involves selecting a light transmissive carrier medium for carrying the CLC microflakes. In general, the carrier medium selection process should consider the index of refraction, solubility, viscosity, adhesion-to-surface, resistance-to-temperature, humidity, mechanical torture, etc., of the carrier medium. Preferrably, the properties of the carrier medium should be selected to carefully match the average size, thickness and optical properties (e.g. index of refraction) of the CLC microflakes.

In particular, the carrier medium should be optically transparent (i.e. clear) when cured. The carrier medium should have an index of refraction close to the index of refraction of the CLC microflakes hereof. The carrier medium should not ruin (e.g. dissolve) the CLC microflakes, and should be resistant to humidity, and withstand relatively high temperature environments, e,g, 90° C. Preferrably, the carrier medium should be flexible when cured or dried. However, if the CLC coloring media is printed/painted onto a hard substrate surface, then a non-flexible carrier can be used. The carrier should be cureable by way of thermal curing, photon curing, or air-drying by evaporation. After drying, the CLC microflakes should remain permanently inside the carrier and stable in terms of their optical properties.

In order that the additive-primary coloring media of the present invention provides a superbright color appearance in the eyes of the viewer independent of viewing angle, the spectrally-tuned CLC microflakes, illustrated in FIGS. 2B through 2D5, must be randomly oriented within the coating or layer of applied carrier medium, as schematically illustrated in FIG. 2A1. This way, incident light having a spectral range from 400 nm to 750 nm in visible band, is reflected in a diffusive (i.e. non-specular) manner within the additive-primary color band. To ensure that the CLC microflakes assume a substantially random or quasi-random orientation within a coating of carrier medium, the mean thickness of the film coating should be at least 60 microns (or the largest linear dimension of the CLC microflakes) to ensure a large viewing angle, i.e., close to 90° from surface normal. As will be explained in greater detail hereinafter in Step D below, such carrier thicknesses can be acheived by engineering the viscosity of the carrier medium so that spectrally-tuned CLC microflakes within an applied layer (or coating) of the super-white coloring media are allowed to automatically assume a substantially random or quasi-random orientation within the applied layer. In order to facilatate this quasi-random orientation of the CLC flakes, a suitably thick (e.g. 60 microns) coating of the CLC ink or paint should be applied to the substrate during drying. With the CLC microflake size being about 60 microns or less, and the thickness of the microflakes about 20 microns or less, a 60 microns thick coating allows a portion of the microflakes to assume a substantially random or quasi-random orientation during application onto the substrate, while other microflakes stack up in any overlying relationship, relative to the substrate within the carrier medium.

In order that the additive-primary coloring media of the present invention provides a super bright color appearance in the eyes of the viewer "dependent" on viewing angle, the spectrally-tuned CLC microflakes should be uniformly oriented within the coating or layer of applied carrier medium, as schematically illustrated in FIG. 2A2. This way, incident light having a spectral range from 400 nm to 750 nm in visible band is reflected in a non-diffusive (i.e. specular) manner within the additive-primary color band differently for a different range of viewing angles. This coloring media coating can be used to produce fantastic, eye-catching color effects dependent on viewing angle.

In order that the super-white coloring media of the present invention provides a super-white (MgO-like) color appearance in the eyes of the viewer independent of viewing angle, the broadband CLC microflakes should be randomly (or quasi-randomly) oriented within the coating or layer of applied carrier medium, as schematically illustrated in FIG. 3A1. This way, broadband incident light having spectral components from about 400 nm to about 750 nm in visible band, is reflected in a diffusive (i.e. non-specular) manner. To ensure that the broadband CLC microflakes assume random orientation within a coating of carrier medium, the mean thickness of the film coating should be at least 60 microns to ensure a large viewing angle, i.e., close to 90° from surface normal. As in the case of additive-primary coloring media coatings, such carrier thicknesses can be achieved by engineering the viscosity of the carrier medium so that broadband CLC microflakes within an applied layer (or coating) of the super-white coloring media are allowed to automatically assume a substantially random or quasi-random orientation within the applied layer. In order to facilate this random orientation of the CLC flakes, a suitably thick (e.g. 60 microns) coating of the CLC ink or paint should be applied to the substrate during drying. With the CLC microflake size being about 60 microns or less, and the thickness of the microflakes about 20 microns, a 60 micron thick coating allows a portion of the microflakes to assume a random or quasi-random orientation during application onto the substrate, while other microflakes stack up in any overlying relationship, relative to the substrate within the carrier medium.

In order that the coloring media of the present invention provides a "mirror-like" color appearance in the eyes of the viewer "independent" on viewing angle, the broadband CLC microflakes should be uniformly and flatly oriented within the coating or layer of applied carrier medium, as schematically illustrated in FIG. 3A2. This way, broadband incident light having spectral content from about 400 nm to about 750 nm in visible band, is reflected in a non-diffusive (i.e. specular) manner independent of viewing angle. This coloring media coating can be used to produce mirror-like surfaces and finishes which do not depend on viewing angle.

Selection of suitable carrier fluids for the CLC inks and paints of the present invention may be found by reference to Chapter 18 of "Printing Technology (3rd Edition)" 1988, by J. Michael Adams, published by Delmar Publishers, Inc., of Albany, N.Y., incorporated herein by reference. Notably, the carrier medium may be realized using a wax material in order to form crayons according to the spirit of the present application. In addition to a suitable carrier, the CLC inks and paints of the present invention may also include additives chosen for tackiness, drying speed, adhesion to substrates, use with particular printing or painting methods, as well as other properties.

Step D: Adding CLC Microflakes to the Selected Carrier Medium to Produce the Desired Coloring Media of the Present Invention The fourth step (i.e. "Step D") of the coloring media fabrication process involves adding the CLC microflakes (made during Step B) to the light transmissive carrier medium (selected during Step C) in order to make either super-white (i.e. MgO-like) coloring media, mirror-like coloring media, or additive-primary coloring media of the present invention. This step of the fabrication process will be described in detail below for each of the four primary embodiments of CLC coloring media of the present invention.

Determining the Threshold Concentration for Broadband CLC Microflakes in Super-White Coloring Media of the Present Invention In order to make coloring media having "super-white" color properties under broadband lighting conditions (and not "mirror-like" color properties), broadband CLC microflakes are added to the carrier medium in at least a "threshold" concentration. This will ensure that, for a given carrier medium and microflakes size distribution, broadband light falling incident on a surface coated with the coloring medium will undergo non-specular (i.e. diffusive) reflection and thereby produce a "super-white" or Magnesium-Oxide (MO) like color appearance in the eyes of a human viewer (or image detection system such as a color camera) independent of viewing angle. This threshold concentration, expressed in milligrams (mg) of CLC broadband microflakes, per cubic centiliters (cc) of liquified carrier medium, will depend on a number of parameters, including, for example: (1) the viscosity of the carrier medium at the application temperature range; (2) the method by which the coloring media is applied; (3) the size of the CLC microflakes within the carrier medium; and (4) surface tension of the carrier fluid when applied to a radiation absorbing surface. Below, a reiterative process will be described for determining the threshold concentration for "super-white" coloring media of the present invention.

The first step of the reiterative concentration determining process involves selecting broadband CLC microflakes and an optically transparent carrier medium, as described above. In a systematic manner, the size distribution of the broadband CLC microflakes and the viscosity properties of the selected carrier medium (e.g. fluid) at room temperature are recorded. Then an specific amount of the selected broadband CLC microflakes is added to a specific carrier liquid and mixed together. If the carrier medium is solid at room temperature (as in the case of a wax carrier), then the carrier is liquified prior to adding the broadband CLC microflakes thereto. Any other agents (additives) to be added to the coloring media should be then added to the carrier medium while in a liquified state. Then the resulting coloring media is applied to radiation absorbing surface (e.g., by screen printing or brush strokes) to form a color coating thereon, and is thereafter allowed to dry or otherwise cure. The resulting color coating is then illuminated with broadband circularly polarized light (e.g. produced from an incandescent or other light source) and carefully viewed by one or more human viewers who compare the resulting color with a conventional Magnesium Oxide paint sample. The viewers record their perceptions (e.g. too silverish, not white enough, etc.).

Then returning to the beginning of the reiterative process, the designer modifies the concentration of broadband CLC microflakes added to the selected carrier medium, produces a new sample of coloring media, applies the same to the same radiation absorbing surface, and compares the color effects produced thereby against the Magnesium Oxide paint sample. Typically, the designer will need to adjust (e.g. increase) the concentration of the broadband CLC microflakes, assuming the viscosity of the carrier fluid remains the same, in order that the resulting coloring coating produces color effects comparable to Magnesium Oxide paint under broadband lighting conditions. If necessary, the designer might choose to adjust (e.g. increase) the viscosity of the carrier at room application temperature so that the broadband CLC microflakes are allowed to assume a random orientation within the applied carrier medium. Notably, certain application techniques (e.g. brush strokes) may influence the orientation of the CLC microflakes to degree, depending on the concentration thereof in the carrier medium. Also, if it is not possible to increase the viscosity of the carrier medium, given the application technique selected, the designer may choose to use broadband CLC microflakes having a smaller size distribution so that such microflakes may assume a random orientation within a relatively thin carrier medium applied to a surface.

Determining the Threshold Concentration for Broadband CLC Microflakes in Mirror-Like Coloring Media of the Present Invention In order to make coloring media having "mirror-like" color properties under broadband lighting conditions (and not "super-white" color properties), it is important that broadband CLC microflakes are added to the carrier medium in below a "threshold" concentration. This will ensure that, for a given carrier medium and microflakes size distribution, broadband light falling incident on a surface coated with the coloring medium will undergo specular reflection and thereby produce a "mirror-like" color appearance in the eyes of a human viewer (or image detection system such as a color camera). As in the case of the super-white coloring media of the present invention, this threshold concentration, expressed in milligrams (mg) of CLC broadband microflakes, per cubic centiliters (cc) of liquified carrier medium, will depend on a number of parameters, including, for example: (1) the viscosity of the carrier medium at the application temperature range; (2) the method by which the coloring media is applied; (3) the size of the CLC microflakes within the carrier medium; and (4) surface tension of the carrier fluid when applied to a radiation absorbing surface. Below, a reiterative process will be described for determining the threshold concentration for "mirror-like" coloring media of the present invention.

The first step of this reiterative concentration determining process involves selecting broadband CLC microflakes and an optically transparent carrier medium, as described above. In a systematic manner, the size distribution of the broadband CLC microflakes and the viscosity properties of the selected carrier medium (e.g. fluid) at room temperature are recorded. Then an specific amount of the selected broadband CLC microflakes is added to a specific carrier liquid and mixed together. If the carrier medium is solid at room temperature (as in the case of a wax carrier), then the carrier is liquified prior to adding the broadband CLC microflakes thereto. Any other agents (additives) to be added to the coloring media should be then added to the carrier medium while in a liquified state. Then the resulting coloring media is applied to a radiation absorbing surface (e.g., by screen printing or brush strokes) to form a color coating thereon, and is thereafter allowed to dry or otherwise cure. The resulting color coating is then illuminated with broadband circularly polarized light (e.g. produced from an incandescent or other light source) and carefully viewed by one or more human viewers who compare the resulting color with a conventional plate mirror. The viewers record their perceptions (e.g. too whitish, not silverish enough, etc.).

Then returning to the beginning of the reiterative process, the designer modifies the concentration of broadband CLC microflakes added to the selected carrier medium, produces a new sample of coloring media, applies the same to the same radiation absorbing surface, and compares the color effects produced thereby against the mirror-like sample (e.g. plate). Typically, the designer will need to adjust the concentration of the broadband CLC microflakes, assuming the viscosity of the carrier fluid remains the same, in order that the resulting coloring coating produces color effects comparable to the mirror-like plate under broadband lighting conditions. If necessary, the designer might choose to decrease the viscosity of the carrier at room application temperature so that the broadband CLC microflakes are allowed to assume a planar or quasi-planar orientation within the applied carrier medium. Notably, certain application techniques (e.g. brush strokes) may influence the orientation of the CLC microflakes to degree, depending on the concentration thereof in the carrier medium. Also, if it is not possible to decrease the viscosity of the carrier medium, given the application technique selected, the designer may choose to use broadband CLC microflakes having a smaller size distribution so that such microflakes may assume a substantially planar orientation within a relatively thin carrier medium applied to a surface.

Determining the Threshold Concentration for Spectrally-Tuned CLC Microflakes in Non-Specularly Reflective Additive-Primary Coloring Media In Image Display Applications, such as 2-D and 3-D image display applications, it is quite often desirable to use additive-primary coloring media of the present invention in a manner that "specular reflection" is avoided in color images formed from such coloring media. The primary reason for achieving non-specular reflection in image display applications is that specular-reflection produces a spectrum of color appearance effects that is highly dependent on the "viewing-angle" of the viewer. Such color appearance effects can distort the display of color image information under broadband lighting conditions.

In situations where additive-primary color coatings (and images formed therefrom) should possess non-specular (i.e. diffusive) reflection characteristics, it is important that spectrally-tuned CLC microflakes are added to the carrier medium in at least a "threshold concentration". This will ensure that, for a given carrier medium and microflake size distribution, broadband light falling incident on a surface coated with the coloring medium will undergo non-specular reflection and thus produce the prespecified additive-primary color appearance characteristics—red, green, or blue—in the eyes of a human viewer (or image detection system such as a color camera) independent of "viewing-angle". This threshold concentration, expressed in milligrams (mg) of spectrally-tuned CLC microflakes, per cubic centiliters (cc) of liquified carrier medium, will depend on number of parameters, including, for example: (1) the viscosity of the carrier medium at the application temperature range; (2) the method by which the coloring media is applied; (3) the size of the CLC microflakes within the carrier medium; and (4) surface tension of the carrier fluid when applied to a radiation absorbing surface. Below, a reiterative process will be described for determining the threshold concentration for "additive-primary" coloring media exhibiting non-specular reflection characteristics when applied to a radiation absorbing surface.

The first step of the reiterative concentration determination process involves selecting spectrally-tuned CLC microflakes and an optically transparent carrier medium, as described above. The size distribution of the spectrally-tuned CLC microflakes and the viscosity properties of the selected carrier medium (e.g. fluid) at room temperature are recorded in a systematic manner. Then a specific amount of the selected CLC microflakes is added to a specific carrier liquid and mixed together. If the carrier medium is solid at room temperature (as in the case of a wax carrier), then the carrier is liquified prior to adding the spectrally-tuned CLC microflakes thereto. Any other agents (additives) to be added to the coloring media should be then added to the carrier medium while in a liquified state. Then the resulting coloring media is applied to radiation absorbing surface (e.g., by screen printing or brush strokes) to form a color coating thereon, and is thereafter allowed to dry or otherwise cure. The resulting color coating is then illuminated with circularly polarized light (e.g. produced from an incandescent or other light source) and carefully viewed by one or more human viewers from different viewing angles to see if viewing-angle dependent color effects are present. The viewers record their observations (e.g. color perceived depends on viewing angle).

Then returning to the beginning of the reiterative process, the designer modifies the concentration of spectrally-tuned CLC microflakes added to the selected carrier medium, produces a new sample of coloring media, applies the same to the same radiation absorbing surface, and determines whether the new sample exhibits angular dependent color effects. Typically, the designer will need to adjust the concentration of the spectrally-tuned CLC microflakes, assuming the viscosity of the carrier fluid remains the same, in order that the resulting coloring coating produces a single color effect (e.g. red, green or blue) independent of viewing angle under broadband lighting conditions. If necessary, the designer might choose to increase the viscosity of the carrier at room application temperature so that the spectrally-tuned CLC microflakes are allowed to assume a random or quasi-random orientation within the applied carrier medium. Notably, certain application techniques (e.g. brush strokes) may influence the orientation of the CLC microflakes to degree, depending on the concentration thereof in the carrier medium. Also, if it is not possible to increase the viscosity of the carrier medium, given the application technique selected, the designer may choose to use spectrally-tuned CLC microflakes having a smaller size distribution so that such microflakes may assume a random or quasi-random orientation within a relatively thin carrier medium applied to a surface.

Determining the Threshold Concentration for Spectrally-Tuned CLC Microflakes in Specularly-Reflective Additive-Primary Coloring Media In Non-Image Display Applications, such as automotive painting, it is quite often desirable to use additive-primary coloring media of the present invention in a manner that "specular reflection" results from color coatings formed from such coloring media. The reason for desiring specular reflection from color coatings is that this can create eye-catching visual effects under broadband (outdoor) lighting conditions.

In situations where additive-primary color coatings should possess specular-reflection characteristics, it is important that spectrally-tuned CLC microflakes are added to the carrier medium below the "threshold concentration". This will ensure that, for a given carrier medium and microflakes size distribution, broadband light falling incident on a surface coated with the coloring medium will undergo specular (i.e. non-diffusive) reflection and thus produce prespecified additive-primary color appearance characteristics—red, green, or blue—in the eyes of a human viewer (or image detection system such as a color camera) that is highly dependent on "viewing-angle". This threshold concentration, expressed in milligrams (mg) of spectrally-tuned CLC microflakes, per cubic centiliters (cc) of liquified carrier medium, will depend on a number of parameters, including, for example: (1) the viscosity of the carrier medium at the application temperature range; (2) the method by which the coloring media is applied; (3) the size of the CLC microflakes within the carrier medium; and (4) surface tension of the carrier fluid when applied to a radiation absorbing surface. Below, a reiterative process will be described for determining the threshold concentration for "additive-primary" coloring media exhibiting specular reflection characteristics when applied to a radiation absorbing surface, such a primer coating applied to the surface of an automobile, aircraft, or watercraft.

The first step of third reiterative concentration determining process involves selecting spectrally-tuned CLC microflakes and an optically transparent carrier medium, as described above. The size distribution of the spectrally-tuned CLC microflakes and the viscosity properties of the selected carrier medium (e.g. fluid) at room temperature are recorded in a systematic manner. Then an specific amount of the selected CLC microflakes is added to a specific carrier liquid and mixed together. If the carrier medium is solid at room temperature (as in the case of a wax carrier), then the carrier is liquified prior to adding the spectrally-tuned CLC microflakes thereto. Any other agents (additives) to be added to the coloring media should be then added to the carrier medium while in a liquified state. Then the resulting coloring media is applied to radiation absorbing surface (e.g., by screen printing or brush strokes) to form a color coating thereon, and is thereafter allowed to dry or otherwise cure. The resulting color coating is then illuminated with circularly polarized light (e.g. produced from an incandescent or other light source) and carefully viewed by one or more human viewers from different viewing angles to determine whether viewing-angle dependent color effects are present. The viewers record their observations (e.g. "perceived color weakly depends on viewing angle").

Then returning to the beginning of the reiterative process, the designer modifies the concentration of spectrally-tuned CLC microflakes added to the selected carrier medium, produces a new sample of coloring media, applies the same to the same radiation absorbing surface, and determines whether the new sample exhibits angularly dependent color effects. Typically, the designer will need to decrease the concentration of the spectrally-tuned CLC microflakes, assuming the viscosity of the carrier fluid remains the same, in order that the microflakes can assume a substantially planar or quasi-planar arrangement, thereby producing a single color effect (e.g. red, green or blue) independent of viewing angle under broadband lighting conditions. If necessary, the designer might choose to decrease the viscosity of the carrier at room application temperature so that the spectrally-tuned CLC microflakes are allowed to assume a planar or quasi-planar orientation within the applied carrier medium, under gravitational forces and coloring media application forces. Notably, as in the other cases discussed above, certain application techniques (e.g. brush strokes) may influence the orientation of the CLC microflakes to a degree, depending on the concentration thereof in the carrier medium. Also, if it is not possible to decrease the viscosity of the carrier medium, given the application technique selected, the designer may choose to use spectrally-tuned CLC microflakes having a smaller size distribution so that the microflakes are prevented allowed to assume a planar or quasi-planar configuration within a relatively thin carrier medium applied to a surface, and the majority of such microflakes thus fall substantially within a single plane tangential to the surface upon which the coloring media coating has been applied.

Formulas for Mixing Broadband and Spectrally-Tuned CLC Microflakes Within a Selected Carrier Medium: 2-D Applications When making coloring media for use in 2-D coloring and imaging applications, it will be desirable to mix the CLC microflakes in the following proportions: (A) for super-white coloring media, add to the carefully selected optically transparent carrier medium, equal proportions of (i) broadband CLC microflakes having left-hand circularly polarizing (LHCP) characteristics and (ii) broadband CLC microflakes having right-hand circularly polarizing (RHCP) characteristics; (B) for mirror-like coloring media, add to the carefully selected optically transparent carrier medium, equal proportions of (i) broadband CLC microflakes having left-hand circularly polarizing (LHCP) characteristics and (ii) broadband CLC microflakes having right-hand circularly polarizing (RHCP) characteristics; and (C) for additive-primary coloring media, add to the carefully selected optically transparent carrier medium, equal proportions of (i) "spectrally-tuned" CLC microflakes having left-hand circularly polarizing (LHCP) characteristics and (ii) "spectrally-tuned" CLC microflakes right-hand circularly polarizing (RHCP) characteristics. These formulas will ensure maximum reflection of ambient light from surface coatings formed using the super-white and/or additive-primary coloring media of the present invention.

Formulas for Mixing Broadband and Spectrally-Tuned CLC Microflakes with a Selected Carrier Medium: 3-D Applications When making coloring media for use in stereoscopic 3-D imaging applications (to be described in greater detail hereinafter), it will be desirable to mix the CLC microflakes in the following proportions: (A1) for left-handed (LH-type) super-white coloring media, add only broadband CLC microflakes having left-hand circularly polarizing (LHCP) characteristics to the carefully selected optically transparent carrier medium; (A2) for right-handed (RH-type) super-white coloring media, add only broadband CLC microflakes having right-hand circularly polarizing (RHCP) characteristics to the carefully selected optically transparent carrier medium; (B1) for left-handed (LH-type) mirror-like coloring media, add only broadband CLC microflakes having left-hand circularly polarizing (LHCP) characteristics to the carefully selected optically transparent carrier medium; (B2) for right-handed (RH-type) mirror-like coloring media, add only broadband CLC microflakes having right-hand circularly polarizing (RHCP) characteristics to the carefully selected optically transparent carrier medium; (C1) for LH-type additive-primary coloring media, add only "spectrally-tuned" CLC microflakes having left-hand circularly polarizing (LHCP) characteristics to the carefully selected optically transparent carrier medium; and (C2) for RH-type additive-primary coloring media, add only "spectrally-tuned" CLC microflakes having right-hand circularly polarizing (RHCP) characteristics to the carefully selected optically transparent carrier medium. Using this formula, the coloring media of the present invention can be used to form polarized spatially multiplexed images (SMI) for stereoscopic 3-D viewing as: the left-perspective image components of an SMI formed using LH-type additive-primary and super-white coloring media are polarization-encoded with only LHCP light reflected from the image surface; while the right-perspective image components of the SMI formed using RH-type additive-primary and super-white coloring media are polarization-encoded with only RHCP light reflected from the image surface.

Following the formulas set forth above, the CLC microflakes of the present invention are mixed in a suitable carrier medium to produce CLC ink, paint or crayon material for use in either 2-D or 3-D printing, drawing, painting and other kinds of imaging applications. An example of a suitable carrier liquid would be an optically clear and thermally curable lacquer (e.g., PUL Varnish, from Marabu, Germany). Preferably, the CLC coloring media formed by this process is designed for application at room temperature and does not need any sort of alignment. After the coloring media is applied to a substrate and cured, the coating formed thereby remains stable in ambient lighting and temperature environments. The optical properties of the coloring media made using this method can be tested by applying the coloring media onto a radiation absorbing substrate (e.g. a black background) using any suitable coloring media application technique (e.g. screen-printing, painting, etc.).

Step E: Preparing/Treating the Substrate (i.e. Surface) to Which the Coloring Media is to be Applied Prior to using the CLC coloring media of the present invention in an "additive primary" coloring system, it is highly desired to first ensure that the substrate (i.e. surface) to be printed or painted upon is properly rendered radiation absorbing over the spectrum of light of the ambient environment (e.g. from 400 nm to 750 nm). Typically, this involves applying a flat (non-shining) black primer (i.e. surface blackening) to the substrate using conventional techniques. The substrate may be made from a wide variety of materials including, for example, virtually paper, glass, metal, plastic, fabric, etc.

When the super-white CLC coloring media is applied to a radiation absorbing substrate to form non-specularly reflective color images or color surfaces, the broadband CLC microflakes will be either suspended within the carrier medium parallel to the substrate surface in an overlapping relationship with other microflakes and/or be randomly or quasi-randomly suspended within the carrier medium, wherein the CLC helical axes of the liquid crystal molecules within each microflake are oriented normal to the planar surface of the microflake. By virtue of the configuration of the broadband CLC microflakes within the carrier medium, incident light on any applied CLC coating embodying the same will naturally undergo non-specular (i.e. diffusive) reflection, thereby producing a Magnesium-Oxide like "super-white" color response characteristics within the human vision system.

When the super-white CLC coloring media is applied to a radiation absorbing substrate to form non-specularly reflective color images or color surfaces, the broadband CLC microflakes will be either suspended within the carrier medium parallel to the substrate surface in an overlapping relationship with other microflakes and/or be randomly or quasi-randomly suspended within the carrier medium, wherein the CLC helical axes of the liquid crystal molecules within each microflake are oriented normal to the planar surface of the microflake. By virtue of the configuration of the broadband CLC microflakes within the carrier medium, incident light on any applied CLC coating embodying the same will naturally undergo non-specular (i.e. diffusive) reflection, thereby producing a Magnesium-Oxide like "super-white" color response characteristics within the human vision system.

When the mirror-like CLC coloring media is applied to a radiation absorbing substrate to form specularly reflective color images or color surfaces, the broadband CLC microflakes will be suspended within the carrier medium parallel to the substrate surface in a substantially planar relationship with other microflakes, wherein the CLC helical axes of the liquid crystal molecules within each microflake are oriented normal to the planar surface of the microflake. By virtue of the configuration of the broadband CLC microflakes within the carrier medium, incident light on any applied CLC coating embodying broadband CLC microflakes hereof will naturally undergo specular (i.e. non-diffusive) reflection, thereby producing a mirror-like color response characteristics within the human vision system.

When the specularly-reflective CLC coloring media is applied to a radiation absorbing substrate to form specularly reflective color images or color surfaces, the spectrally-tuned CLC microflakes will be suspended within the carrier medium parallel to the substrate surface in a substantially planar relationship with other microflakes, wherein the CLC helical axes of the liquid crystal molecules within each microflake are oriented normal to the planar surface of the microflake. By virtue of the configuration of the spectrally-tuned CLC microflakes within the carrier medium, incident light on any applied CLC coating embodying spectrally-tuned CLC microflakes hereof will naturally undergo specular (i.e. non-diffusive) reflection, thereby producing highly saturated red, green or blue color response characteristics within the human vision system, highly dependent on viewing angle.

When the non-specularly-reflective CLC coloring media is applied to a radiation absorbing substrate to form non-specularly reflective color images or color surfaces, the spectrally-tuned CLC microflakes will be suspended within the carrier medium in a quasi-random relationship, wherein the CLC helical axes of the liquid crystal molecules within each microflake are oriented normal to the planar surface of the microflake. By virtue of the configuration of the spectrally-tuned CLC microflakes within the carrier medium, incident light on any applied CLC coating embodying spectrally-tuned CLC microflakes hereof will naturally undergo non-specular (i.e. diffusive) reflection, thereby producing highly-saturated single color response characteristics within the human vision system, independent of viewing angle.

Step F: Applying CLC Coloring Media to the Treated Substrate

Exploiting the remarkable additive and color saturation properties, the red, green, blue and super-white CLC inks of the present invention are sufficient to generate all colors sensible by the human vision system. These CLC color inks, paints and crayons may be mixed together alone or in combination with the super-white (MgO-like) media of the present invention before application to the substrate, or sequentially as they are applied in turn onto the substrate. The CLC inks and paints hereof can be applied to virtually any radiation absorbing surface having either 2-D or 3-D surface characteristics.

Mechanisms for Applying CLC Coloring Media of the Present Invention

In general, there are two ways in which to apply the CLC coloring media of the present invention.

The first method of application involves directly mixing the CLC microflakes (i.e. pigments) into the optically transparent carrier medium in order to form a CLC ink or paint of the present invention. Thereafter, the CLC ink or paint can be printed or painted on the substrate surface via printing screen, ink-jet printing, Gravure printing, brush strokes, etc.

The second method of application involves first printing or painting the carrier medium onto the substrate surface. Thereafter, while the carrier is not yet cured and has adhesive properties, the CLC microflakes are spread on top of the substrate surface bearing the carrier medium. Depending on the viscosity of the carrier medium and the concentration of the microflakes, the microflakes either stay on the carrier substrate or diffuse below the surface of the carrier medium and become suspended therewithin so as to provide either specular or non-specular reflection characteristics, as may be desired or required by the application at hand.

Mechanisms for Drying/Curing CLC Coloring Media of the Present Invention

In general, there are a number of ways in which the CLC coloring media hereof can be cured or dried. Three preferred methods therefor will be described below.

The first drying mechanism is based on evaporation. According to this method, CLC microflakes are mixed into a carrier medium which contains certain types of solvent and other solvents. After the CLC coloring media is applied to the substrate (by printing or painting), the solvent starts to evaporate. Once the solvent has totally evaporated, the CLC microflakes are permanently confined inside the optically transparent carrier medium.

A second drying mechanism is based on photon polymerization. According to this method, the CLC microflakes are mixed with a carrier medium that can be polymerized via photons. An example of a photon polymerizable carrier medium is UV curable epoxy or glue which, in response to UV radiation exposure, is polymerized to form an optically transparent medium in a solid state.

A third drying mechanism is based in thermal curing. According to this method, the CLC microflakes are mixed with a carrier medium that can be polymerized via thermal curing. An example of a thermally curable carrier medium is PUL varnish from Maribu of Germany which, in response to IR radiation exposure, is polymerized to form an optically transparent medium that remains in a solid state.

Applying Protective/Index-Matching Layer over the Coloring Media of the Present Invention Optionally, an optically transparent protective (or index matching) layer can be applied over the CLC ink or paint coatings of the present invention. Such protective (or index matching) coatings can be applied by way of printing, painting or other application techniques well known in the art. When using the CLC coloring media hereof to create 3-D images for stereoscopic viewing, it is desirable to apply an optically transparent index matching layer upon surfaces printed with the CLC coloring media hereof. The function of the index matching layer is to "fill in" microscopic surface irregularities in order to render them optically smooth. This reduces light scattering at the surface of the substrate (where coloring media has been applied), and circularly polarized light (reflected from spatially-multiplexed images (SMI) formed from the CLC coloring media hereof) is not depolarized during stereoscopic viewing, and thus stereo-channel cross-talk is effectively avoided.

Applications of the CLC Coloring Media of the Present Invention

2-D Printing and Painting

The aligned CLC inks and paints of the present invention can be used in the printing, signage, fine and decorative arts industries. These CLC inks can be dispensed by well known means at room temperature and without the need for further alignment of the CLC molecules into the desired helical form. In the CLC ink, the aligned CLC flakes are suspended in a host fluid or a host matrix depend on the printing or imaging application. In a crayon or a pencil form, the host matrix could be a wax or an equivalent sticky material that is solid state at room temperature. This is used by the painter by rubbing off onto a black paper, the CLC microflakes of the appropriate color and the host matrix. The host fluid could be dispensed from a pen for drawing, painting, plotting, and writing. The ink could be applied by means of a brush, roller, or spray gun. The CLC ink could also be formulated for use in off-set printing wherein the host fluid is made hydrophobic, or in gravure and flexographic printing wherein the host fluid is formulated for printing on plastic substrates, or other substrates. The CLC microflakes and/or ink of the present invention may also be used as a toner in electrographic copier and printers, thermal color printers as well as inkjet printers. According to this invention, color images are produced which feature colors more saturated and having higher brightness characteristics than can be produced by conventional pigment and dye based inks. Collectively, the "broadband" and "spectrally-tuned" CLC microflakes of the present invention, that comprise the color coatings and images formed on radiation absorbing substrates, reflect circularly polarized light in a manner which produces outstanding color effects, clearly unattainable using prior art CLC inks and paints.

3-D Printing Application for the CLC Inks and Paint of the Present Invention

Another application of the coloring media of the present invention is to use LHCP and RHCP coloring media (e.g. ink, paint or crayon) of the present invention to form left-handed and right-handed circularly polarized images, respectively. According to this method which is described in Applicant U.S. Pat. No. 5,364,557, LHCP coloring media (e.g. ink, paint or crayon) can be used to print, paint, or plot the left-perspective image component of an SMI on a radiation absorbing surface. This left-perspective image component reflects left-hand circularly polarized (LHCP) light, and is viewed with a left circular polarizer placed in front of the viewer's left eye. RHCP coloring media (e.g. ink, paint or crayon) can be used to print, paint, or plot the right-perspective image component of an SMI on the radiation absorbing surface. This right-perspective image component reflects right-hand circularly polarized (RHCP) light, and is viewed with a right circular polarizer placed in front of the viewer's right eye. In accordance with SMI principles, the left and right perspective image components of a color SMI are spaced apart laterally on the radiation absorbing surface (as a function of the desired image depth) to provide the stereo disparity (displacement) necessary 3-D stereoscopic imaging. When such circularly polarized image components are viewed through a pair of electrically-passive polarization spectacles, as taught in copending application Ser. No. 08/614,569, incorporated herein by reference in its entirety, a 3-D stereo image is perceived within the mind of the viewer. During the stereoscopic viewing process, coloring media embodying broadband LHCP-type CLC microflakes produce bright white light which is viewable through a left-handed circular polarizer before the viewer's left eye, but not viewable through a right-handed circular polarizer before the viewer's right eye. Similarly, coloring media embodying broadband RHCP-type CLC microflakes produce bright super-white light which is viewable through a right-handed circular polarizer before the viewer's right eye, but not viewable through a left-handed circular polarizer before the viewer's left eye. Coloring media embodying spectrally-tuned LHCP-type CLC microflakes produces red, green and/or blue light which is viewable through a left-handed circular polarizer before a viewer's left eye, but not viewable through a right-handed circular polarizer before the viewer's right eye. Coloring media embodying spectrally-tuned RHCP-type CLC microflakes produces red, green and/or blue light which is viewable through a right-handed circular polarizer positioned before a viewer's right eye, but not viewable through a left-handed circular polarizer before the viewer's left eye.

Any one of the image generating mechanisms disclosed in U.S. Pat. No. 5,364,557 can be used to produce hard-copy 3-D images using the CLC coloring media of the present invention. Examples of such image generating mechanisms include, but are not limited to: (1) ink (or paint) releasing apparatus which applies, either sequentially or in parallel, left-handed and right-handed cholesteric liquid crystal (CLC) inks (or paints) of a desired color onto a radiation absorbing surface; (2) manual paint brushes, spray-guns and/or drawing tools; (3) computer-driven printers; (4) pen plotters and a thermal printing heads; and (5) offset printers gravure printers and flexographic printers, and screen printers.

When the LHCP-type and RHCP-type CLC microflakes are incorporated into commercially available crayon material, LHCP and RHCP image components can be drawn by an artist wearing the polarizing glasses, and thereafter viewed by viewers through polarizing eyeglasses, to perceive 3-D stereoscopic images. The resulting paintings will have an entirely different look when viewed in 2-D (without glasses). CLC images generated by way of computer processes will provide a similar effect.

Xerographic Printing Application Using CLC-based Toner of the Present Invention

The CLC microflakes of the present invention can be used to fabricate CLC-based toner material for printing additive-primary color images and super-white color images on radiation absorbing sheets of paper. Once manufactured, the CLC-based toner material of the present invention can be contained within conventional toner cartridges and installed within conventional (or modified) Xerographic printers for carrying out Xerographic printing operations in accordance with the principles disclosed herein.

The improved xerographic printing process of the present invention involves the five basic Steps, namely: (1) in response to scanning or focusing a light beam (e.g. laser beam) onto on the photoconductive surface of a drum, producing a charge pattern in the likeness of the image to be printed; (2) transferring the negative charge pattern to a sheet of radiation-absorbing print medium using any suitable transport mechanism known in the art; (3) developing an image by attracting CLC-based toner material to the transferred charge pattern on the sheet of print medium (by moving the sheet over the positively charged supply of CLC toner material), forming a CLC-based toner pattern in the likeness of the transferred charge pattern; (4) fixing the CLC-based toner pattern by way of thermal treatment; and (5) cleaning excess CLC-based toner material from the sheet of print medium in order to produce a clean image thereon formed by CLC microflakes adhered thereto.

Two different methods will be described below for manufacturing CLC-based toner material of the present invention. Notably, each such method can be used to make CLC-based toner for use in (i) additive-primary and super-white color printing operations carried out on sheets of radiation-absorbing print material using conventional xerographic printing processes and equipment. The CLC film material of the present invention used to made the CLC toner material has been proven to inhere the necessary charge-retaining properties required by toner material in conventional xerographic printing processes.

Figure 6:
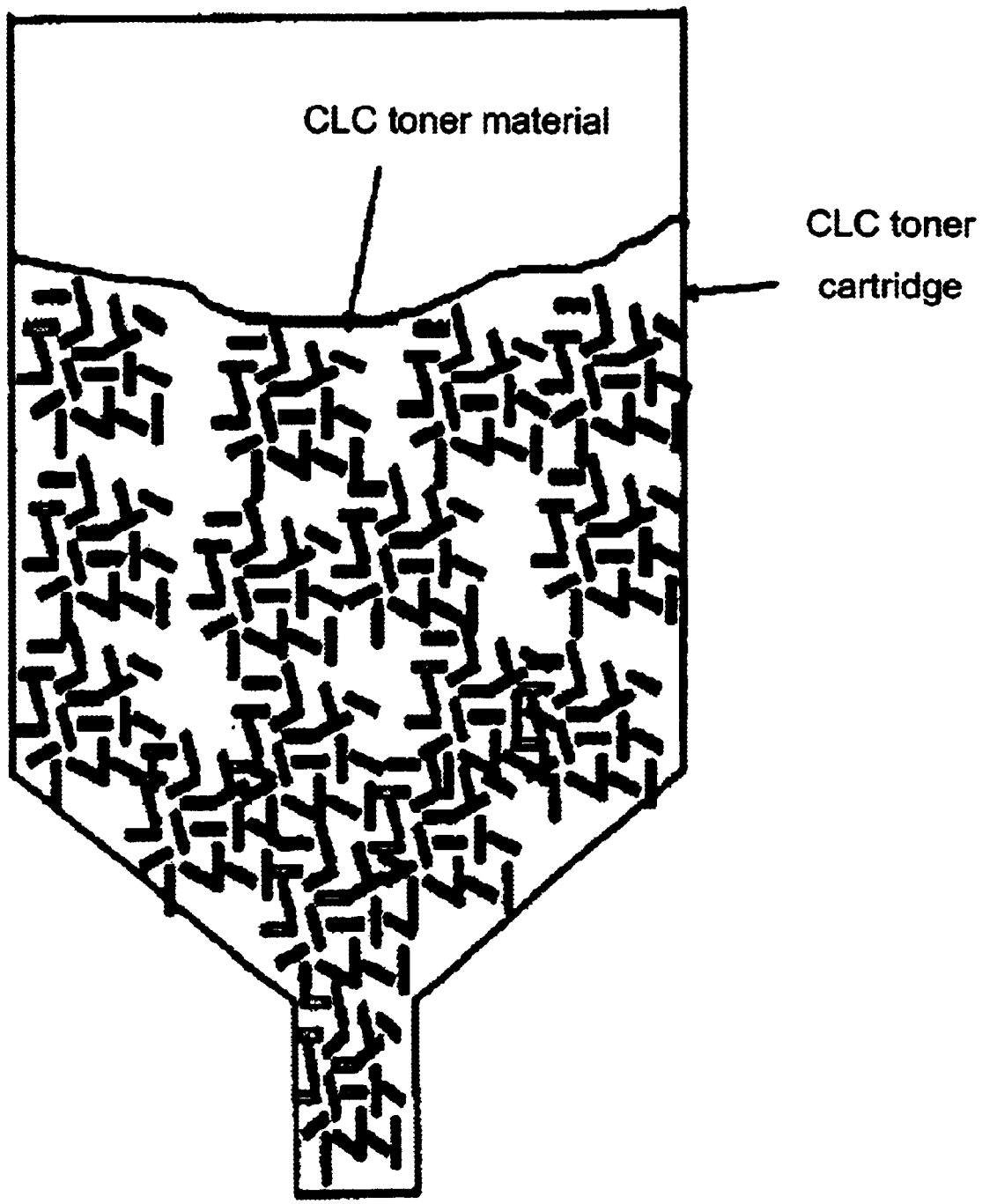
FIG. 6 is a schematic diagram of a toner cartridge of the present invention containing the CLC toner material of FIG. 4 and/or FIG. 5.
Figure 7:
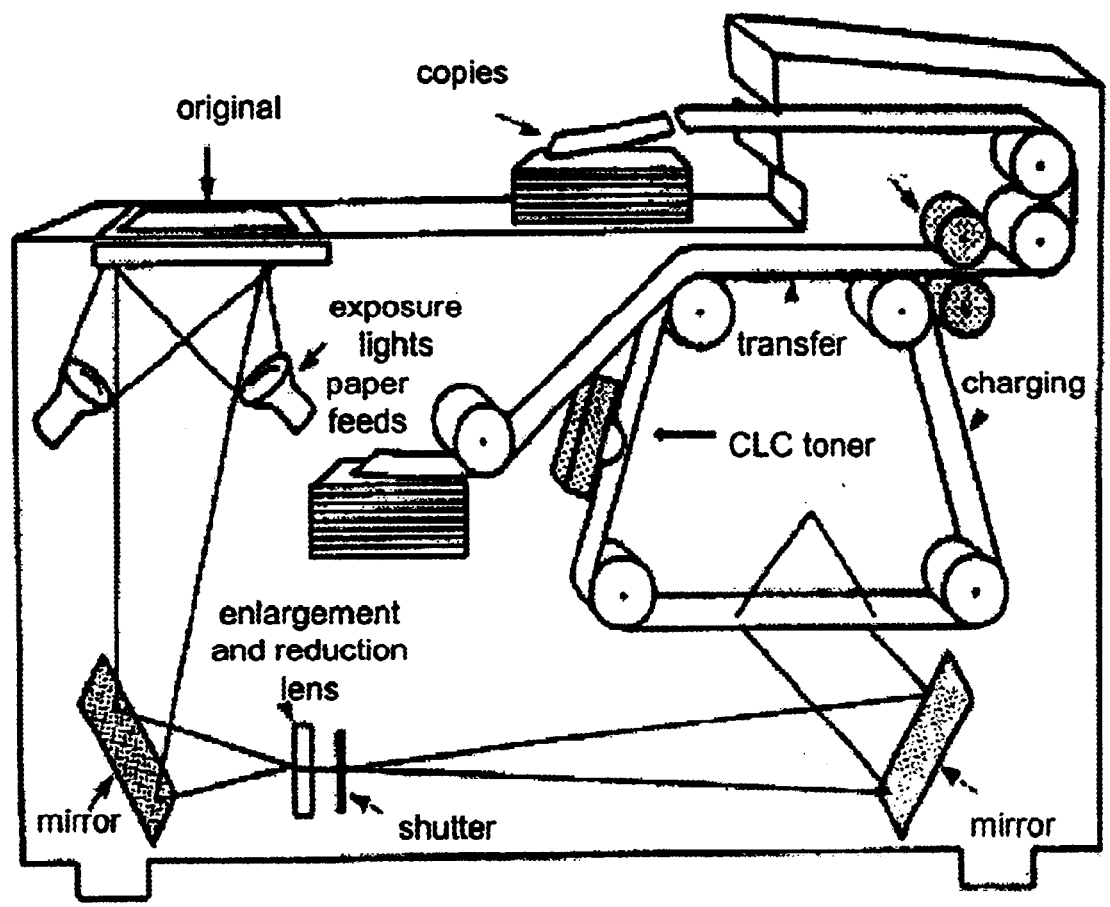
FIG. 7 is a schematic diagram of a xerographic printer or copier employing the toner material of FIG. 4 and/or FIG. 5.

Making CLC-Based Toner by Pre-Coating Adhesive Material on Both Front and Rear Surfaces of CLC Film Material Hereof Prior to Fragmentation According to this method, any CLC film material described above can be used to manufacture CLC-based toner of the present invention. The primary difference in the manufacturing method is that prior to fracturing the CLC film material into microflakes, both sides of the CLC film material are coated with an adhesive material that is thermally meltable and remains optically transparent (i.e. clear) under the conditions produced within conventional xerographic printers (during the toner-fixing stages thereof). Exemplary adhesive materials for use with this CLC microflake fabrication method are: polyvinyl alcohol (PVA) which is meltable around 130° C.; and polystyrene which is meltable at relatively low temperatures, about 80°–90° C. Preferably, the adhesive coating material selected for this manufacturing method should be dry under normal room conditions. In FIG. 4, the basic construction of an adhesively-coated CLC microflake of the present invention is schematically illustrated. As the properties of broadband and super-broadband CLC microflakes of the present invention have been proved to remain stable (and unchanged) until they are exposed to temperatures of 200° C. and beyond, the use of such adhesive materials is considered safe and well within the operational requirements of conventional xerographic printers into which the CLC toner material hereof is to be used. Once CLC toner is manufactured according to this method, it can be packaged within conventional toner cartridges as shown in FIG. 6. Thereafter, the CLC toner cartridges can be installed within conventional xerographic printers as shown in FIG. 7, stocked with sheets of printing material (e.g. paper or plastic material) having radiation-absorbing surfaces.

Making CLC-Based Toner by Mixing CLC Microflakes with Adhesive Powder

According to this method of the CLC toner manufacture, dry CLC microflakes (for additive-primary or super-white coloring applications) are uniformly mixed with adhesive powder that is thermally meltable (such as the metallic powder used in conventional toner) under the conditions produced within conventional xerographic printers (during the toner-fixing stages thereof). Exemplary adhesive powder for use with this CLC microflake fabrication method can be made from: polyvinyl alcohol (PVA) which is meltable around 130° C.; and polystyrene which is meltable at relatively low temperatures, about 80°–90° C. Preferably, the adhesive powder remains dry under normal room conditions and optically clear when melted so that the optical properties of the CLC microflakes are not altered after toner fixing. In FIG. 5, xerographic toner material comprising CLC microflakes and adhesive powder is schematically illustrated. As the properties of broadband and super-broadband CLC microflakes of the present invention have been proved to remain stable (and unchanged) until they are exposed to temperatures of 200° C. and beyond, the use of such adhesive powder is considered safe and well within the operational requirements of conventional xerographic printers into which the CLC toner material hereof is to be used. Once CLC toner is manufactured according to this method, it can be packaged within conventional toner cartridges as shown in FIG. 6. Thereafter, the CLC toner cartridges can be installed within conventional xerographic printers as shown in FIG. 7, stocked with sheets of print material having radiation-absorbing surfaces.

Methods of Xerographic Printing Using CLC Toner Material and Radiation Absorbing Print Medium of the Present Invention With this CLC toner material of the present invention, Xerographic printing can be realized in both mono-color or full-color, in 2-D or 3-D. According to a preferred embodiment of the present invention, a conventional Xerox copier or printer is adapted to print with the CLC toner hereof by simply replacing the conventional toner with the CLC toner in the cartridge. In another embodiment of the present invention, a conventional Xerox copier is converted into a stereoscopic printer by using both left-handed and right-handed CLC toners which are contained in two separate toner cartridges. To copy a color picture in 3-D, the left perspective image is first copied using the left-handed CLC toners, and then the right perspective image is copied on top of the previously copied left perspective image using the right-handed CLC toners. This printing process can be carried out by manually changing the toner cartridges during each of the perspective image printing steps, or by modifying an existing multi-color xerographic copier or printer in order to construct an automatic printer or copier capable of accommodating three (3) RGB CLC toner cartridges for left hand polarized additive-primary toner material, one (1) super-white CLC toner cartridge for left hand polarized super-white toner material, three (3) RGB CLC toner cartridges for right hand polarized additive-primary toner material, and one (1) super-white CLC toner cartridge for right hand polarized super-white toner material.

Document Security Applications

The CLC-based xerographic printing process described above can be put to various uses at work, at home, in school and in industry. One such application would be "document security", where particular documents are printed using a LHCP (or RHCP) CLC-based ink in order to prevent unauthorized copying thereof or indicate that the printed document bears a seal of authenticity (e.g. polarizing-selective "watermark").

While there are many ways in which to carry out such objectives, one approach might involve providing all printing machines (within an organization) with LHCP CLC-based ink (or toner), while all copying machines within the organization are provided with RHCP filters in order to prevent copying of documents printed with LHCP CLC-based ink (or toner). Alternatively, documents could be printed with RHCP CLC-based ink (or toner), whereas the copy machines are provided with LHCP filters in order to prevent copying of documents printed with RHCP CLC-based ink (or toner). This technique can be used prevent unauthorized copying of printed documents within an organization.

Another document security technique would involve printing documents using an "invisible" LHCP (or RHCP) CLC-based ink (i.e. having spectral reflection characteristics outside the visible band). Such printing operations could involve printing all of the information on the document or simply a portion thereof (e.g. an authentication marking) with the invisible CLC-based ink or toner material. Only those with polarizing eyewear with LHCP (or RHCP) polarizers can view the polarization-encoded information printed on the document.

Other Uses for the Coloring Media Hereof

The CLC coloring media of the present invention can be used to make polarizing color filters and filter arrays for displays and other imaging applications. Such devices can be made by simply printing the appropriate pattern on an optically transparent substrate using the CLC ink of the present invention.

The CLC coloring media of the present invention can be used to make broadband, super-broad band and spectrally-tuned polarizers and micropolarizer arrays for use in 3-D stereo imaging, 3-D image displays, 3-D printing, and 3-D cameras. Such devices can be made by printing the appropriate pattern onto an optically transparent substrate using the broadband, super broadband or spectrally-tuned CLC ink of the present invention.

The broadband CLC coloring media of the present invention can be used to make variable light transmission window or glazing structures by applying a coating of broadband and/or spectrally-tuned CLC ink of the present invention onto an optically transparent substrate.

Having described in detail the various aspects of the present invention described above, it is understood that modifications to the illustrative embodiments will readily occur to persons with ordinary skill in the art having had the benefit of the present disclosure. All such modifications and variations are deemed to be within the scope and spirit of the present invention as defined by the accompanying claims to Invention.

What is claimed is:

1. Coloring media for application to the surface of a substrate and producing a spectrum of additive-primary color effects within the vision system of a human viewer, said coloring media comprising:

an optically transparent carrier medium capable of being applied to a surface having radiation absorption characteristics over the visible band of the electromagnetic spectrum; and a distribution of reflective microflakes suspended within said optically transparent carrier medium, wherein each said reflective microflake in said distribution comprises first and second layers of CLC material laminated together and has an upper surface physically associated with said first layer and a lower surface physically associated with said second layer, and that the reflection characteristics of said upper surface is substantially the same as the reflection characteristics of said lower surface over the visible band of said electromagnetic spectrum.

2. The coloring media of claim 1, wherein said reflective microflakes are made from cholesteric liquid crystal (CLC) material having spectrally-tuned reflection characteristics over the visible band of the electromagnetic spectrum so as to reflect in a specular manner circularly polarized light within said visible band falling incident upon a coating of said coloring media so as to produce a spectrum of additive-primary color effects within the vision system of a human viewer.

3. The coloring media of claim 1, wherein each said reflective microflake is made from film material having cholesterically ordered liquid crystal molecules having a pitch which varies in a non-linear manner across the thickness of each said CLC microflake.

4. The coloring media of claim 1, wherein each said reflective microflake is made from film material having cholesterically ordered liquid crystal molecules having a pitch which varies in an exponential manner across the thickness of each said CLC microflake.

5. The coloring media of claim 1, wherein said optically transparent carrier medium is an optically transparent varnish or an optically transparent wax.

6. The coloring media of claim 1, wherein said optically transparent carrier medium is a thermally curable carrier, a photon curable carrier, or air-dryable carrier.

7. Coloring media for application to the surface of a substrate and producing a super-white color effect within the vision system of a human viewer, said coloring media comprising:

an optically transparent carrier medium capable of being applied to a surface having radiation absorption characteristics over the visible band of the electromagnetic spectrum; and reflective microflakes suspended within said optically transparent carrier medium, and having broadband reflection characteristics over the visible band of the electromagnetic spectrum so as to reflect light within said visible band falling incident upon a coating of said coloring media so as to produce super-white color effects, each said reflective microflake comprises first and second layers of CLC material laminated together having an upper surface physically associated with said first layer and a lower surface physically associated with said second layer, and the reflection characteristics of said upper surface being substantially the same as the reflection characteristics of said lower surface over the visible band of said electromagnetic spectrum.

8. The coloring media of claim 7, wherein said reflective microflakes reflect, in a non-specular manner, light within said visible band falling incident upon a coating of said coloring media so as to produce super-white color effects independent of viewing angle.

9. The coloring media of claim 7, wherein said reflective microflakes reflect light within said visible band falling incident upon a coating of said coloring media so as to produce super-white color effects similar to that produced by conventional Magnesium Oxide (MO) white paint.

10. The coloring media of claim 7, wherein each said reflective microflake is made from film material having cholesterically ordered liquid crystal molecules having a pitch which varies in a non-linear manner across the thickness of each said reflective microflake.

11. The coloring media of claim 7, wherein each said reflective microflake is made from film material having cholesterically ordered liquid crystal molecules having a pitch which varies in an exponential manner across the thickness of each said reflective microflake.

12. The coloring media of claim 7, wherein said carrier medium is selected from the group consisting of an optically transparent varnish or an optically transparent wax.

13. The coloring media of claim 7, wherein said carrier medium is a photon curable carrier.

14. The coloring media of claim 7, wherein said carrier medium is a thermally curable carrier.

15. The coloring media of claim 8, wherein said carrier medium is an air-curable carrier curable by evaporation.

16. The coloring media of claim 7, wherein said reflective microflakes reflect incident circularly polarized electromagnetic radiation in the ultraviolet portion of the electromagnetic spectrum and/or the infrared portion thereof.

17. The coloring media of claim 7, wherein said reflective microflakes reflect, in a specular manner, circularly polarized light within said visible band falling incident upon a coating of said coloring media so as to produce super-white color effects dependent of viewing angle.

18. The coloring media of claim 7, wherein said reflective microflakes reflect incident circularly polarized electromagnetic radiation in the infrared portion of the electromagnetic spectrum.

19. The coloring media of claim 7, wherein said reflective microflakes reflect incident circularly polarized electromagnetic radiation in the ultraviolet portion of the electromagnetic spectrum.

20. The coloring media of claim 7, wherein said reflective microflakes reflect incident left-handed circularly polarized (LHCP) electromagnetic radiation.

21. The coloring media of claim 7, wherein said reflective microflakes reflect incident un-polarized electromagnetic radiation.

22. Cholesteric liquid crystal (CLC) coloring media for application to the surface of a substrate and producing an super white color effect within the vision system of a human viewer, said CLC coloring media comprising:
an optically transparent carrier medium capable of being applied to a surface having radiation absorption characteristics over the visible band of the electromagnetic spectrum; and
CLC microflakes suspended within said optically transparent carrier medium, said CLC microflakes being made from CLC material having a broadband reflection characteristics over the visible band of the electromagnetic spectrum so as to reflect circularly polarized light within said visible band falling incident upon a coating of said CLC coloring media so as to produce super-white color effects; and
wherein each said CLC micro flake comprises first and second layers of CLC material laminated together and has an upper surface physically associated with said first layer and a lower surface physically associated with said second layer, and that the reflection characteristics of said upper surface is substantially the same as the reflection characteristics of said lower surface over the visible hand of said electromagnetic spectrum.

23. The CLC coloring media of claim 22, wherein said CLC microflakes reflect, in a non-specular manner, circularly polarized light within said visible band falling incident upon a coating of said CLC coloring media so as to produce super-white color effects independent of viewing angle.

24. The CLC coloring media of claim 22, wherein said CLC microflakes reflect circularly polarized light within said visible band falling incident upon a coating of said CLC coloring media so as to produce super-white color effects similar to that produced by conventional Magnesium Oxide (MO) white paint.

25. The CLC coloring media of claim 22, wherein each said microflake is made from film material having cholesterically ordered liquid crystal molecules having a pitch which varies in a non-linear manner across the thickness of each said CLC microflake.

26. The CLC coloring media of claim 22, wherein each said CLC microflake is made from film material having cholesterically ordered liquid crystal molecules having a pitch which varies in an exponential manner across the thickness of each said CLC microflake.

27. The CLC coloring media of claim 22, wherein said carrier medium is selected from the group consisting of an optically transparent varnish or an optically transparent wax.

28. The CLC coloring media of claim 22, wherein said carrier medium is a photon curable carrier.

29. The CLC coloring media of claim 22, wherein said carrier medium is a thermally curable carrier.

30. The CLC coloring media of claim 22, wherein said carrier medium is an air-curable carrier curable by evaporation.

31. The CLC coloring media of claim 22, wherein said CLC microflakes reflect incident circularly polarized electromagnetic radiation in the ultraviolet portion of the electromagnetic spectrum and/or the infrared portion thereof.

32. The CLC coloring media of claim 22, wherein said CLC microflakes reflect, in a specular manner, circularly polarized light within said visible band falling incident upon a coating of said CLC coloring media so as to produce super-white color effects dependent of viewing angle.

33. The CLC coloring media of claim 22, wherein said microflakes reflect incident circularly polarized electromagnetic radiation in the infrared portion of the electromagnetic spectrum.

34. The CLC coloring media of claim 22, wherein said microflakes reflect incident circularly polarized electromagnetic radiation in the ultraviolet portion of the electromagnetic spectrum.

35. The CLC coloring media of claim 22, wherein said microflakes reflect incident left-handed circularly polarized (LHCP) electromagnetic radiation.

36. The CLC coloring media of claim 22, wherein said microflakes reflect incident right-handed circularly polarized (RHCP) electromagnetic radiation.

37. The CLC coloring media of claim 22, wherein said microflakes reflect incident un-polarized electromagnetic radiation.

38. Cholesteric liquid crystal (CLC) coloring media for application to the surface of a substrate and producing a prespecified additive-primary color effect independent of viewing angle, said CLC coloring media comprising:
an optically transparent carrier medium capable of being applied to a surface having radiation absorption characteristics over the visible band of the electromagnetic spectrum; and
CLC microflakes suspended within said optically transparent carrier medium,
said CLC microflakes being made from CLC material having a spectrally-tuned reflection characteristics over the visible band of the electromagnetic spectrum so as to reflect in a non-specular manner circularly polarized light within said visible band falling incident upon a coating of said CLC coloring media so as to produce a prespecified additive-primary color effect within the vision system of a human viewer independent of viewing angle; and
wherein each said CLC microflake comprises first and second layers of CLC material laminated together, and has an upper surface physically associated with said first layer and a lower surface physically associated with said second layer, and that the reflection characteristics of said upper surface is substantially the same as the reflection characteristics of said lower surface over the visible band of said electromagnetic spectrum.

39. The CLC coloring media of claim 38, wherein each said CLC microflake is made from film material having cholesterically ordered liquid crystal molecules having a pitch which varies in a non-linear manner across the thickness of each said CLC microflake.

40. The CLC coloring media of claim 39, wherein each said CLC microflake is made from film material having cholesterically ordered liquid crystal molecules having a pitch which varies in an exponential manner across the thickness of each said CLC microflake.

41. The CLC coloring media of claim 38, wherein each said CLC microflake is made from materials having cholesterically ordered liquid crystal molecules having a constant or substantially constant pitch.

42. The CLC coloring media of claim 38, wherein said carrier medium is an optically transparent varnish or an optically transparent wax.

43. The CLC coloring media of claim 38, wherein said carrier medium is a thermally curable carrier, a photon curable carrier, or an air-dryable carrier medium.

44. The CLC coloring media of claim 38, wherein said prespecified additive-primary color effect is either the color red, green or blue.

45. The CLC coloring media of claim 38, wherein said prespecified additive-primary color effect is any arbitrary color composed from any combination the additive-primary colors red, green and blue.

46. Cholesteric liquid crystal (CLC) coloring media for application to the surface of a substrate and producing a spectrum of additive-primary color effects dependent upon viewing angle, said CLC coloring media comprising:

an optically transparent carrier medium capable of being applied to a surface having radiation absorption characteristics over the visible band of the electromagnetic spectrum; and a distribution of CLC microflakes suspended within said optically transparent carrier medium, wherein each said CLC microflake comprises first and second layers of CLC material laminated together and has an upper surface physically associated with said first layer and a lower surface physically associated with said second layer, and that the reflection characteristics of said upper surface is substantially the same as the reflection characteristics of said lower surface over the visible band of said electromagnetic spectrum, and wherein each said CLC microflake is made from CLC material having a spectrally-tuned reflection characteristics over the visible band of the electromagnetic spectrum so as to reflect, in a specular manner, circularly polarized light within said visible band falling incident upon a coating of said CLC coloring media so as to produce a spectrum of additive-primary color effects within the vision system of a human viewer.

47. The CLC coloring media of claim 46, wherein each said CLC microflake is made from film material having cholesterically ordered liquid crystal molecules having a pitch which varies in a non-linear manner across the thickness of each said CLC microflake.

48. The CLC coloring media of claim 46, wherein each said CLC microflake is made from film material having cholesterically ordered liquid crystal molecules having a pitch which varies in an exponential manner across the thickness of each said CLC microflake.

49. The CLC coloring media of claim 46, wherein each said CLC microflake is made from materials having cholesterically ordered liquid crystal molecules having a constant or substantially constant pitch.

50. The CLC coloring media of claim 46, wherein said carrier medium is an optically transparent varnish or an optically transparent wax.

51. The CLC coloring media of claim 46, wherein said carrier medium is a thermally curable carrier, a photon curable carrier, or an air-dryable carrier curable by evaporation.

52. Cholesteric liquid crystal (CLC) coloring media for application to the surface of a substrate and producing color effects within the vision system of a human viewer, said CLC coloring media comprising:

an optically transparent carrier medium capable of being applied to a surface having radiation absorption characteristics over the visible band of the electromagnetic spectrum; and a distribution of CLC microflakes suspended within said optically transparent carrier medium, wherein each said CLC microflake in said distribution comprises a first and second layers of CLC material laminated together and has an upper surface physically associated with said first layer and a lower surface physically associated with said second layer, and that the reflection characteristics of said upper surface is substantially the same as the reflection characteristics of said lower surface over the visible band of said electromagnetic spectrum.

53. The CLC coloring media of claim 52, wherein said CLC microflakes are made from CLC material having a spectrally-tuned reflection characteristics over the visible band of the electromagnetic spectrum so as to reflect in a specular manner circularly polarized light within said visible band falling incident upon a coating of said CLC coloring media so as to produce a spectrum of additive-primary color effects within the vision system of a human viewer.

54. The CLC coloring media of claim 52, wherein each said CLC microflake is made from film material having cholesterically ordered liquid crystal molecules having a pitch which varies in a non-linear manner across the thickness of each said CLC microflake.

55. The CLC coloring media of claim 52, wherein each said CLC microflake is made from film material having cholesterically ordered liquid crystal molecules having a pitch which varies in an exponential manner across the thickness of each said CLC microflake.

56. The CLC coloring media of claim 52, wherein each said CLC microflake is made from materials having cholesterically ordered liquid crystal molecules having a constant or substantially constant pitch.

57. The CLC coloring media of claim 52, wherein said optically transparent carrier medium is a thermally curable carrier, a photon curable carrier or an air-dryable carrier.

58. The CLC coloring media of claim 52, wherein said CLC microflakes are made from CLC material having a broadband reflection characteristics over the visible band of the electromagnetic spectrum so as to reflect in a specular manner circularly polarized light within said visible band falling incident upon a coating of said CLC coloring media so as to produce super-white color effects independent of viewing angle within the vision system of a human viewer.

59. The CLC coloring media of claim 52, wherein said optically transparent carrier medium is an optically transparent varnish or an optically transparent wax.

60. Cholesteric liquid crystal (CLC) coloring media system for producing a palette of color effects, including super-white and/or additive-primary color effects, on a radiation absorbing substrate, said CLC coloring media comprising:

(A) a layer of super-white CLC coloring media including
an optically transparent carrier medium capable of being applied to a surface having radiation absorption characteristics over the visible band of the electromagnetic spectrum, and
CLC microflakes suspended within said optically transparent carrier medium,
said CLC microflakes being made from CLC material having a broadband reflection characteristics over the visible band of the electromagnetic spectrum so as to reflect circularly polarized light within said visible band falling incident upon a coating of said CLC coloring media so as to produce super-white color effects within the vision system of a human viewer; and (B) a plurality of layers of additive-primary CLC coloring media, each said layers of additive-primary CLC coloring media for application to the surface of a substrate and producing a prespecified additive-primary color effect, and each said layer of additive-primary CLC coloring media CLC coloring media including
an optically transparent carrier medium capable of being applied to said surface, and
CLC microflakes suspended within said optically transparent carrier medium,
said CLC microflakes being made from CLC material having a spectrally-tuned reflection characteristics over the visible band of the electromagnetic spectrum so as to reflect circularly polarized light within said visible band falling incident upon a coating of said CLC coloring media so as to produce a prespecified additive-primary color effect within the vision system of a human viewer; and wherein each said CLC microflake in said layer of super-white CLC coloring media comprises a first and second CLC layer laminated together and has an upper surface physically associated with said first layer and a lower surface physically associated with said second layer, and that the reflection characteristics of said lower surface over the visible band of said electromagnetic spectrum.

61. The CLC coloring media system of claim 60, wherein said CLC microflakes in said layer of super-white CLC coloring media reflect, in a non-specular manner, circularly polarized light within said visible band falling incident upon a coating of said CLC coloring media so as to produce super-white color effects comparable to that produced by conventional Magnesium Oxide (MO) white paint.

62. The CLC coloring media system of claim 60, wherein each said CLC microflake in said layer of super-white CLC coloring media is made from film material having cholesterically ordered liquid crystal molecules having a pitch which varies in a non-linear manner across the thickness of each said CLC microflake.

63. The CLC coloring media system of claim 60, wherein each said CLC microflake in said supply of super-white CLC coloring media is made from film material having cholesterically ordered liquid crystal molecules having a pitch which varies in an exponential manner across the thickness of each said CLC microflake.

64. The CLC coloring media system of claim 60, wherein said carrier medium of said supply of super-white CLC coloring media is an optically transparent varnish or an optically transparent wax.

65. The CLC coloring media system of claim 60, wherein said carrier medium of said layer of super-white CLC coloring media is a thermally curable carrier, a photon curable carrier or an air-dryable carrier.

66. The CLC coloring media system of claim 60, wherein said 130 microflakes reflect incident circularly polarized electromagnetic radiation in the infrared portion of the electromagnetic spectrum.

67. The CLC coloring media system of claim 60, wherein said microflakes reflect incident circularly polarized electromagnetic radiation in the ultraviolet portion of the electromagnetic spectrum.

68. The CLC coloring media of claim 60, wherein each said CLC microflake is made from materials having cholesterically ordered liquid crystal molecules having a constant or substantially constant pitch.

69. The CLC coloring media system of claim 60, wherein said prespecified additive-primary color effect produced from each said supply of additive-primary CLC coloring media is either the color red, green or blue.

70. The CLC coloring media system of claim 69, wherein said super-white color effect produced from said supply of super-white CLC coloring media is comparable to that produced by conventional Magnesium Oxide (MO) white paint.

71. Coloring media for application to the surface of a substrate and producing color effects within the vision system of a human viewer, said coloring media comprising:

an optically transparent carrier medium capable of being applied to a surface having radiation absorption characteristics over the visible band of the electromagnetic spectrum; and a distribution of reflective microflakes suspended within said optically transparent carrier medium, wherein each said reflective microflake in said distribution comprises first and second layers of material laminated together and has an upper surface physically associated with said first layer and a lower surface physically associated with said second layer, and that the reflection characteristics of said upper surface is substantially the same as the reflection characteristics of said lower surface over the visible band of said electromagnetic spectrum.

72. The coloring media of claim 71, wherein said reflective microflakes are made from material having a spectrally-tuned reflection characteristics over the visible band of the electromagnetic spectrum so as to reflect in a specular manner light within said visible band falling incident upon a coating of said coloring media so as to produce a spectrum of additive-primary color effects within the vision system of a human viewer.

73. The coloring media of claim 71, wherein each said reflective microflake is made from film material having cholesterically ordered liquid crystal molecules having a pitch which varies in a non-linear manner across the thickness of each said reflective microflake.

74. The coloring media of claim 71, wherein each said reflective microflake is made from film material having cholesterically ordered liquid crystal molecules having a pitch which varies in an exponential manner across the thickness of each said reflective microflake.

75. The coloring media of claim 71, wherein said optically transparent carrier medium is an optically transparent varnish or an optically transparent wax.

76. The coloring media of claim 71, wherein each said reflective microflake is made from materials having cholesterically ordered liquid crystal molecules having a constant or substantially constant pitch.

77. The coloring media of claim 71, wherein said optically transparent carrier medium is a thermally curable carrier, a photon curable carrier or an air-dryable carrier.

78. The coloring media of claim 71, wherein said reflective microflakes are made from material having a broadband reflection characteristics over the visible band of the electromagnetic spectrum so as to reflect in a specular manner circularly polarized light within said visible band falling incident upon a coating of said coloring media so as to produce super-white color effects independent of viewing angle within the vision system of a human viewer.

79. The coloring media of claim 71, wherein each said reflective microflake is made from film material having cholesterically ordered liquid crystal molecules having a pitch which varies in a non-linear manner across the thickness of each said microflake.

80. The coloring media of claim 71, wherein each said reflective microflake is made from film material having cholesterically ordered iquid crystal molecules having a pitch which varies in an exponential manner across the thickness of each said reflective microflake.

81. The coloring media of claim 71, wherein said optically transparent carrier medium is a thermally curable carrier, a photon curable carrier or an air-dryable carrier.

82. The coloring media of claim 71, wherein each said reflective microflake is made from materials having cholesterically ordered liquid crystal molecules having a constant or substantially constantpitch.

83. A coloring media coating applied to the surface of a substrate having radiation absorption characteristics over at least a portion of the visible band of the electromagnetic spectrum, and producing color effects within the vision system of a human viewer, said coloring media coating comprising:

a distribution of reflective microflakes suspended within said coloring media coating, wherein each said reflective microflake in said distribution comprises first and second layers of material laminated together and has an upper surface physically associated with said first layer and a lower surface physically associated with said second layer, and that the reflection characteristics of said upper surface is substantially the same as the reflection characteristics of said lower surface over the visible band of said electromagnetic spectrum.

84. The coloring media coating of claim 83, which further comprises:

an optically transparent carrier medium capable of being applied to said surface.

85. The coloring media coating of claim 83, wherein said reflective microflakes are made from material having a spectrally-tuned reflection characteristics over the visible band of the electromagnetic spectrum so as to reflect in a specular manner light within said visible band falling incident upon a coating of said coloring media so as to produce a spectrum of additive-primary color effects within the vision system of a human viewer.

86. The coloring media coating of claim 83, wherein each said reflective microflake is made from film material having cholesterically ordered liquid crystal molecules having a pitch which varies in a non-linear manner across the thickness of each said reflective microflake.

87. The coloring media coating of claim 83, wherein each said reflective microflake is made from film material having cholesterically ordered liquid crystal molecules having a pitch which varies in an exponential manner across the thickness of each said reflective microflake.

88. The coloring media coating of claim 84 wherein said optically transparent carrier medium is an optically transparent varnish or an optically transparent wax.

89. The coloring media coating of claim 83, wherein each said reflective microflake is made from materials having cholesterically ordered liquid crystal molecules having a constant or substantially constant pitch.

90. The coloring media coating of claim 84, wherein said optically transparent carrier medium is a thermally curable carrier, a photon curable carrier or an air-dryable carrier.

91. The coloring media coating of claim 83, wherein said reflective microflakes are made from material having a broadband reflection characteristics over the visible band of the electromagnetic spectrum so as to reflect in a specular manner circularly polarized light within said visible band falling incident upon a coating of said coloring media so as to produce super-white color effects independent of viewing angle within the vision system of a human viewer.

92. The coloring media of claim 1, wherein each said reflective microflake is made from materials having cholesterically ordered liquid crystal molecules having a constant or substantially constant pitch.

93. The coloring media of claim 7, wherein said reflective microflakes reflect incident right-handed circularly polarized (RHCP) electromagnetic radiation.

* * * * *